(12) United States Patent
Babaei et al.

(10) Patent No.: US 11,153,060 B2
(45) Date of Patent: Oct. 19, 2021

(54) SELECTION OF GRANT AND CSI

(71) Applicant: Comcast Cable Communications, LLC, Philadelphia, PA (US)

(72) Inventors: Alireza Babaei, Fairfax, VA (US);
Esmael Dinan, Herndon, VA (US);
Hua Zhou, Herndon, VA (US);
Hyoungsuk Jeon, Oakton, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 267 days.

(21) Appl. No.: 16/237,368

(22) Filed: Dec. 31, 2018

(65) Prior Publication Data

US 2019/0207737 A1  Jul. 4, 2019

Related U.S. Application Data

(60) Provisional application No. 62/612,132, filed on Dec. 29, 2017, provisional application No. 62/615,909, (Continued)

(51) Int. Cl.
*H04L 5/00* (2006.01)
*H04W 72/12* (2009.01)
(Continued)

(52) U.S. Cl.
CPC ......... *H04L 5/0098* (2013.01); *H04B 7/0617* (2013.01); *H04B 7/0626* (2013.01);
(Continued)

(58) Field of Classification Search
CPC ......... H04W 72/042; H04W 72/00453; H04W 72/046; H04W 24/10; H04W 24/08; H04W 80/02; H04W 80/08; H04W 74/0808; H04W 74/02; H04W 76/27; H04W 76/11; H04W 76/28
(Continued)

(56) References Cited

U.S. PATENT DOCUMENTS 9,674,727 B2   6/2017  Damnjanovic et al.
2011/0243278 A1  10/2011  Cheng
(Continued)

FOREIGN PATENT DOCUMENTS

EP    3525516 A1   8/2019
WO   2017136706 A1  8/2017
(Continued)

OTHER PUBLICATIONS

Mar. 24, 2020—European Office Action—EP 19151142.7.
(Continued)

*Primary Examiner* — Christopher M Crutchfield
*Assistant Examiner* — Jean F Voltaire
(74) *Attorney, Agent, or Firm* — Banner & Witcoff, Ltd.

(57) ABSTRACT

Uplink resources for semi-persistent channel state information (SP-CSI) reports and other uplink transport block transmissions may be managed. If resources allocated to the SP-CSI reports overlap, in time, with resources allocated to the uplink transport block transmissions, a determination of whether to drop an SP-CSI report may be made. Various selection criteria may be used to make this determination.

23 Claims, 36 Drawing Sheets

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | Reporting on PUCCH: the UE receives a selection command [10, TS 38.321] Reporting on PUSCH: DCI | DCI |
| Semi-Persistent CSI-RS | Not Supported | Reporting on PUCCH: the UE receives a selection command [10, TS 38.321] Reporting on PUSCH: DCI | DCI |
| Aperiodic CSI-RS | Not Supported | Not Supported | DCI |

Related U.S. Application Data filed on Jan. 10, 2018, provisional application No. 62/616,189, filed on Jan. 11, 2018.

(51) Int. Cl.

| | | |
|---|---|---|
| *H04W 76/28* | (2018.01) | |
| *H04W 76/11* | (2018.01) | |
| *H04W 76/27* | (2018.01) | |
| *H04B 7/06* | (2006.01) | |
| *H04L 27/26* | (2006.01) | |
| *H04W 24/08* | (2009.01) | |
| *H04W 24/10* | (2009.01) | |
| *H04W 72/04* | (2009.01) | |
| *H04W 74/02* | (2009.01) | |
| *H04W 74/08* | (2009.01) | |
| *H04W 80/02* | (2009.01) | |
| *H04W 80/08* | (2009.01) | |
| H04B 7/08 | (2006.01) | |

(52) U.S. Cl.
CPC ......... *H04B 7/0632* (2013.01); *H04L 5/0048* (2013.01); *H04L 27/2607* (2013.01); *H04W 24/08* (2013.01); *H04W 24/10* (2013.01); *H04W 72/042* (2013.01); *H04W 72/046* (2013.01); *H04W 72/0453* (2013.01); *H04W 72/1268* (2013.01); *H04W 74/02* (2013.01); *H04W 74/0808* (2013.01); *H04W 76/11* (2018.02); *H04W 76/27* (2018.02); *H04W 76/28* (2018.02); *H04W 80/02* (2013.01); *H04W 80/08* (2013.01); *H04B 7/0695* (2013.01); *H04B 7/088* (2013.01); *H04L 5/0007* (2013.01)

(58) Field of Classification Search
USPC ........................................................ 370/329
See application file for complete search history.

(56) References Cited

U.S. PATENT DOCUMENTS

| | | | |
|---|---|---|---|
| 2012/0076017 A1* | 3/2012 | Luo | H04L 1/0026 370/252 |
| 2013/0195025 A1 | 8/2013 | Chatterjee et al. | |
| 2014/0010126 A1* | 1/2014 | Sayana | H04B 7/0619 370/280 |
| 2014/0044083 A1 | 2/2014 | Kim et al. | |
| 2014/0269452 A1* | 9/2014 | Papasakellariou | H04W 72/0446 370/280 |
| 2015/0189574 A1 | 7/2015 | Ng et al. | |
| 2015/0327107 A1 | 11/2015 | Kim et al. | |
| 2015/0381255 A1 | 12/2015 | Kuo | |
| 2016/0301515 A1* | 10/2016 | Ouchi | H04L 5/0057 |
| 2018/0019855 A1* | 1/2018 | Zhang | H04L 1/0026 |
| 2018/0020503 A1 | 1/2018 | Deenoo et al. | |
| 2018/0034525 A1 | 2/2018 | Park et al. | |
| 2018/0115357 A1 | 4/2018 | Park et al. | |
| 2018/0124687 A1 | 5/2018 | Park et al. | |
| 2018/0124822 A1 | 5/2018 | Wang et al. | |
| 2018/0132266 A1 | 5/2018 | Chen et al. | |
| 2018/0139787 A1 | 5/2018 | Islam et al. | |
| 2018/0167967 A1* | 6/2018 | Li | H04W 72/1289 |
| 2018/0176937 A1 | 6/2018 | Chen et al. | |
| 2018/0205516 A1 | 7/2018 | Jung et al. | |
| 2018/0206219 A1* | 7/2018 | Chen | H04W 48/20 |
| 2018/0227805 A1 | 8/2018 | Jang et al. | |
| 2018/0242307 A1 | 8/2018 | Chen et al. | |
| 2018/0249460 A1 | 8/2018 | Seo et al. | |
| 2018/0270713 A1 | 9/2018 | Park et al. | |
| 2018/0278383 A1 | 9/2018 | Kim et al. | |
| 2019/0037577 A1 | 1/2019 | Sun et al. | |
| 2019/0104477 A1 | 4/2019 | MolavianJazi et al. | |
| 2019/0132882 A1 | 5/2019 | Li et al. | |
| 2019/0141677 A1 | 5/2019 | Harrison et al. | |
| 2020/0029352 A1* | 1/2020 | Aiba | H04W 72/14 |
| 2020/0280996 A1* | 9/2020 | Yang | H04W 72/042 |

FOREIGN PATENT DOCUMENTS

| | | |
|---|---|---|
| WO | 2017161590 A1 | 9/2017 |
| WO | 2017196243 A1 | 11/2017 |
| WO | 2018029382 A1 | 2/2018 |
| WO | 2018084544 A1 | 5/2018 |
| WO | 2018144155 A1 | 8/2018 |

OTHER PUBLICATIONS

May 13, 2019—European Search Report—19151142.7.
Huawei et al: "Independent and joint control of CSI-RS transmission and CSI reporting for NR MIMO", Jan. 16, 2017.
Huawei Hisilicon: "Independent and joint control of CSI-RS transmission and CSI reporting for NR MIMO", Nov. 13, 2016.
R1-1709016 3GPP TSG RAN WG1 Meeting #89, Hangzhou, China, May 15-19, 2017, Source: InterDigital Inc., Title: Control Channels Monitoring with Multiple CORESETs.
R1-1714117 3GPP TSG RAN WG1 Meeting #90, Prague, Czech Republic, Aug. 21-25, 2017, Source: InterDigital Inc., Title: Remaining details of BWP.
R2-1802001 3GPP TSG RAN WG2 Meeting #101, Athens, Greece, Feb. 26-Mar. 2, 2018, Source: vivo, Title: Restart Scell inactive timer due to configuration grant.
R1-142925 3GPP TSG RAN WG1 Meeting #78, Dresden, Germany, Aug. 18-22, 2014, Source: Fujitsu, Title: Discussion of on/off transitions and related procedures.
Oct. 18, 2019—European Extended Search Report—EP 19187310.8.
R1-1721027 3GPP TSG RAN WG1 Meeting #91, Reno, USA, Nov. 27-Dec. 1, 2017, Source: Ericsson, Title: On Carrier aggregation related aspects.
R1-1721028 3GPP TSG RAN WG1 Meeting #91, Reno, USA, Nov. 27-Dec. 1, 2017, Source: Ericsson, Title: Remaining issues for NR power control framework.
R1-1721030 3GPP TSG RAN WG1 Meeting #91, Reno, USA, Nov. 27-Dec. 1, 2017, Source: Ericsson, Title: Power headroom reporting.
R1-1721031 3GPP TSG RAN WG1 Meeting #91, Reno, USA, Nov. 27-Dec. 1, 2017, Source: Ericsson, Title: Remaining issues of closed loop power control in NR.
R1-1721032 3GPP TSG RAN WG1 Meeting #91, Reno, USA, Nov. 27-Dec. 1, 2017, Source: Ericsson, Title: Remaining issues of PUSCH power control.
R1-1721033 3GPP TSG RAN WG1 Meeting #91, Reno, USA, Nov. 27-Dec. 1, 2017, Source: Ericsson, Title: Remaining issues of PUCCH power control.
R1-1721034 3GPP TSG RAN WG1 Meeting #91, Reno, USA, Nov. 27-Dec. 1, 2017, Source: Ericsson, Title: Remaining issues of SRS power control.
R1-1721038 3GPP TSG RAN WG1 Meeting #91, Reno, USA, Nov. 27-Dec. 1, 2017, Source: Nokia, Nokia Shanghai Bell, Title: Remaining details on NR power control framework.
3GPP TS 38.212 V1.2.1 (Dec. 2017), Technical Specification, 3rd Generation Partnership Project; Technical Specification Group Radio Access Network; NR; Multiplexing and Channel Coding (Release 15).
R1-1721371 3GPP TSG RAN WG1 Meeting #91, Reno, USA, Nov. 27-Dec. 1, 2017, Source: ZTE, Sanechips, Title: Summary of remaining issues on CSI measurement.
R1-1721451 3GPP TSG RAN WG1 Meeting #91, Reno, USA, Nov. 27-Dec. 1, 2017, Source: Ericsson, Title: Summary of views on CSI reporting.
R1-1800879 3GPP TSG RAN WG1 NR Ad Hoc, Vancouver, Canada, Jan. 22-26, 2018, Source: Qualcomm Incorporated. Title: Remaining Issues on BWP.

(56) References Cited

OTHER PUBLICATIONS

R1-1803301 3GPP TSG RAN WG1 Meeting #92, Athens, Greece, Feb. 26-Mar. 2, 2018, Source: Ericsson, Title: Summary of CSI reporting v3.
R2-1706680 3GPP TSG-RAN WG2 NR Ad Hoc, Qingdao, China, Jun. 27-30, 2017, Source: AT&T, Title: Beam Failure Recovery Mechanism and RLF.
R2-1713170 3GPP TSG RAN WG2 Meeting #100, Reno, USA, Nov. 27-Dec. 1, 2017, Source: Nokia (rapporteur), Title: Report of [99bis#32][LTE/euCA] Faster activation for Scells (Nokia).
R2-1714289 3GPP TSG RAN WG2 Meeting #100, Reno, USA, Nov. 27-Dec. 1, 2017, Source: Nokia, Nokia Shanghai Bell, Title: Running CR for euCA Stage-2.
R2-1801432 3GPP TSG RAN WG2 NR Ad Hoc, Vancouver, Canada, Jan. 22-26, 2018, Source: Qualcomm Incorporated, Title: Dormant BWP for fast SCell activation.
R2-1802756 3GPP TSG RAN WG2 Meeting #101, Athens, Greece, Feb. 26-Mar. 2, 2018, Source: Nokia, Nokia Shanghai Bell, Title: Remaining details on temporary CQI reporting during activation.
R2-1803564 3GPP TSG RAN WG2 Meeting #101, Athens, Greece, Feb. 26-Mar. 2, 2018, Source: Qualcomm Incorporated, Title: Dormant BWP for fast SCell activation.
R2-1806774 3GPP TSG RAN WG2 Meeting #102, Busan, Korea, May 21-25, 2018, Source: Nokia, Nokia Shanghai Bell, Title: Finalization of dormant Scell state.
R2-1806924 3GPP TSG RAN WG2 Meeting #102, Busan, Korea, May 21-25, 2018, Source: Qualcomm Incorporated, Title: SCell Dormant State Transitions based on New Timers & MAC-CEs.
R2-1807481 3GPP TSG RAN WG2 Meeting #102, Busan, Korea, May 21-25, 2018, Source: Huawei, HiSilicon, Title: Remaining issues of temporary CQI reporting.
R2-1808570 3GPP TSG RAN WG2 Meeting #102, Busan, Korea, May 21-25, 2018, Source: Qualcomm Incorporated, Title: Dormant BWP for fast SCell activation.
R2-1808809 3GPP TSG RAN WG2 Meeting #102, Busan, Korea, May 21-25, 2018, Source: Ericsson, Title: CR on Dormat SCell state transition MAC CE.
R2-1810063 3GPP TSG RAN WG2 NR Ad Hoc, Busan, Korea, Jul. 2-6, 2018, Source: Ericsson, Title: Dormant SCell state in NR.
3GPP TSG-RAN WG2 NR Ad Hoc, Qingdao, China, Jun. 27-30, 2017, Source: RAN2 Chairman (Intel), Title: Chairman Notes.
3GPP TS 38.211 V2.0.0 (Dec. 2017), Technical Specification, 3rd Generation Partnership Project; Technical Specification Group Radio Access Network; NR; Physical Channels and Modulation (Release 15).
3GPP TS 38.214 V2.0.0 (Dec. 2017), Technical Specification, 3rd Generation Partnership Project; Technical Specification Group Radio Access Network; NR; Physical Layer Procedures for Data (Release 15).
3GPP TS 38.331 V1.0.0 (Dec. 2017), Technical Specification, 3rd Generation Partnership Project; Technical Specification Group Radio Access Network; NR; Radio Resource Control (RRC) Protocol Specification (Release 15).
RP-181344 3GPP TSG RAN Meeting #80, La Jolla, USA, Jun. 11-14, 2018, Source: Ericsson, Nokia, Nokia Shanghai Bell, Huawei, Title: New WID on MR-DC enhancements (NR_MRDC_Enh).
3GPP TS 38.331 V0.4.0 (Dec. 2017), Technical Specification, 3rd Generation Partnership Project; Technical Specification Group Radio Access Network; NR; Radio Resource Control (RRC) Protocol Specification (Release 15).
R1-18xxxx 3GPP TSG RAN WG1 Meeting #95, Spokane, USA, Nov. 12-16, 2018, Source: OPPO, Title: Summary of RAN1#95 Tdocs on UCI enhancements for URLLC.
3GPP TS 38.213 V15.2.0 (Jun. 2018), Technical Specification, 3rd Generation Partnership Project; Technical Specification Group Radio Access Network; NR; Physical layer procedures for control (Release 15).
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
Lagent, et al., "New Radio Beam-Based Access to Unlicensed Spectrum: Design Challenges and Solutions," InterDigital Communications, Inc., Melville, New York, USA, Sep. 27, 2018.
R1-1701260 3GPP TSG RAN WG1 NR Ad Hoc, Spokane, USA, Jan. 16-20, 2017, Source: ZTE, ZTE Microelectronics, Title: WF on 2-step RACH.
R1-1613547 3GPP TSG RAN WG1 Metting #87, Reno, USA, Nov. 14-18, 2016, Source: Nokia, InterDigital, Title: Way Forward on Two-Step RACH Fallback.
R1-1613548 3GPP TSG RAN WG1 Metting #87, Reno, USA, Nov. 14-18, 2016, Source: Nokia, Title: Way Forward on Two-Step RACH Procedure.
R1-1613685 3GPP TSG RAN WG1 Metting #87, Reno, USA, Nov. 14-18, 2016, Source: Nokia, ASB, MediaTek, Ericson, Title: Way Forward on Two-Step RACH Procedure.
R1-1611274 3GPP TSG RAN WG1 Metting #87, Reno, USA, Nov. 14-18, 2016, Source: ZTE Corporation, ZTE Microelectronics, Title: On 2-Step RACH Procedure in NR.
R1-1611694 3GPP TSG RAN WG1 Metting #87, Reno, USA, Nov. 14-18, 2016, Source: Huawei, HiSilicon, Title: Considerations on NR RACH Preamble and Channel Design.
R1-1612033 3GPP TSG RAN WG1 Metting #87, Reno, USA, Nov. 14-18, 2016, Source: Qualcomm Incorporated, Title: 2 step and 4 step RACH.
R1-1612068 3GPP TSG RAN WG1 Metting #87, Reno, USA, Nov. 14-18, 2016, Source: Qualcomm Incorporated, Title: UE Power Evaluation for DRX with Wake-Up Signaling.
R1-1612142 3GPP TSG RAN WG1 Metting #87, Reno, USA, Nov. 14-18, 2016, Source: MediaTek Inc., Title: Considerations on 2-step RACH physical channel design.
R1-1612218 3GPP TSG RAN WG1 Metting #87, Reno, USA, Nov. 14-18, 2016, Source: ETRI, Title: On 2-step RACH procedure for high speed train scenario for NR.
R1-1612299 3GPP TSG RAN WG1 Metting #87, Reno, USA, Nov. 14-18, 2016, Source: Nokia, Alcatel-Lucent Shanghai Bell, Title: Random access principles for new radio.
R1-1700035 3GPP TSG RAN WG1 NR Ad Hoc, Spokane, USA, Jan. 16-20, 2017, Source: Huawei, HiSilicon, Title: Further Consideration on two-step RACH.
R1-1700105 3GPP TSG RAN WG1 NR Ad Hoc, Spokane, USA, Jan. 16-20, 2017, Source: ZTE, ZTE Microelectronics, Title: 2-step Random Access Procedure.
R1-1700172 3GPP TSG RAN WG1 NR Ad Hoc, Spokane, USA, Jan. 16-20, 2017, Source: MediaTek Inc., Title: On 2-step random access procedure and physical channel in NR.
R1-1810154 3GPP TSG RAN WG1 Meeting #94bis, Chengdu, China, Oct. 8-12, 2018, Source: Huawei, HiSilicon, Title: Power consumption reduction based on time/frequency/antenna adaptation.
R1-1810338 3GPP TSG RAN WG1 Meeting #94bis, Chengdu, China, Oct. 8-12, 2018, Source: ZTE, Title: Consideration on UE adaptation to the tralic and UE power consumption characteristics.
R1-1810413 3GPP TSG RAN WG1 Meeting #94bis, Chengdu, China, Oct. 8-12, 2018, Source: vivo, Title: Techniques on UE adaptation to the traffic and UE power consumption characteristics.
R1-1810448 3GPP TSG RAN WG1 Meeting #94bis, Chengdu, China, Oct. 8-12, 2018, Source: MediaTek Inc., Title: UE adaptation to the traffic and UE power consumption characteristics.
R1-1810468 3GPP TSG RAN WG1 Meeting #94bis, Chengdu, China, Oct. 8-12, 2018, Source: Panasonic, Title: Discussion on UE traffic adaptation and power consumption characteristics.
R1-1810562 3GPP TSG RAN WG1 Meeting #94bis, Chengdu, China, Oct. 8-12, 2018, Source: CATT, Title: UE Power Saving Scheme with Multi-dimensional Adaptation.

(56) References Cited

OTHER PUBLICATIONS

R1-1810795 3GPP TSG RAN WG1 Meeting #94bis, Chengdu, China, Oct. 8-12, 2018, Source: Intel Corporation, Title: UE Adaptation to the traffic and UE power consumption characteristics.
R1-1810892 3GPP TSG RAN WG1 Meeting #94bis, Chengdu, China, Oct. 8-12, 2018, Source: Samsung, Title: Discussion on UE adaptation schemes.
R1-1811050 3GPP TSG RAN WG1 Meeting #94bis, Chengdu, China, Oct. 8-12, 2018, Source: CMCC, Title: Considerations for UE power saving.
R1-1811127 3GPP TSG RAN WG1 Meeting #94bis, Chengdu, China, Oct. 8-12, 2018, Source: Apple Inc., Title: Network-indication based Approaches for UE Power Saving.
R1-1812232 3GPP TSG RAN WG1 Meeting #95, Spokane, USA, Nov. 12-16, 2018, Source: Huawei, HiSilicon, Title: Design of power saving signal.
R1-1812331 3GPP TSG RAN WG1 Meeting #95, Spokane, USA, Nov. 12-16, 2018, Source: vivo, Title: Discussion on triggering adaptation of UE power consumption characteristics.
R1-1812362 3GPP TSG RAN WG1 Meeting #95, Spokane, USA, Nov. 12-16, 2018, Source: MediaTek Inc., Title: Triggering adaptation for UE power saving.
R1-1812422 3GPP TSG RAN WG1 Meeting #95, Spokane, USA, Nov. 12-16, 2018, Source: ZTE, Title: Considerations on triggering for UE power saving.
R1-1812514 3GPP TSG RAN WG1 Meeting #95, Spokane, USA, Nov. 12-16, 2018, Source: Intel Corporation, Title: Triggering UE adaptation to power consumption characteristics.
R1-1812591 3GPP TSG RAN WG1 Meeting #95, Spokane, USA, Nov. 12-16, 2018, Source: LG Electronics, Title: Discussion on power saving for CA operation.
R1-1812642 3GPP TSG RAN WG1 Meeting #95, Spokane, USA, Nov. 12-16, 2018, Source: CATT, Title: UE Power saving schemes with power saving signal/channel/procedures.
R1-1812750 3GPP TSG RAN WG1 Meeting #95, Spokane, USA, Nov. 12-16, 2018, Source: Sony, Title: Conditions and procedures for adaptation of power consumption characteristics.
R1-1812825 3GPP TSG RAN WG1 Meeting #95, Spokane, USA, Nov. 12-16, 2018, Source: OPPO, Title: Triggering Adaptation of UE Power Consumption Characteristics.
R1-1812890 3GPP TSG RAN WG1 Meeting #95, Spokane, USA, Nov. 12-16, 2018, Source: CMCC, Title: Considerations on power saving signal design.
R1-1812926 3GPP TSG RAN WG1 Meeting #95, Spokane, USA, Nov. 12-16, 2018, Source: Apple Inc., Title: Power Saving Techniques based on Explicit Indication.
R1-1813012 3GPP TSG RAN WG1 Meeting #95, Spokane, USA, Nov. 12-16, 2018, Source: Samsung, Title: Triggering adaptation schemes.
R1-1813076 3GPP TSG RAN WG1 Meeting #95, Spokane, USA, Nov. 12-16, 2018, Source: Spreadtrum Communications, Title: Discussion on triggering adaptation for UE power saving.
R1-1813183 3GPP TSG RAN WG1 Meeting #95, Spokane, USA, Nov. 12-16, 2018, Source: Ericsson, Title: Triggers of NR UE power saving.
R1-1813244 3GPP TSG RAN WG1 Meeting #95, Spokane, USA, Nov. 12-16, 2018, Source: InterDigital, Inc., Title: Discussion on Triggering of Power Mode Adaptation.
R1-1813448 3GPP TSG RAN WG1 Meeting #95, Spokane, USA, Nov. 12-16, 2018, Source: Qualcomm Incorporated. Title: Triggering Adaptation of UE Power Consumption Characteristics.
R1-1813495 3GPP TSG RAN WG1 Meeting #95, Spokane, USA, Nov. 12-16, 2018, Source: Panasonic, Title: Discussion on UE traffic adaptation procedures.
R1-1813516 3GPP TSG RAN WG1 Meeting #95, Spokane, USA, Nov. 12-16, 2018, Source: ASUSTeK, Title: Triggering adaptation of UE power consumption.
R1-1813621 3GPP TSG RAN WG1 Meeting #95, Spokane, USA, Nov. 12-16, 2018, Source: Nokia, Nokia Shanghai Bell, Title: On UE PowerSaving Triggering Mechanisms.
R1-1813625 3GPP TSG RAN WG1 Meeting #95, Spokane, USA, Nov. 12-16, 2018, Source: Convida Wireless, Title: Triggering Adaptation of UE Power Consumption Characteristics.
R2-1700019 3GPP TSG RAN WG2 NR Ad Hoc, Spokane, USA, Jan. 17-19, 2017, Source: Samsung, Title: Random Access in NR—Flexible UE Bandwidth Aspects.
R2-1700023 3GPP TSG RAN WG2 NR Ad Hoc, Spokane, USA, Jan. 17-19, 2017, Source: ASUSTeK, Title: Consideration on use cases of 2-step RACH procedure.
R2-1700024 3GPP TSG RAN WG2 NR Ad Hoc, Spokane, USA, Jan. 17-19, 2017, Source: ASUSTeK, Title: Consideration on fallback of 2-step RACH procedure.
R2-1700089 3GPP TSG RAN WG2 NR Ad Hoc, Spokane, USA, Jan. 17-19, 2017, Source: Huawei, HiSilicon, Title: Considerations on RACH procedure in NR.
R2-1700103 3GPP TSG RAN WG2 NR Ad Hoc, Spokane, USA, Jan. 17-19, 2017, Source: National Instruments, Title: Considerations on the Random-Access Procedure in Massive MIMO NR.
R2-1700137 3GPP TSG RAN WG2 NR Ad Hoc, Spokane, USA, Jan. 17-19, 2017, Source: Sony, Title: 2-step RACH to 4-step RACH fallback.
R2-1700155 3GPP TSG RAN WG2 NR Ad Hoc, Spokane, USA, Jan. 17-19, 2017, Source: ZTE, ZTE Microelectronics, Title: Consideration on the two-step RACH in NR.
R2-1700202 3GPP TSG RAN WG2 NR Ad Hoc, Spokane, USA, Jan. 17-19, 2017, Source: CATT, Title: Design principles for random access procedure in NR.
R2-1700203 3GPP TSG RAN WG2 NR Ad Hoc, Spokane, USA, Jan. 17-19, 2017, Source: CATT, Title: Random access procedure in NR.
R2-1700204 3GPP TSG RAN WG2 NR Ad Hoc, Spokane, USA, Jan. 17-19, 2017, Source: CATT, Title: Impact of NR physical layer design on RA.
R2-1700205 3GPP TSG RAN WG2 NR Ad Hoc, Spokane, USA, Jan. 17-19, 2017, Source: CATT, Title: Consideration on 2-step RA.
R2-1700237 3GPP TSG RAN WG2 NR Ad Hoc, Spokane, USA, Jan. 17-19, 2017, Source: InterDigital Communications, Title: 2-Step Random Access Procedure in NR.
R2-1700335 3GPP TSG RAN WG2 NR Ad Hoc, Spokane, USA, Jan. 17-19, 2017, Source: Intel Corporation, Title: Further considerations of random access in NR.
R2-1700355 3GPP TSG RAN WG2 NR Ad Hoc, Spokane, USA, Jan. 17-19, 2017, Source: ASUSTeK, Title: Discussion on latency of random access in NR.
R2-1700356 3GPP TSG RAN WG2 NR Ad Hoc, Spokane, USA, Jan. 17-19, 2017, Source: ASUSTeK, MediaTek Inc., Title: Consideration on use cases of 2-step RACH procedure.
R2-1700357 3GPP TSG RAN WG2 NR Ad Hoc, Spokane, USA, Jan. 17-19, 2017, Source: Samsung, Title: Consideration on 2-step RACH.
R2-1700619 3GPP TSG RAN WG2 NR Ad Hoc, Spokane, USA, Jan. 17-19, 2017, Source: NTT Docomo, Inc., Title: Remaining RAN2 aspects on random access procedure for NR.
R2-1814940 3GPP TSG RAN WG2 Meeting #103bis, Chengdu, China, Oct. 8-12, 2018, Source: Nokia, Nokia Shanghai Bell, Title: Correction to preamble power ramping.
R2-1815281 3GPP TSG RAN WG2 Meeting #103bis, Chengdu, China, Oct. 8-12, 2018, Source: LG Electronics Inc., Title: Remaining issue with Power Ramping Counter.
RP-181463 3GPP TSG RAN Meeting #80, La Jolla, USA, Jun. 11-14, 2018, Source: CATT, CMCC, vivo, CATR, Qualcomm, MediaTek, Title: New SID: Study on UE Power Saving in NR.
U.S. Appl. No. 16/240,412, filed Jan. 4, 2019, Methods and Systems for Information Reporting.
U.S. Appl. No. 16/244,917, filed Jan. 10, 2019, Power Control for Channel State Information.
U.S. Appl. No. 16/516,970, filed Jul. 19, 2019, Resource Management for Wireless Communications Using a Power Saving State.
U.S. Appl. No. 16/577,847, filed Sep. 20, 2019, Activation and Deactivation of Power Saving Operation.
U.S. Appl. No. 16/586,515, filed Sep. 27, 2019, Power Control for Retransmissions.
Mar. 25, 2019—European Search Report—EP 19150331.7.

(56) References Cited

OTHER PUBLICATIONS

Jan. 1, 2018—3GPP Standard; 3GPP TS 38.331—3rd Generation Partnership Project; Technical Specification Gorup Radio Access Network; NR; Radio Resource Control (RRC) Protocol specific (Release 15).
Sep. 17, 2017—3GPP TSG-RAN WG1 NR Ad Hoc #3—Ericsson "On semi-persistent CSI reporting on PUSCH".
3GPP TS 36.211 V14.4.0 (Sep. 2017), Technical Specification, 3rd Generation Partnership Project; Technical Specification Group Radio Access Network; Evolved Universal Terrestrial Radio Access (E-UTRA); Physical Channels and Modulation (Release 14).
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TS 36.212 V14.4.0 (Sep. 2017), Technical Specification, 3rd Generation Partnership Project; Technical Specification Group Radio Access Network; Evolved Universal Terrestrial Radio Access (E-UTRA); Multiplexing and Channel Coding (Release 14).
3GPP TS 36.213 V14.4.0 (Sep. 2017), Technical Specification, 3rd Generation Partnership Project; Technical Specification Group Radio Access Network; Evolved Universal Terrestrial Radio Access (E-UTRA); Physical Layer Procedures (Release 14).
3GPP TS 36.300 V14.4.0 (Sep. 2017), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14).
3GPP TS 36.321 V14.4.0 (Sep. 2017), Technical Specification, 3rd Generation Partnership Project; Technical Specification Group Radio Access Network; Evolved Universal Terrestrial Radio Access (E-UTRA); Medium Access Control (MAC) protocol Specification (Release 14).
3GPP TS 38.212 V15.0.0 (Dec. 2017), Technical Specification, 3rd Generation Partnership Project; Technical Specification Group Radio Access Network; NT; Multiplexing and Channel Coding (Release 15).
3GPP TS 38.213 V2.0.0 (Dec. 2017), Technical Specification, 3rd Generation Partnership Project; Technical Specification Group Radio Access Network; NR; Physical Layer Procedures for Control (Release 15).
3GPP TS 38.300 V2.0.0 (Dec. 2017), Technical Specification, 3rd Generation Partnership Project; Technical Specification Group Radio Access Network; NR; NR and NG-RAN Overall Description; Stage 2 (Release 15).
3GPP TS 38.321 V2.0.0 (Dec. 2017), Technical Specification, 3rd Generation Partnership Project; Technical Specification Group Radio Access Network; NR; Medium Access Control (MAC) Protocol Specification (Release 15).
3GPP TS 38.331 V15.0.0 (Dec. 2017), Technical Specification, 3rd Generation Partnership Project; Technical Specification Group Radio Access Network; NR; Radio Resource Control (RRC) Protocol Specification (Release 15).
3GPP TSG RAN WG1 Meeting #90bis, Prague, Czech Republic, Oct. 9-13, 2017, Title: RAN1 Chairman's Notes.
3GPP TS 38.213 V1.2.1 (Dec. 2017), Technical Specification, 3rd Generation Partnership Project; Technical Specification Group Radio Access Network; NR; Physical Layer Procedures for Control (Release 15).
3GPP TS 38.214 V1.2.1 (Dec. 2017), Technical Specification, 3rd Generation Partnership Project; Technical Specification Group Radio Access Network; NR; Physical Layer Procedures for Data (Release 15).
R2-180xxxx 3GPP TSG RAN WG2 Meeting #101, Sanya, China, Apr. 16-20, 2018, Source: Nokia, Nokia Shanghai Bell, Title: Running MAC CR for euCA.
R1-1803571 3GPP TSG RAN WG1 Meeting #92bis, Sanya, China, Apr. 16-20, 2018, Source: MCC Support, Title: Final Report of 3GPP TSG RAN WG1 #92 v1.0.0.

R1-1721510 3GPP TSG RAN WG1 Meeting #91, Reno, USA, Nov. 27-Dec. 1, 2017, Source: NTT Docomo, Inc., Title: Offline summary for AI 7.3.3.4 UL data transmission procedure.
R1-1709907 3GPP TSG-RAN WG1 NR Ad Hoc, Qingdao, China, Jun. 27-30, 2017, Source: Xinwei, Title: Discussion on Beam Failure Recovery.
R1-1709929 3GPP TSG-RAN WG1 NR Ad Hoc, Qingdao, China, Jun. 27-30, 2017, Source: Huawei, HiSilicon, Title: General views on beam failure recovery.
R1-1710058 3GPP TSG-RAN WG1 NR Ad Hoc, Qingdao, China, Jun. 27-30, 2017, Source: CATT, Title: Considerations on DL beam failure and recovery.
R1-1710283 3GPP TSG-RAN WG1 NR Ad Hoc, Qingdao, China, Jun. 27-30, 2017, Source: LG Electronics, Title: Discussion on beam failure recovery.
R1-1710400 3GPP TSG-RAN WG1 NR Ad Hoc, Qingdao, China, Jun. 27-30, 2017, Source: vivo, Title: Beam failure recovery procedure.
R1-1710596 3GPP TSG-RAN WG1 NR Ad Hoc, Qingdao, China, Jun. 27-30, 2017, Source: Lenovo, Motorola Mobility, Title: Discussion of beam recovery procedure.
R1-1710810 3GPP TSG-RAN WG1 NR Ad Hoc, Qingdao, China, Jun. 27-30, 2017, Source: MediaTek Inc., Title: Mechanism for flexible beam failure recovery.
R1-1710926 3GPP TSG-RAN WG1 NR Ad Hoc, Qingdao, China, Jun. 27-30, 2017, Source: InterDigital, Inc., Title: On Remaining Details of Beam Failure Recovery.
R1-1711017 3GPP TSG-RAN WG1 NR Ad Hoc, Qingdao, China, Jun. 27-30, 2017, Source: Ericsson, Title: Mechanism to recover from beam failure.
R1-1711291 3GPP TSG-RAN WG1 NR Ad Hoc, Qingdao, China, Jun. 27-30, 2017, Source: Nokia, Alcatel-Lucent Shanghai Bell, Title: Beam Recovery.
R1-1712153 3GPP TSG RAN WG1 Meeting #90, Prague, Czech Republic, Aug. 21-25, 2017, Source: Huawei, HiSilicon, Title: Overview of bandwidth part.
R1-1713204 3GPP TSG RAN WG1 Meeting #90, Prague, Czech Republic, Aug. 21-25, 2017, Source: LG Electronics, Title: Further remaining details on wider bandwidth operation.
R1-1713978 3GPP TSG RAN WG1 Meeting #90, Prague, Czech Republic, Aug. 21-25, 2017, Source: MediaTek Inc., Title: Further Details on Bandwidth Part Operation in NR.
R1-1715439 3GPP TSG RAN WG1 Meeting NR Ad Hoc, Nagoya, Japan, September 18-21, 2017, Source: ZTE, Sanechips, Title: Remaining details on CSI reporting.
R1-1715858 3GPP TSG RAN WG1 Meeting NR Ad Hoc, Nagoya, Japan, Sep. 18-21, 2017, Source: LG Electronics, Title: Discussions on CSI reporting.
R1-1715939 3GPP TSG RAN WG1 Meeting NR Ad Hoc, Nagoya, Japan, Sep. 18-21, 2017, Source: Samsung, Title: CSI reporting and UCI multiplexing.
R1-1716349 3GPP TSG RAN WG1 Meeting NR Ad Hoc, Nagoya, Japan, Sep. 18-21, 2017, Source: Ericsson, Title: On CSI reporting.
R1-1716357 3GPP TSG RAN WG1 Meeting NR Ad Hoc, Nagoya, Japan, Sep. 18-21, 2017, Source: Ericsson, Title: On semi-persistent CSI reporting on PUSCH.
R1-1716901 3GPP TSG RAN WG1 Meeting NR Ad Hoc, Nagoya, Japan, Sep. 18-21, 2017, Source: Samsung, Ericsson, Huawei, HiSilicon, ZTE, Sanechips, Mediatek, NTT Docomo, Nokia, Nokia Shanghai Bell, KDDI, Vodafone CEWiT, IITH, IITM, Tejas Networks, Verizon, Deutsche Telekom, Softbank, CHTTL, NEC, WILUS, Sharp, China Unicom, ITL, KRRI, CMCC, ASTRI, KT Corporation, BT, Sprint, LG Electronics, AT&T, Title: WF for Open Issues on CSI Reporting.
R1-1717300 3GPP TSG RAN WG1 Meeting #90bis, Prague, Czech Republic, Oct. 9-13, 2017, Source: Huawei, HiSilicon, Title: Details of CSI reporting on PUCCH/PUSCH.
R1-1717367 3GPP TSG RAN WG1 Meeting #90bis, Prague, Czech Republic, Oct. 9-13, 2017, Source: Intel Corporation, Title: Remaining issues on CSI reporting.
R1-1717423 3GPP TSG RAN WG1 Meeting #90bis, Prague, Czech Republic, Oct. 9-13, 2017, Source: ZTE, Sanechips, Title: Remaining details on CSI reporting.

(56) References Cited

OTHER PUBLICATIONS

R1-1717471 3GPP TSG RAN WG1 Meeting #90bis, Prague, Czech Republic, Oct. 9-13, 2017, Source: vivo, Title: Discussion on CSI reporting.
R1-1717604 3GPP TSG RAN WG1 Meeting #90bis, Prague, Czech Republic, Oct. 9-13, 2017, Source: Samsung, Title: CSI reporting and UCI multiplexing.
R1-1717811 3GPP TSG RAN WG1 Meeting #90bis, Prague, Czech Republic, Oct. 9-13, 2017, Source: CATT, Title: Remaining issues on CSI reporting.
R1-1717940 3GPP TSG RAN WG1 Meeting #90bis, Prague, Czech Republic, Oct. 9-13, 2017, Source: LG Electronics, Title: Discussions on CSI reporting.
R1-1718191 3GPP TSG RAN WG1 Meeting #90bis, Prague, Czech Republic, Oct. 9-13, 2017, Source: NTT Docomo, Inc., Title: Remaining Issues on Feedback Design for CSI Type I and Type II.
R1-1718337 3GPP TSG RAN WG1 Meeting #90bis, Prague, Czech Republic, Oct. 9-13, 2017, Source: MediaTek, Inc., Title: Remaining details for CSI reporting.
R1-1718432 3GPP TSG RAN WG1 Meeting #90bis, Prague, Czech Republic, Oct. 9-13, 2017, Source: Ericsson, Title: On remaining details of CSI reporting.
R1-1718442 3GPP TSG RAN WG1 Meeting #90bis, Prague, Czech Republic, Oct. 9-13, 2017, Source: Ericsson, Title: On semi-persistent CSI reporting on PUSCH.
Jan. 17, 2020—European Extended Search Report—EP 19198650.4.
R1-1700186 3GPP TSG RAN WG1 NR Ad Hoc, Spokane, USA, Jan. 16-20, 2017, Source: CATT, Title: Further considerations on a 2-step RA Procedure.
R1-1700300 3GPP TSG RAN WG1 NR Ad Hoc, Spokane, USA, Jan. 16-20, 2017, Source: Ericsson, Title: NR two-step random access procedure.
R1-1700311 3GPP TSG RAN WG1 NR Ad Hoc, Spokane, USA, Jan. 16-20, 2017, Source: AT&T, Title: 2-Step RA Procedure for NR.
R1-1700426 3GPP TSG RAN WG1 NR Ad Hoc, Spokane, USA, Jan. 16-20, 2017, Source: ITRI, Title: Discussion on 2-step RA procedure issues.
R1-1700464 3GPP TSG RAN WG1 NR Ad Hoc, Spokane, USA, Jan. 16-20, 2017, Source: LG Electronics, Title: Discussion on 2 step RACH.
R1-1700577 3GPP TSG RAN WG1 NR Ad Hoc, Spokane, USA, Jan. 16-20, 2017, Source: ETRI, Title: On 2-step RA procedure for NR.
R1-1700587 3GPP TSG RAN WG1 NR Ad Hoc, Spokane, USA, Jan. 16-20, 2017, Source: HTC, Title: Design considerations for 2-step RACH.
R1-1700652 3GPP TSG RAN WG1 NR Ad Hoc, Spokane, USA, Jan. 16-20, 2017, Source: Nokia, Alcatel-Lucent Shanghai Bell, Title: On 2-step Random Access Procedure.
R1-1700668 3GPP TSG RAN WG1 NR Ad Hoc, Spokane, USA, Jan. 16-20, 2017, Source: Sony, Title: Discussions on 2 Steps RACH Procedure.
R1-1700703 3GPP TSG RAN WG1 NR Ad Hoc, Spokane, USA, Jan. 16-20, 2017, Source: InterDigital Communications, Title: 2-step random access procedure.
R1-1700792 3GPP TSG RAN WG1 NR Ad Hoc, Spokane, USA, Jan. 16-20, 2017, Source: Qualcomm Incorporated, Title: 2-step RACH procedure consideration.
R1-1700880 3GPP TSG RAN WG1 NR Ad Hoc, Spokane, USA, Jan. 16-20, 2017, Source: Motorola Mobility, Title: Physical channel design for 2-step RACH.
R1-1700892 3GPP TSG RAN WG1 NR Ad Hoc, Spokane, USA, Jan. 16-20, 2017, Source: Samsung, Title: NR 2-step random access procedure.
R1-1701275 3GPP TSG RAN WG1 NR Ad Hoc, Spokane, USA, Jan. 16-20, 2017, Source: ZTE, ZTE Microelectronics, MediaTek, Title: WF on 2-Step RACH.
R1-1703139 3GPP TSG RAN WG1 Meeting #88, Athens, Greece, Feb. 13-17, 2017, Source: Sony, Title: Wake Up Radio for NR.
R1-1704282 3GPP TSG RAN WG1 Meeting #88bis, Spokane, USA, Apr. 3-7, 2017, Source: Huawei, HiSilicon, Title: Considerations on 'wake-up signal' for eFeMTC.
R1-1704290 3GPP TSG RAN WG1 Meeting #88bis, Spokane, USA, Apr. 3-7, 2017, Source: Huawei, HiSilicon, Title: On 'wake-up signal' for paging and connected-mode DRX.
R1-1704531 3GPP TSG RAN WG1 Meeting #88bis, Spokane, USA, Apr. 3-7, 2017, Source: CATT, Title: UE Wakeup Mechanism and On-Demand Access for efeMTC UE Power Saving.
R1-1704532 3GPP TSG RAN WG1 Meeting #88bis, Spokane, USA, Apr. 3-7, 2017, Source: CATT, Title: UE Wakeup Mechanism and On-Demand Access for fNB-IoT UE Power Saving.
R1-1704693 3GPP TSG RAN WG1 Meeting #88bis, Spokane, USA, Apr. 3-7, 2017, Source: Intel Corporation, Title: DL Power Consumption Reduction for efeMTC.
R1-1704698 3GPP TSG RAN WG1 Meeting #88bis, Spokane, USA, Apr. 3-7, 2017, Source: Intel Corporation, Title: DL Power Consumption Reduction for feNB-IoT.
R1-1704845 3GPP TSG RAN WG1 Meeting #88bis, Spokane, USA, Apr. 3-7, 2017, Source: LG Electronics, Title: UE power consumption reduction by new physical channel in MTC.
R1-1704847 3GPP TSG RAN WG1 Meeting #88bis, Spokane, USA, Apr. 3-7, 2017, Source: LG Electronics, Title: UE power consumption reduction by new physical channel in NB-IoT.
R1-1705012 3GPP TSG RAN WG1 Meeting #88bis, Spokane, USA, Apr. 3-7, 2017, Source: Qualcomm Incorporated, Title: Efficient monitoring of DL control channels.
R1-1705017 3GPP TSG RAN WG1 Meeting #88bis, Spokane, USA, Apr. 3-7, 2017, Source: Qualcomm Incorporated, Title: Efficient monitoring of DL control channels.
R1-1705038 3GPP TSG RAN WG1 Meeting #88bis, Spokane, USA, Apr. 3-7, 2017, Source: Nokia, Alcatel-Lucent Shanghai Bell, Title: Signalling for efficient decoding of physical channels.
R1-1705043 3GPP TSG RAN WG1 Meeting #88bis, Spokane, USA, Apr. 3-7, 2017, Source: Nokia, Alcatel-Lucent Shanghai Bell, Title: Signalling for efficient decoding of physical channels.
R1-1705182 3GPP TSG RAN WG1 Meeting #88bis, Spokane, USA, Apr. 3-7, 2017, Source: Ericsson, Title: Power consumption reduction for paging and connected-mode DRX.
R1-1705192 3GPP TSG RAN WG1 Meeting #88bis, Spokane, USA, Apr. 3-7, 2017, Source: Ericsson, Title: Power consumption reduction for paging and connected-mode DRX.
R1-1705204 3GPP TSG RAN WG1 Meeting #88bis, Spokane, USA, Apr. 3-7, 2017, Source: SONY, Title: MTC UE Power Consumption Reduction in Idle Mode Paging.
R1-1705305 3GPP TSG RAN WG1 Meeting #88bis, Spokane, USA, Apr. 3-7, 2017, Source: Samsung, Title: Power consumption reduction for paging and connected-mode DRX for eMTC.
R1-1705309 3GPP TSG RAN WG1 Meeting #88bis, Spokane, USA, Apr. 3-7, 2017, Source: Samsung, Title: Power consumption reduction for paging and connected-mode DRX for NB-IOT.
R1-1705494 3GPP TSG RAN WG1 Meeting #88bis, Spokane, USA, Apr. 3-7, 2017, Source: ZTE, ZTE Microelectronics, Title: Power consumption reduction for physical channels for MTC.
R1-1705495 3GPP TSG RAN WG1 Meeting #88bis, Spokane, USA, Apr. 3-7, 2017, Source: ZTE, ZTE Microelectronics, Title: power consumption reduction for physical channels for NB-IoT.
R1-1706882 3GPP TSG RAN WG1 Meeting #89, Hangzhou, P.R. China, May 15-19, 2017, Source: Ericsson, Title: Downlink channel power efficiency for MTC.
R1-1707018 3GPP TSG RAN WG1 Meeting #89, Hangzhou, P.R. China, May 15-19, 2017, Source: Huawei, HiSilicon, Title: On 'wake-up signal' for eFeMTC.
R1-1707101 3GPP TSG RAN WG1 Meeting #89, Hangzhou, P.R. China, May 15-19, 2017, Source: ZTE, Title: Power consumption reduction for physical channels for MTC.
R1-1707315 3GPP TSG RAN WG1 Meeting #89, Hangzhou, P.R. China, May 15-19, 2017, Source: Intel Corporation, Title: Analysis of impact of Wake-up signaling on power consumption and resource efficiency for efeMTC.

(56) References Cited

OTHER PUBLICATIONS

R1-1707455 3GPP TSG RAN WG1 Meeting #89, Hangzhou, P.R. China, May 15-19, 2017, Source: CATT, Title: UE Wakeup Mechanism and On-Demand Access for efeMTC UE Power Saving.
R1-1707568 3GPP TSG RAN WG1 Meeting #89, Hangzhou, P.R. China, May 15-19, 2017, Source: LG Electronics, Title: UE power consumption reduction by new physical signal/channel in MTC.
R1-1707862 3GPP TSG RAN WG1 Meeting #89, Hangzhou, P.R. China, May 15-19, 2017, Source: Nokia, Alcatel-Lucent Shanghai Bell, Title: Signalling for efficient decoding of physical channels.
R1-1708311 3GPP TSG RAN WG1 Meeting #89, Hangzhou, P.R. China, May 15-19, 2017, Source: Sierra Wireless, Title: SIdle Mode Power Efficiency Reduction.
R1-1708796 3GPP TSG RAN WG1 Meeting #89, Hangzhou, P.R. China, May 15-19, 2017, Source: Qualcomm Incorporated, Title: Efficient monitoring of DL control channels.
R1-1712106 3GPP TSG RAN WG1 Meeting #90, Prague, Czech Republic, Aug. 21-25, 2017, Source: Huawei, HiSilicon, Title: On power-saving signal for eFeMTC.
R1-1804405 3GPP TSG RAN WG1 Meeting #92, Sanya, China, Apr. 16-20, 2018, Source: Samsung, Title: Potential physical layer procedures for NR-U.
R1-1808272 3GPP TSG RAN WG1 Meeting #94, Gothenburg, Sweden, Aug. 20-24, 2018, Source: MediaTek Inc., Title: On downlink transmission detection in NR-U.
R1-1808319 3GPP TSG RAN WG1 Meeting #94, Gothenburg, Sweden, Aug. 20-24, 2018, Source: ZTE, Title: Considerations on DL reference signals and channels design for NR-U.
R1-1808612 3GPP TSG RAN WG1 Meeting #94, Gothenburg, Sweden, Aug. 20-24, 2018, Source: Apple Inc., Title: On DL Signals and Channels for NR-U.
R1-1808683 3GPP TSG RAN WG1 Meeting #94, Gothenburg, Sweden, Aug. 20-24, 2018, Source: Intel Corporation, Title: Enhancements to NR DL signals and channels for unlicensed operation.
R1-1809477 3GPP TSG RAN WG1 Meeting #94, Gothenburg, Sweden, Aug. 20-24, 2018, Source: Qualcomm Incorporated, Title: DL signals and channels for NR-U.
R1-1718443 3GPP TSG RAN WG1 Meeting #90bis, Prague, Czech Republic, Oct. 9-13, 2017, Source: Ericsson, Title: On aperiodic and semi-persistent CSI reporting on PUCCH.
R1-1718481 3GPP TSG RAN WG1 Meeting #90bis, Prague, Czech Republic, Oct. 9-13, 2017, Source: InterDigital, Inc., Title: Remaining issues on CSI reporting.
R1-1718510 3GPP TSG RAN WG1 Meeting #90bis, Prague, Czech Republic, Oct. 9-13, 2017, Source: Nokia, Nokia Shanghai Bell, Title: Remaining details on CSI reporting for Type II and Type I codebook.
R1-1718540 3GPP TSG RAN WG1 Meeting #90bis, Prague, Czech Republic, Oct. 9-13, 2017, Source: Qualcomm Incorporated. Title: On Remaining Issues of CSI Reporting.
R1-1718910 3GPP TSG RAN WG1 Meeting #90bis, Prague, Czech Republic, Oct. 9-13, 2017, Source: ZTE, Sanechips, Title: Summary of CSI measurement.
R1-1719142 3GPP TSG RAN WG1 Meeting #90bis, Prague, Czech Republic, Oct. 9-13, 2017, Source: Ericsson, Title: Offline session notes CSI reporting (AI 7.2.2.2).
R1-1719425 3GPP TSG RAN WG1 Meeting #91, Reno, USA, Nov. 27-Dec. 1, 2017, Source: Huawei, HiSilicon, Title: Remaining issues for CSI reporting.
R1-1719434 3GPP TSG RAN WG1 Meeting #91, Reno, USA, Nov. 27-Dec. 1, 2017, Source: Huawei, HiSilicon, Title: Remaining details of UL power control design.
R1-1719435 3GPP TSG RAN WG1 Meeting #91, Reno, USA, Nov. 27-Dec. 1, 2017, Source: Huawei, HiSilicon, Title: Designs on power headroom calculation and reporting.
R1-1719488 3GPP TSG RAN WG1 Meeting #91, Reno, USA, Nov. 27-Dec. 1, 2017, Source: Mitsubishi Electric, Title: UL transmission power control.
R1-1719532 3GPP TSG RAN WG1 Meeting #91, Reno, USA, Nov. 27-Dec. 1, 2017, Source: ZTE, Sanechips, Title: Remaining details on CSI reporting.
R1-1719547 3GPP TSG RAN WG1 Meeting #91, Reno, USA, Nov. 27-Dec. 1, 2017, Source: ZTE, Sanechips, Title: On NR Power Control Framework.
R1-1719564 3GPP TSG RAN WG1 Meeting #91, Reno, USA, Nov. 27-Dec. 1, 2017, Source: MediaTek Inc., Title: Remaining details for CSI reporting.
R1-1719650 3GPP TSG RAN WG1 Meeting #91, Reno, USA, Nov. 27-Dec. 1, 2017, Source: AT&T, Title: Remaining details on bandwidth parts.
R1-1719651 3GPP TSG RAN WG1 Meeting #91, Reno, USA, Nov. 27-Dec. 1, 2017, Source: AT&T, Title: Remaining details on carrier aggregation.
R1-1719653 3GPP TSG RAN WG1 Meeting #91, Reno, USA, Nov. 27-Dec. 1, 2017, Source: AT&T, Title: Dynamic Power Control and Coverage Impact.
R1-1719696 3GPP TSG RAN WG1 Meeting #91, Reno, USA, Nov. 27-Dec. 1, 2017, Source: Spreadtrum Communications, Title: Remaining issues on CSI feedback.
R1-1719768 3GPP TSG RAN WG1 Meeting #91, Reno, USA, Nov. 27-Dec. 1, 2017, Source: vivo, Title: Remaining details on CSI reporting.
R1-1719779 3GPP TSG RAN WG1 Meeting #91, Reno, USA, Nov. 27-Dec. 1, 2017, Source: vivo, Title: Remaining issues on NR UL power control.
R1-1719820 3GPP TSG RAN WG1 Meeting #91, Reno, USA, Nov. 27-Dec. 1, 2017, Source: Huawei, HiSilicon, Title: Power control design for SUL and LNC.
R1-1719906 3GPP TSG RAN WG1 Meeting #91, Reno, USA, Nov. 27-Dec. 1, 2017, Source: LG Electronics, Title: Discussions on CSI reporting.
R1-1719932 3GPP TSG RAN WG1 Meeting #91, Reno, USA, Nov. 27-Dec. 1, 2017, Source: LG Electronics, Title: Remaining issues on UL data transmission procedure.
R1-1719944 3GPP TSG RAN WG1 Meeting #91, Reno, USA, Nov. 27-Dec. 1, 2017, Source: LG Electronics, Title: Discussion on UL power control for NR non-CA case.
R1-1719968 3GPP TSG RAN WG1 Meeting #91, Reno, USA, Nov. 27-Dec. 1, 2017, Source: OPPO, Title: On uplink power control for NR.
R1-1719989 3GPP TSG RAN WG1 Meeting #91, Reno, USA, Nov. 27-Dec. 1, 2017, Source: OPPO, Title: Discussion on Remaining Issues for LTE-NR Dual Connectivity.
R1-1720070 3GPP TSG RAN WG1 Meeting #91, Reno, USA, Nov. 27-Dec. 1, 2017, Source: Intel Corporation, Title: Remaining issues on CSI reporting.
R1-1720104 3GPP TSG RAN WG1 Meeting #91, Reno, USA, Nov. 27-Dec. 1, 2017, Source: Intel Corporation, Title: Remaining Details On UL Power Control Framework.
R1-1720105 3GPP TSG RAN WG1 Meeting #91, Reno, USA, Nov. 27-Dec. 1, 2017, Source: Intel Corporation, Title: Remaining aspects on power sharing between LTE and NR.
R1-1720181 3GPP TSG RAN WG1 Meeting #91, Reno, USA, Nov. 27-Dec. 1, 2017, Source: CATT, Title: Remaining details on CSI reporting.
R1-1720215 3GPP TSG RAN WG1 Meeting #91, Reno, USA, Nov. 27-Dec. 1, 2017, Source: CATT, Title: Remaining Aspects of NR Power Control.
R1-1720289 3GPP TSG RAN WG1 Meeting #91, Reno, USA, Nov. 27-Dec. 1, 2017, Source: Samsung, Title: CSI reporting and UCI multiplexing.
R1-1720361 3GPP TSG RAN WG1 Meeting #91, Reno, USA, Nov. 27-Dec. 1, 2017, Source: Samsung, Title: Remaining Issues on UL Power Control.
R1-1720363 3GPP TSG RAN WG1 Meeting #91, Reno, USA, Nov. 27-Dec. 1, 2017, Source: Samsung, Title: On PHR Requirements and Calculation.
R1-1720371 3GPP TSG RAN WG1 Meeting #91, Reno, USA, Nov. 27-Dec. 1, 2017, Source: Panasonic, Title: Discussion on NR power control framework.

(56) References Cited

OTHER PUBLICATIONS

R1-1720560 3GPP TSG RAN WG1 Meeting #91, Reno, USA, Nov. 27-Dec. 1, 2017, Source: InterDigital, Inc., Title: Power Control for NR DC.

R1-1720595 3GPP TSG RAN WG1 Meeting #91, Reno, USA, Nov. 27-Dec. 1, 2017, Source: CMCC, Title: Power Control for NR DC.

R1-1720612 3GPP TSG RAN WG1 Meeting #91, Reno, USA, Nov. 27-Dec. 1, 2017, Source: Sharp, APT, Title: Power Control for NR DC.

R1-1720628 3GPP TSG RAN WG1 Meeting #91, Reno, USA, Nov. 27-Dec. 1, 2017, Source: InterDigital, Inc., Title: Remaining issues on CSI reporting.

R1-1720646 3GPP TSG RAN WG1 Meeting #91, Reno, USA, Nov. 27-Dec. 1, 2017, Source: HTC, Title: Remaining issues on UL power control for NR.

R1-1720661 3GPP TSG RAN WG1 Meeting #91, Reno, USA, Nov. 27-Dec. 1, 2017, Source: Qualcomm Incorporated. Title: Remaining Details on CSI Reporting.

R1-1720706 3GPP TSG RAN WG1 Meeting #91, Reno, USA, Nov. 27-Dec. 1, 2017, Source: Qualcomm Incorporated, Title: Remaining Issues on Power Control for NR.

R1-1720711 3GPP TSG RAN WG1 Meeting #91, Reno, USA, Nov. 27-Dec. 1, 2017, Source: InterDigital, Inc., Title: Consideration for UL Power Control Framework.

R1-1720734 3GPP TSG RAN WG1 Meeting #91, Reno, USA, Nov. 27-Dec. 1, 2017, Source: Ericsson, Title: On remaining details of CSI reporting.

R1-1720746 3GPP TSG RAN WG1 Meeting #91, Reno, USA, Nov. 27-Dec. 1, 2017, Source: Ericsson, Title: On semi-persistent CSI reporting on PUSCH.

R1-1720802 3GPP TSG RAN WG1 Meeting #91, Reno, USA, Nov. 27-Dec. 1, 2017, Source: NTT Docomo, Inc., Title: Remaining Issues on CSI reporting.

R1-1720832 3GPP TSG RAN WG1 Meeting #91, Reno, USA, Nov. 27-Dec. 1, 2017, Source: NTT Docomo, Inc., Title: Remaining details on LTE-NR power sharing.

R1-1720889 3GPP TSG RAN WG1 Meeting #91, Reno, USA, Nov. 27-Dec. 1, 2017, Source: Nokia, Nokia Shanghai Bell, Title: Remaining details on CSI reporting.

R1-1720903 3GPP TSG RAN WG1 Meeting #91, Reno, USA, Nov. 27-Dec. 1, 2017, Source: ASUSTeK, Title: Power control on SRS for beam management.

R1-1720915 3GPP TSG RAN WG1 Meeting #91, Reno, USA, Nov. 27-Dec. 1, 2017, Source: China Telecom, Title: Discussion on Power Offset for SUL.

R1-1720928 3GPP TSG RAN WG1 Meeting #91, Reno, USA, Nov. 27-Dec. 1, 2017, Source: Motorola Mobility, Lenovo, Title: On non-CA NR UL power control.

* cited by examiner

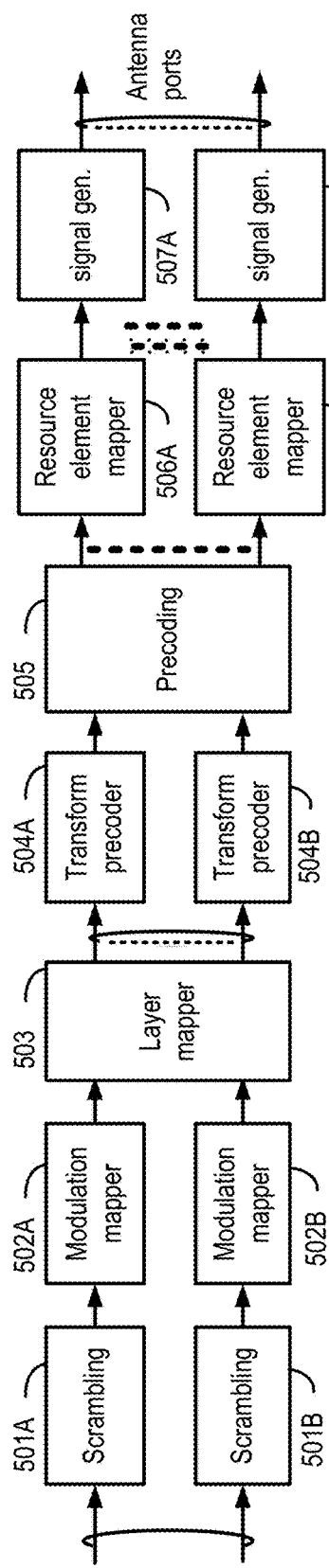
FIG. 5A Example uplink physical channel
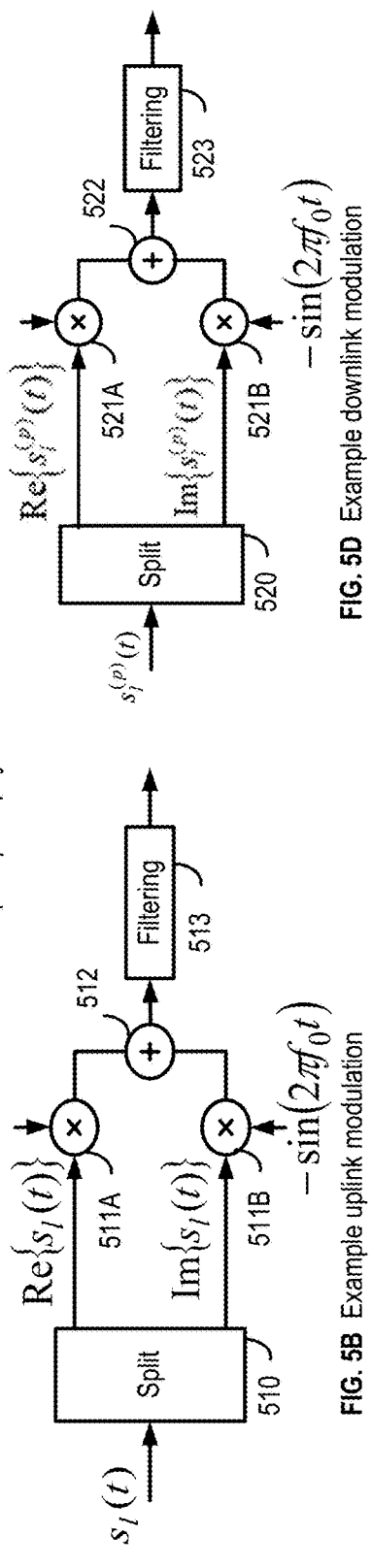
FIG. 5B Example uplink modulation
FIG. 5D Example downlink modulation
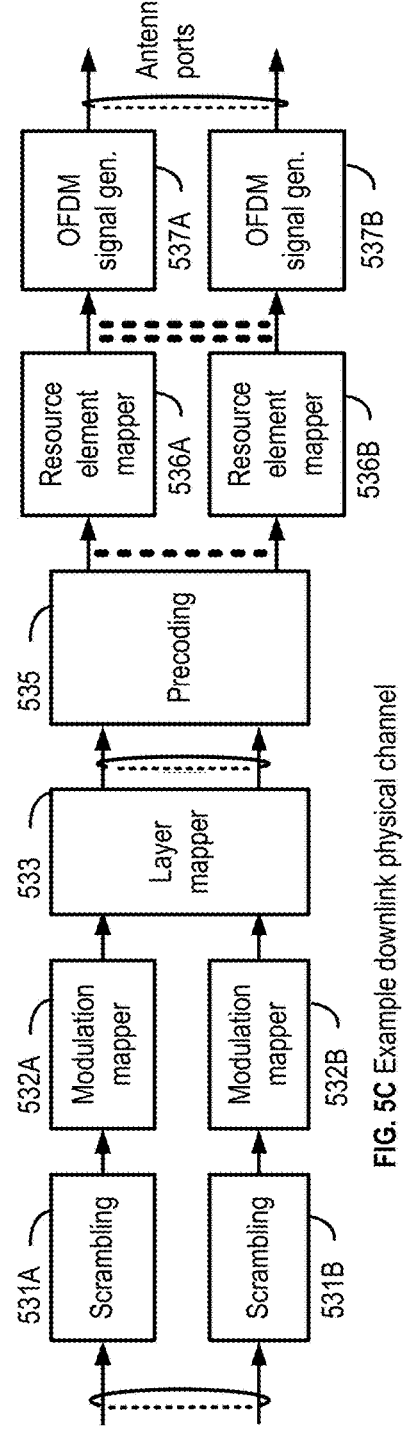
FIG. 5C Example downlink physical channel Dual-Connectivity- two MAC entities at UE side

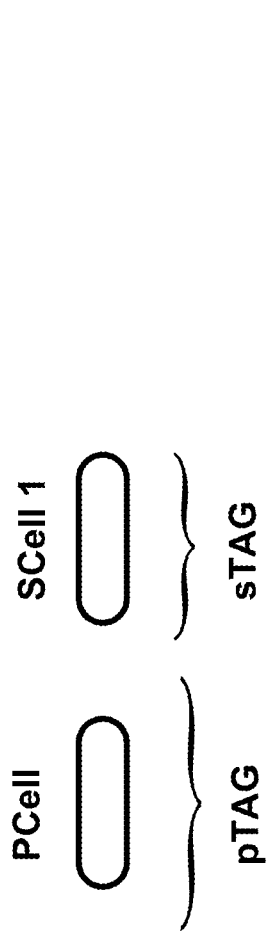
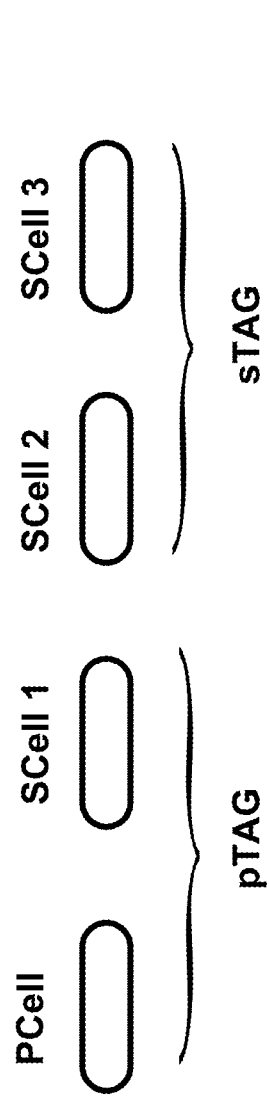
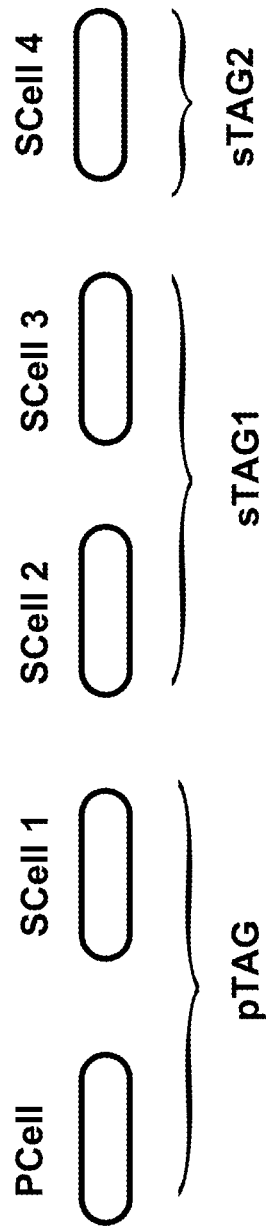
FIG. 8

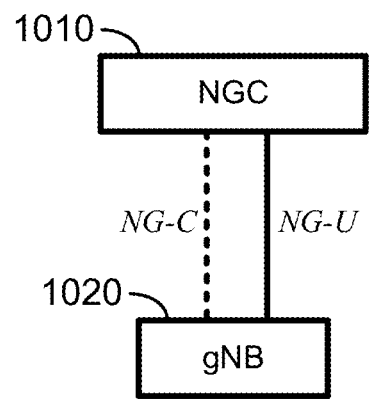
FIG. 10A gNB connected to NGC
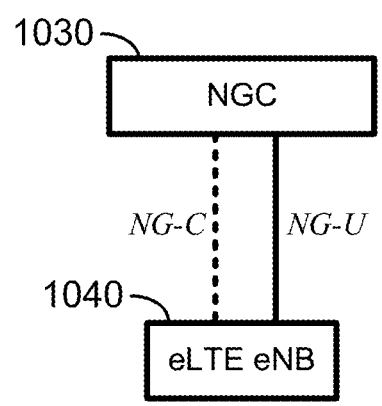
FIG. 10B eLTE eNB connected to NGC

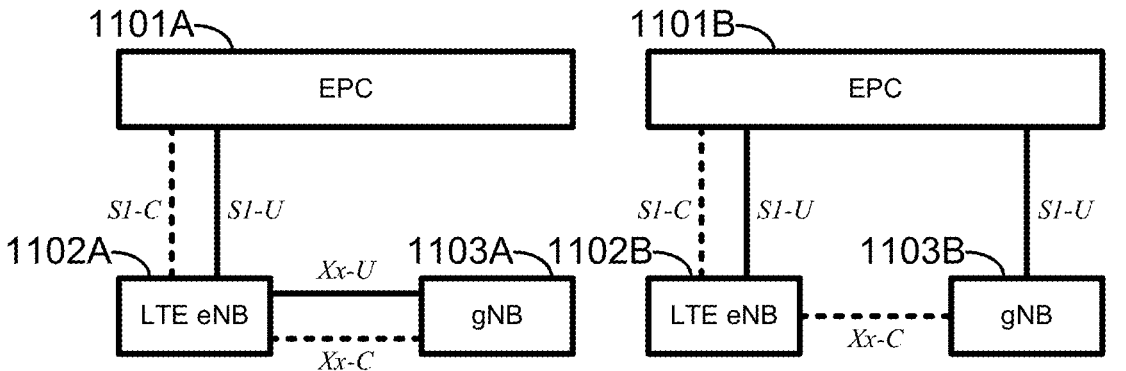

FIG. 11A LTE eNB connected to EPC with non-standalone gNB.
gNB user plane connected to EPC via LTE eNB.

FIG. 11B LTE eNB connected to EPC with non-standalone gNB.
gNB user plane connected to EPC directly.

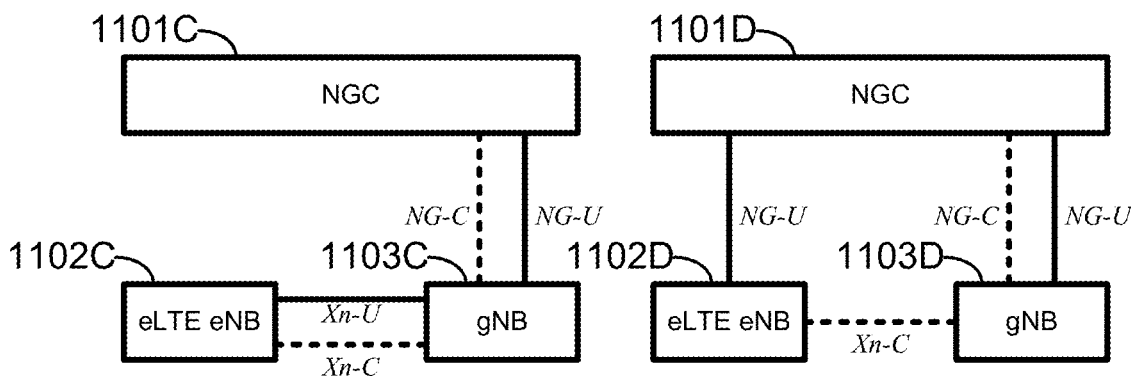

FIG. 11C gNB connected to NGC with non-standalone eLTE eNB.
eLTE eNB user plane connected to NGC via gNB.

FIG. 11D gNB connected to NGC with non-standalone eLTE eNB.
eLTE eNB user plane connected to NGC directly.

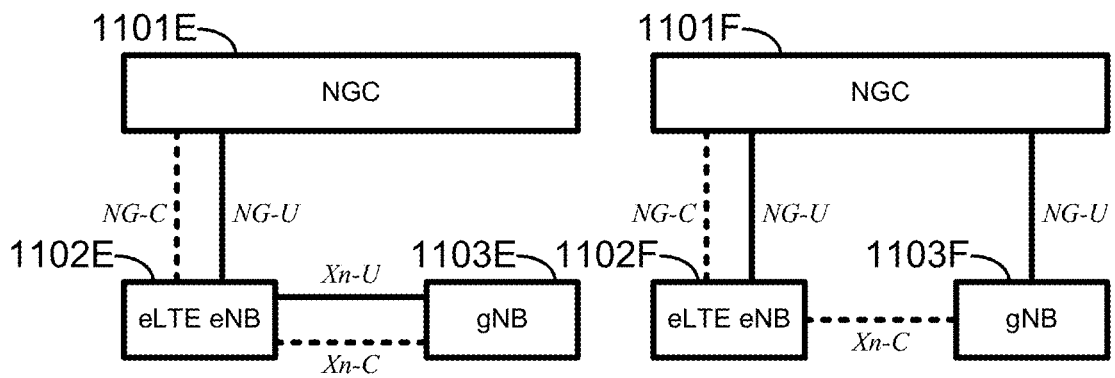

FIG. 11E eLTE eNB connected to NGC with non-standalone gNB.
gNB user plane connected to NGC via eLTE eNB.

FIG. 11F eLTE eNB connected to NGC with non-standalone gNB.
gNB user plane connected to NGC directly.

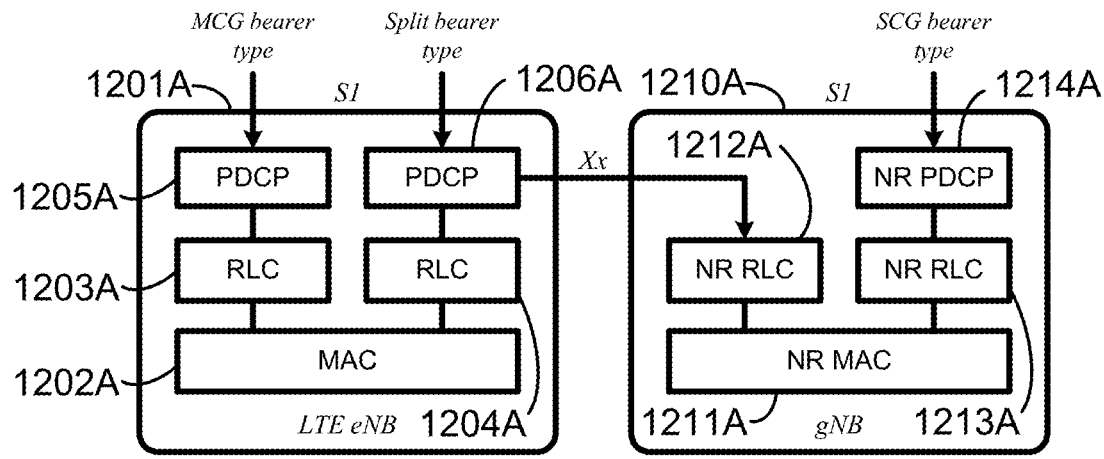
FIG. 12A Radio protocol architecture for split bearer and SCG bearer. LTE eNB connected to EPC with non-standalone gNB.
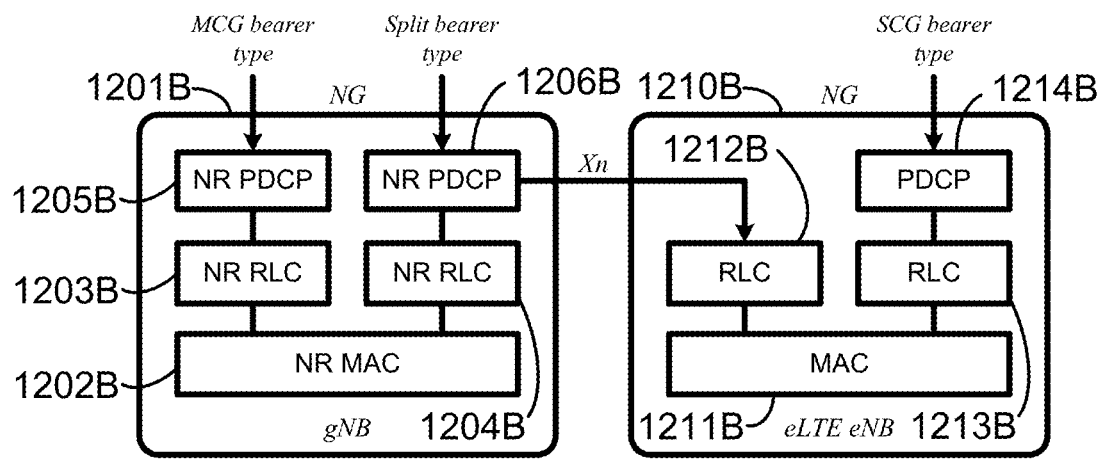
FIG. 12B Radio protocol architecture for split bearer and SCG bearer. gNB connected to NGC with non-standalone eLTE eNB.
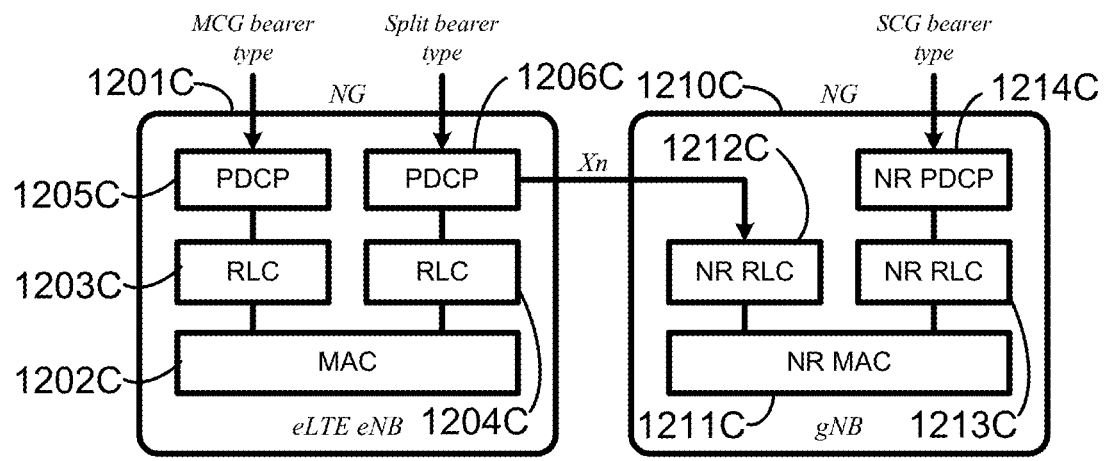
FIG. 12C Radio protocol architecture for split bearer and SCG bearer. eLTE eNB connected to NGC with non-standalone gNB.

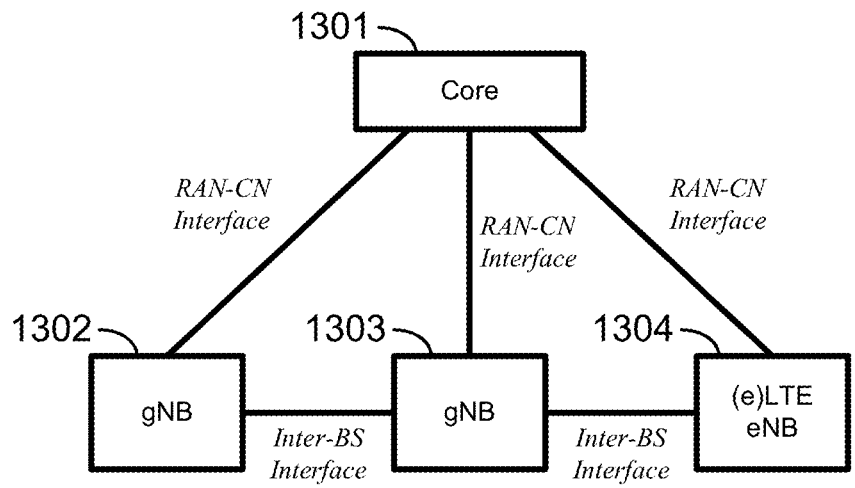
FIG. 13A Non-centralized deployment
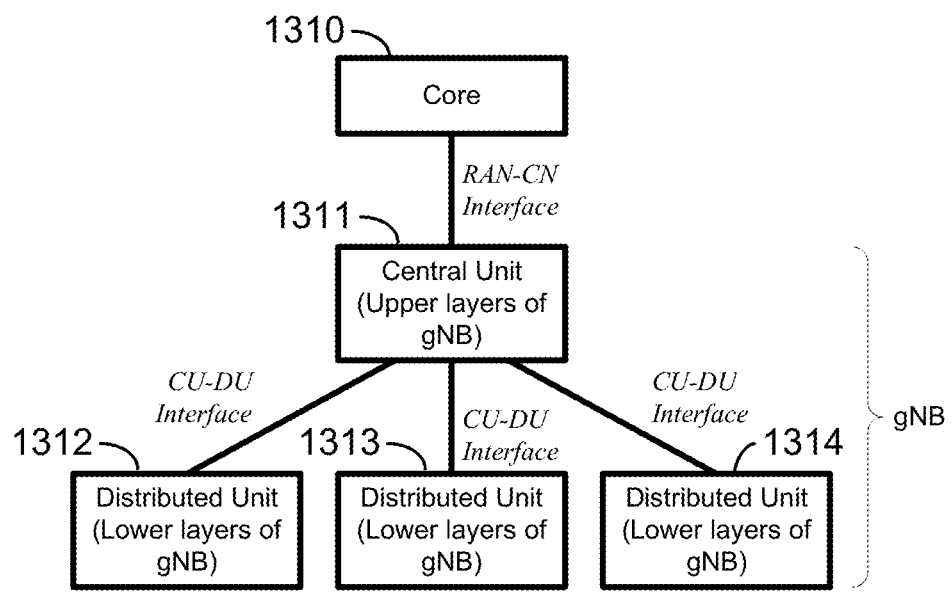
FIG. 13B Centralized deployment

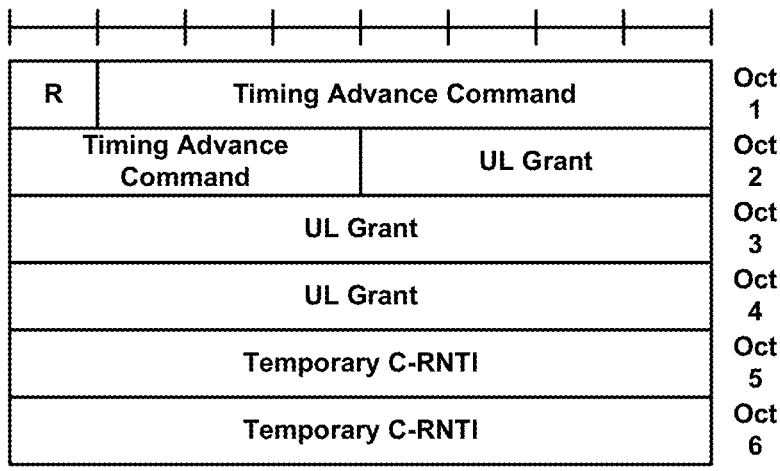
(a) MAC RAR
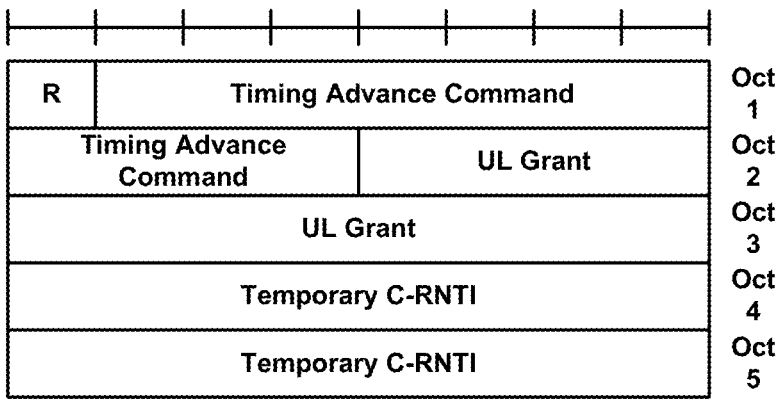
(b) MAC RAR for PRACH enhanced coverage level 2 or 3
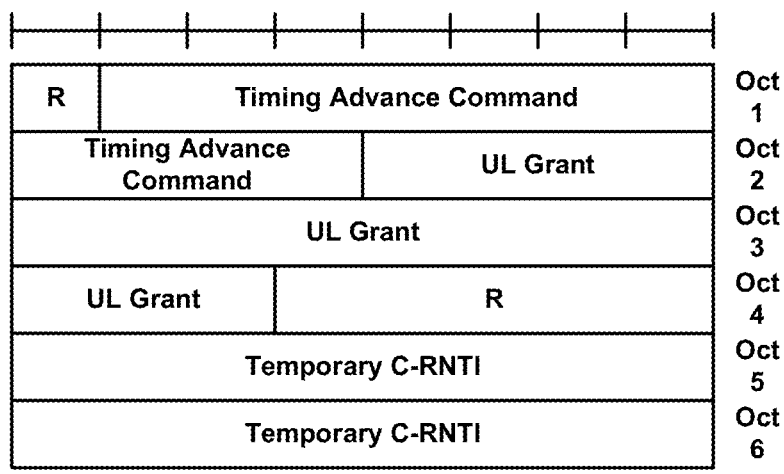
(c) MAC RAR for NB-IoT UEs
FIG. 18

| Value of CSI request field | Description |
|---|---|
| '000' | No aperiodic CSI report is triggered |
| '001' | Aperiodic CSI report is triggered for a $1^{st}$ set of {CSI process, CSI-RS resource} configured by higher layers for serving cell $c$ |
| '010' | Aperiodic CSI report is triggered for a $2^{nd}$ set of {CSI process, CSI-RS resource} configured by higher layers for serving cell $c$ |
| '011' | Aperiodic CSI report is triggered for a $3^{rd}$ set of {CSI process, CSI-RS resource} configured by higher layers for serving cell $c$ |
| '100' | Aperiodic CSI report is triggered for a $4^{th}$ set of {CSI process, CSI-RS resource} configured by higher layers for serving cell $c$ |
| '101' | Aperiodic CSI report is triggered for a $5^{th}$ set of {CSI process, CSI-RS resource} configured by higher layers for serving cell $c$ |
| '110' | Aperiodic CSI report is triggered for a $6^{th}$ set of {CSI process, CSI-RS resource} configured by higher layers for serving cell $c$ |
| '111' | Aperiodic CSI report is triggered for a $7^{th}$ set of {CSI process, CSI-RS resource} configured by higher layers for serving cell $c$ |

CSI Request field for PDCCH/EPDCCH with uplink DCI format in UE specific search space

FIG. 22

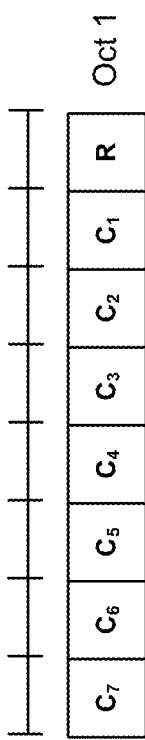
A) Activation/Deactivation MAC Control Element with one oct
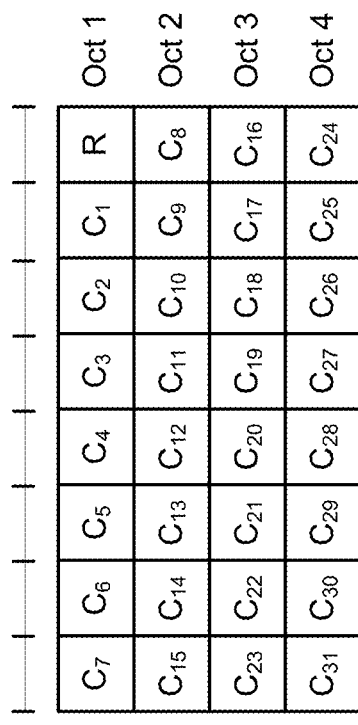
B) Activation/Deactivation MAC Control Element with 4 octs
FIG. 25

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | Reporting on PUCCH: the UE receives a selection command [10, TS 38.321] Reporting on PUSCH: DCI | DCI |
| Semi-Persistent CSI-RS | Not Supported | Reporting on PUCCH: the UE receives a selection command [10, TS 38.321] Reporting on PUSCH: DCI | DCI |
| Aperiodic CSI-RS | Not Supported | Not Supported | DCI |

FIG. 30

SELECTION OF GRANT AND CSI

CROSS-REFERENCE TO RELATED APPLICATIONS

This application claims the benefit of U.S. Provisional Application No. 62/612,132, filed on Dec. 29, 2017, and entitled "Selection of Grant and CSI;" U.S. Provisional Application No. 62/615,909, filed on Jan. 10, 2018, and entitled "Power Control Command for SP CSI;" and U.S. Provisional Application No. 62/616,189, filed on Jan. 11, 2018, and entitled "Power Control for SP CSI." The above-identified applications are hereby incorporated by reference in their entirety.

BACKGROUND

In wireless communications, bandwidth parts and other wireless resources may be used by wireless devices, and management of the resources will help to improve efficiency and performance.

SUMMARY

The following summary presents a simplified summary of certain features. The summary is not an extensive overview and is not intended to identify key or critical elements.

Systems, apparatuses, and method are described for managing use of uplink resources if a semi-persistent channel state information (SP-CSI) resource grant overlaps in time with one or more other types of uplink resource grants, such as a dynamic grant for a transport block of data, and if a wireless device is configured to not transmit both resources in parallel. If such an overlap occurs, a wireless device may determine which of the resources should be used. The wireless device may determine to drop the scheduled transmission of an SP-CSI report if such an overlap occurs, and to transmit the transport block of data instead. The wireless device may make the determination to drop the SP-CSI report or the one or more other uplink resource grants based on any of a variety of selection criteria of an SP-CSI report or a transport block, such as data size, periodicity, type, priority, etc. These and other features are described in greater detail below.

BRIEF DESCRIPTION OF THE SEVERAL VIEWS OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 8 shows example timing advance group (TAG) configurations.

FIG. 10A and FIG. 10B shows examples for interfaces between a 5G core network (e.g. NGC) and base stations (e.g. gNB and eLTE eNB).

FIG. 11A, FIG. 11B, FIG. 11C, FIG. 11D, FIG. 11E, and FIG. 11F show examples for architectures of tight interworking between 5G radio access network (RAN) (e.g. gNB) and long term evolution (LTE) RAN (e.g. (e) LTE eNB).

FIG. 12A, FIG. 12B, and FIG. 12C show examples for radio protocol structures of tight interworking bearers.

FIG. 13A and FIG. 13B show examples for gNB deployment.

FIG. 18 shows example MAC RAR format of an example MAC RAR comprising a timing advance command, uplink (UL) grant, and temporary cell-radio network temporary identifier for a four-step RA procedure.

FIG. 22 shows an example of a CSI request file for PDCCH/EPDCCH with uplink DCI format in UE specific search space.

FIG. 25 shows an example of activation/deactivation MAC control elements.

FIG. 30 shows an example Triggering/Activation of CSI Reporting for possible CSI-RS Configurations.

DETAILED DESCRIPTION

Figure 1:
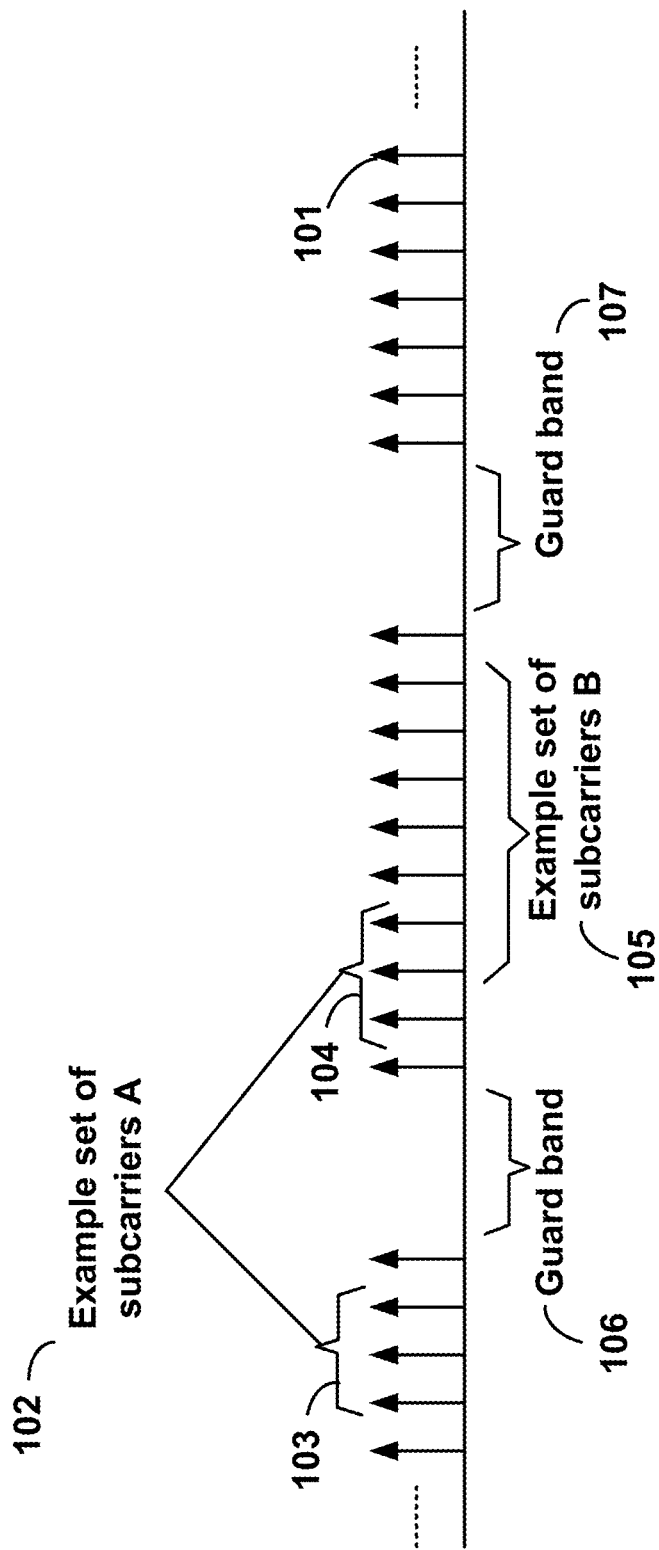
FIG. 1 shows example sets of OFDM subcarriers.

The features described herein may enable operation of carrier aggregation, and may be employed in the technical field of multicarrier communication systems. The features described herein may relate to signal timing in a multicarrier communication system.

The following Acronyms are used throughout the present disclosure:
ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time intervalTB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
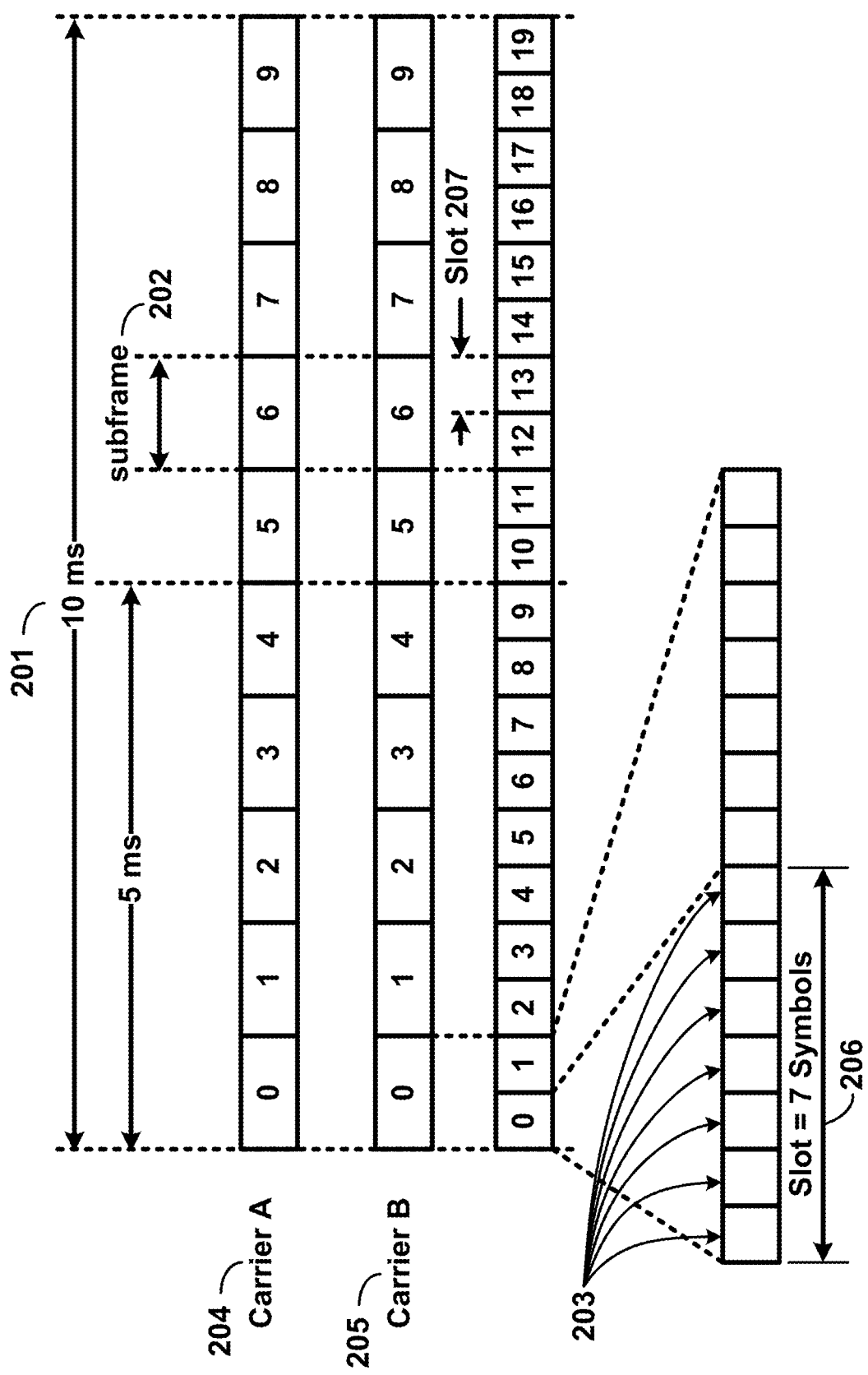
FIG. 2 shows example transmission time and reception time for two carriers in a carrier group.

FIG. 2 shows an example transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. Each 10 ms radio frame 201 may be divided into ten equally sized subframes 202. Other subframe durations, such as 0.5 msec, 1 msec, 2 msec, and 5 msec, may also be supported. Subframe(s) may comprise two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. A mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
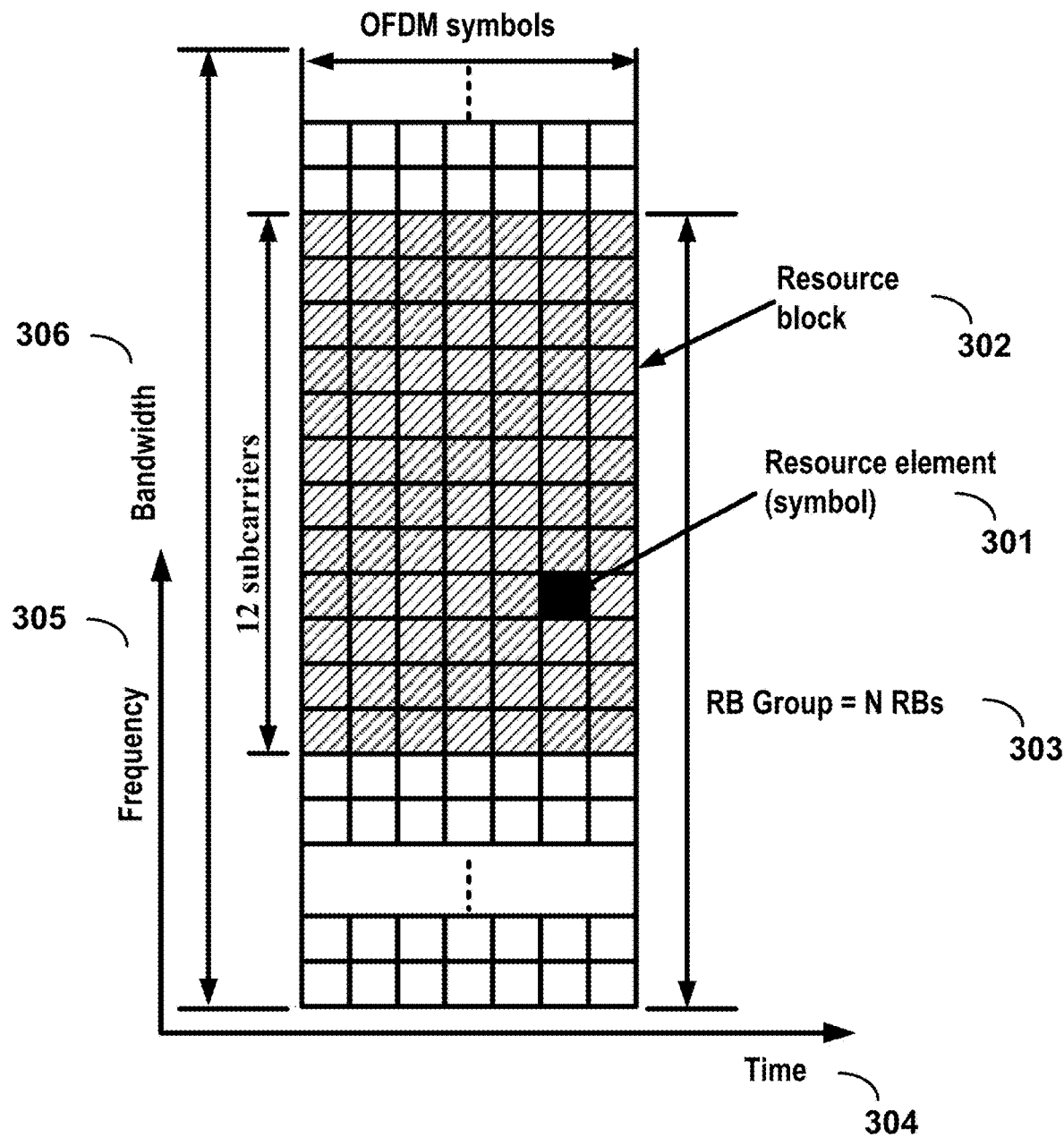
FIG. 3 shows example OFDM radio resources.

FIG. 3 shows an example of OFDM radio resources. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 KHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

Figure 4:
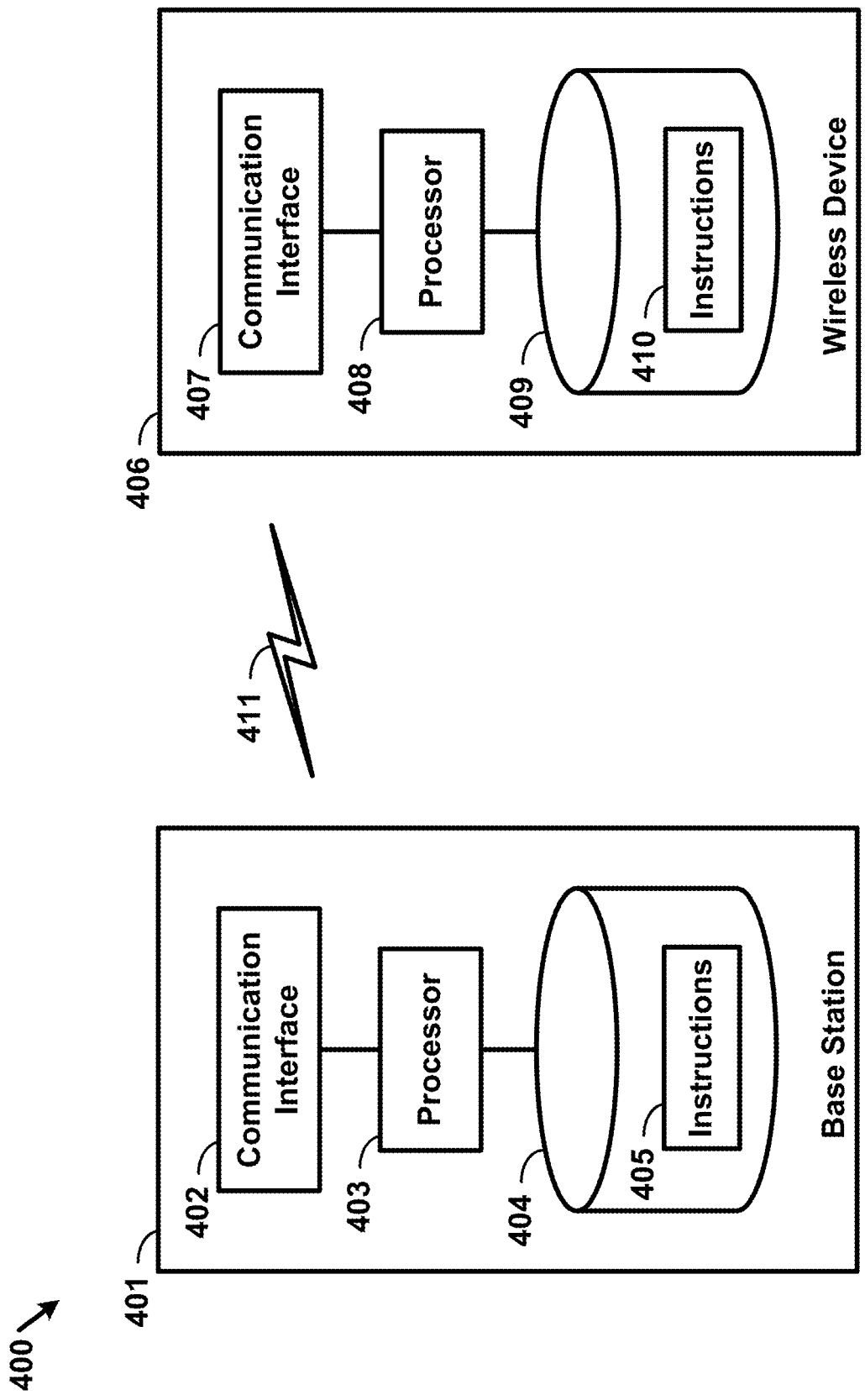
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. Transceivers, which may comprise both a transmitter and receiver, may be employed in devices such as wireless devices, base stations, relay nodes, and/or the like. Examples for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. The hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

A 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB). The base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC); in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). The cell ID may be equally referred to as a carrier ID, and cell index may be referred to as carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may equally mean that the cell comprising the first carrier is activated.

A device may be configured to operate as needed by freely combining any of the example features described herein. The disclosed mechanism may be performed if certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. If the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. Reference to a base station communicating with a plurality of wireless devices may refer to a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

FIG. 5A, FIG. 5B, FIG. 5C and FIG. 5D show examples of architecture for uplink and downlink signal transmission. FIG. 5A shows an example uplink physical channel. The baseband signal representing the physical uplink shared channel may perform the following processes, which may be performed by the structures described below. These structures and corresponding functions are illustrated as examples and it is anticipated that other mechanisms may be implemented in various examples. The structures and corresponding functions may comprise, for example, one or more scrambling devices 501A and 50B configured to perform scrambling of coded bits in each of the codewords to be transmitted on a physical channel; one or more modulation mappers 502A and 502B configured to perform modulation of scrambled bits to generate complex-valued symbols, a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of complex-valued time-domain DFTS-OFDM/SC-FDMA signal for each antenna port, and/or the like.

FIG. 5B shows an example for performing modulation and up-conversion to the carrier frequency of the complex-valued DFTS-OFDM/SC-FDMA baseband signal, for example, for each antenna port and/or the complex-valued physical random access channel (PRACH) baseband signal. For example, the baseband signal, represented as $s_1(t)$, may be split, by a signal splitter 510, into real and imaginary components, $\text{Re}\{s_1(t)\}$ and $\text{Im}\{s_1(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

FIG. 5C shows an example structure for downlink transmissions. The baseband signal representing a downlink physical channel may perform the following processes, which may be performed by structures described herein. These structures and corresponding functions are illustrated as examples, however, it is anticipated that other mechanisms may be implemented in various examples. The structures and corresponding functions may comprise, for example, one or more scrambling devices 531A and 531B configured to perform scrambling of coded bits in each of the codewords to be transmitted on a physical channel; one or more modulation mappers 532A and 532B to configured to perform modulation of scrambled bits to generate complex-valued modulation symbols; a layer mapper 533 configured to perform mapping of the complex-valued modulation symbols onto one or several transmission layers; a precoding device 534 configured to perform precoding of the complex-valued modulation symbols on each layer for transmission on the antenna ports; one or more element mapper 535A and 535B configured to perform mapping of complex-valued modulation symbols for each antenna port to resource elements; one or more OFDM signal generators 536A and 536B configured to perform generation of complex-valued time-domain OFDM signal for each antenna port, and/or the like.

FIG. 5D shows an example structure for modulation and up-conversion to the carrier frequency of the complex-valued OFDM baseband signal for each antenna port For example, the baseband signal, represented as $s_1^{(p)}(t)$, may be split, by a signal splitter 520, into real and imaginary components, $Re\{s_1^{(p)}(t)\}$ and $Im\{s_1^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
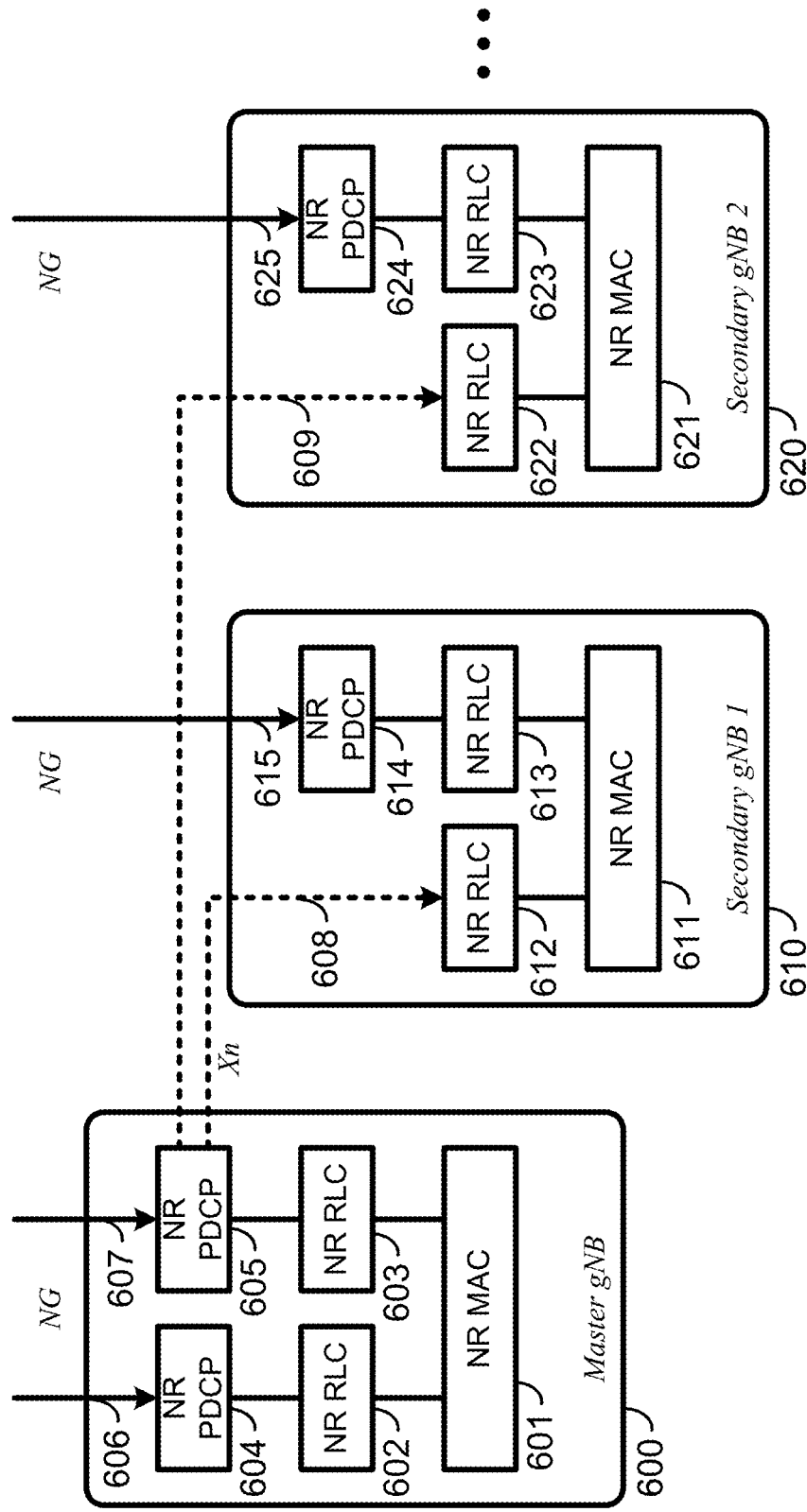
FIG. 6 shows an example protocol structure with multi-connectivity.
Figure 7:
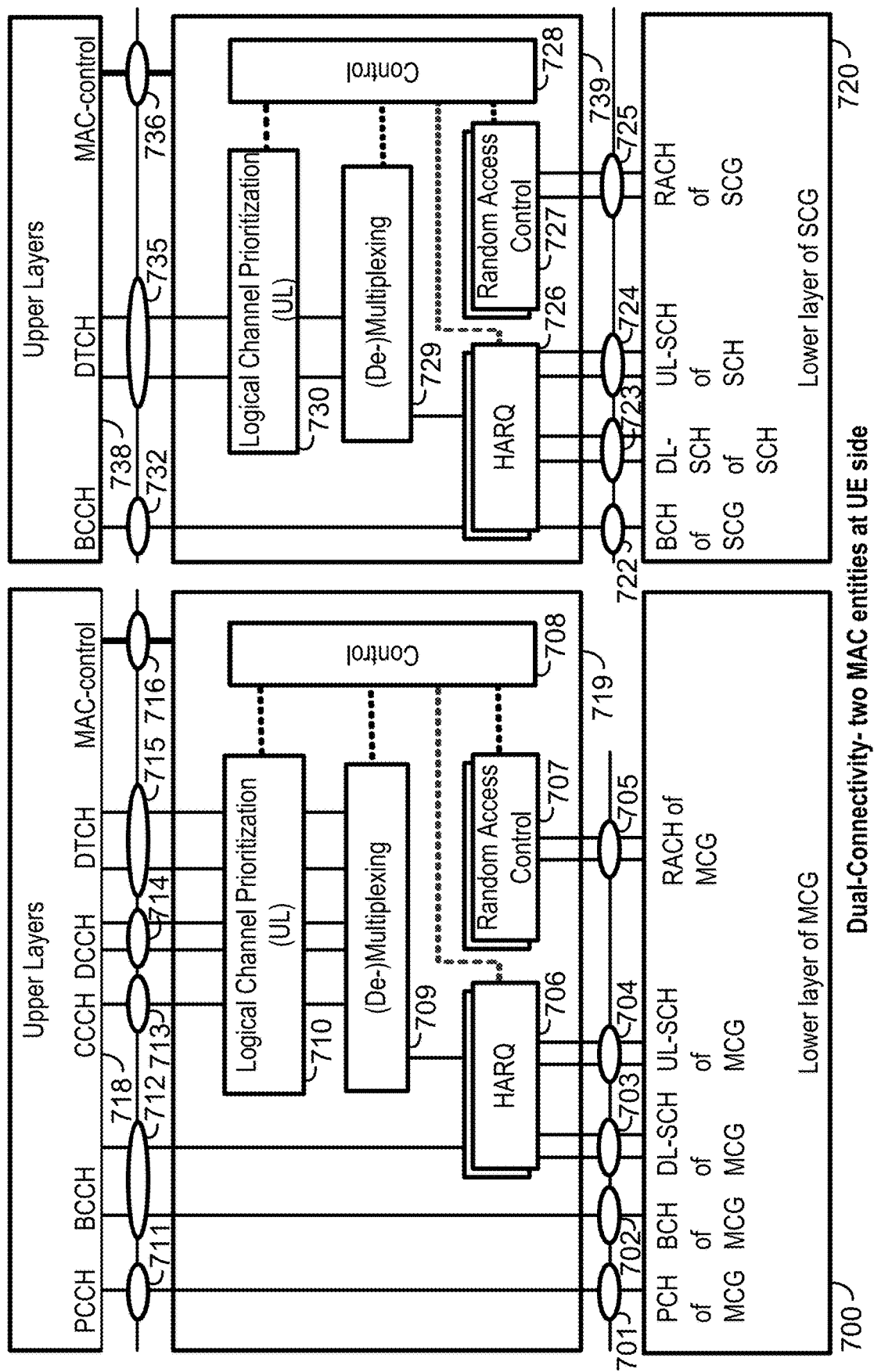
FIG. 7 shows an example protocol structure with carrier aggregation (CA) and dual connectivity (DC).

FIG. 6 and FIG. 7 show examples for protocol structures with CA and multi-connectivity. NR may support multi-connectivity operation, whereby a multiple receiver/transmitter (RX/TX) wireless device in RRC_CONNECTED may be configured to utilize radio resources provided by multiple schedulers located in multiple gNBs connected via a non-ideal or ideal backhaul over the Xn interface. gNBs involved in multi-connectivity for a certain wireless device may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 621 via interfaces 608 and 609, respectively, which may include Xn interfaces. For example, the master gNB 600 may communicate via the interface 608, at layer NR PDCP 605, and with the secondary gNB 610 at layer NR RLC 612. The master gNB 600 may communicate via the interface 609, at layer NR PDCP 605, and with the secondary gNB 620 at layer NR RLC.

FIG. 7 shows an example structure for the UE side MAC entities, for example, if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is setup. For example, three alternatives may exist: an MCG bearer, an SCG bearer, and a split bearer as shown in FIG. 6. NR RRC may be located in a master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented.

For multi-connectivity, the wireless device may be configured with multiple NR MAC entities: e.g., one NR MAC entity for a master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; the SCG configuration may comprise at least one SCG bearer or one Split bearer; after detection of a physical layer problem or a random access problem on a PSCell, or the maximum number of NR RLC retransmissions has been reached associated with the SCG, or after detection of an access problem on a PSCell during a SCG addition or a SCG change, one or more of the following may be performed: a RRC connection re-establishment procedure may not be triggered, UL transmissions towards cells of the SCG may be stopped, a master gNB may be informed by the wireless device of a SCG failure type, for split bearer, the DL data transfer over the master gNB is maintained and the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not be supported.

A master gNB and secondary gNBs may interact for multi-connectivity. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRX) alignment and identification of a measurement gap). If adding a new SCG SCell, dedicated NR RRC signaling may be used for sending required system information of the cell for CA, except, for example, for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, for example, a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, for example, one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, for example, a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, for example, a BCH 722, a DL-SCH 723, an UL-SCH 724, and a RACH 725. The one or more intermediate layers of the SCG 739 may comprise, for example, one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, for example, a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. Serving cells having an uplink to which the same TA applies may correspond to serving cells hosted by the same receiver. A wireless device supporting multiple TAs may support two or more TA groups. One TA group may contain the PCell and may be called a primary TAG (pTAG). In a multiple TAG configuration, at least one TA group may not contain the PCell and may be called a secondary TAG (sTAG). Carriers within the same TA group may use the same TA value and/or the same timing reference. If DC is configured, cells belonging to a cell group (MCG or SCG) may be grouped into multiple TAGs including a pTAG and one or more sTAGs.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGS may be supported in a cell group (MCG or SCG), and other example TAG configurations may also be provided. In various examples, structures and operations are described for use with a pTAG and an sTAG. Some of the examples may be used for configurations with multiple sTAGs.

An eNB may initiate an RA procedure, via a PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
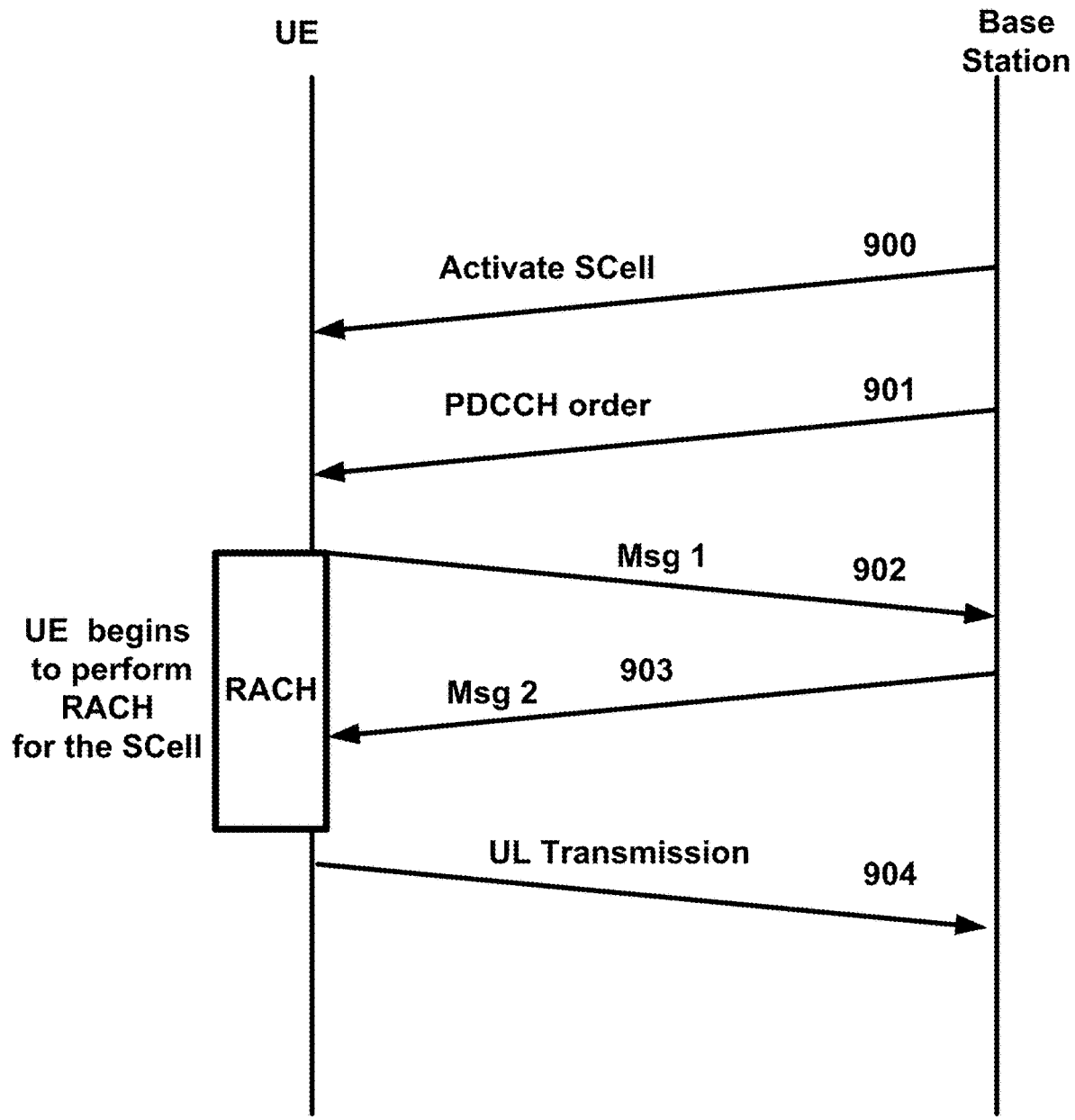
FIG. 9 shows an example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDDCH order 901 to the wireless device, which may be transmitted, for example, after the activation command 900. The wireless device may begin to perform a RACH process for the SCell, which may be initiated, for example, after receiving the PDDCH order 901. A wireless device may transmit to the base station (e.g., as part of a RACH process) a preamble 902 (e.g., Msg1), such as a random access preamble (RAP). The preamble 902 may be transmitted after or in response to the PDCCH order 901. The wireless device may transmit the preamble 902 via an SCell belonging to an sTAG. Preamble transmission for SCells may be controlled by a network using PDCCH format 1A. The base station may send a random access response (RAR) 903 (e.g., Msg2 message) to the wireless device. The RAR 903 may be after or in response to the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, for example, after or in response to the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Timing alignment (e.g., initial timing alignment) for communications between the wireless device adnthe base station may be performed through a random access procedure, such as described above regarding FIG. 9. The random access procedures may involve a wireless device, such as a UE, transmitting a random access preamble and a base station, such as an eNB, responding with an initial TA command NTA (amount of timing advance) within a random access response window. The start of the random access preamble may be aligned with the start of a corresponding uplink subframe at the wireless device assuming NTA=0. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, for example, by releasing the SCell and configuring the SCell as a part of the pTAG. If, for example, an SCell is added or configured without a TAG index, the SCell may be explicitly assigned to the pTAG. The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

In LTE Release-10 and Release-11 CA, a PUCCH is only transmitted on the PCell (PSCell) to an eNB. In LTE-Release 12 and earlier, a wireless device may transmit PUCCH information on one cell (e.g., a PCell or PSCell) to a given eNB. As the number of CA capable wireless devices increases, and as the number of aggregated carriers increases, the number of PUCCHs and the PUCCH payload size may increase. Accommodating the PUCCH transmissions on the PCell may lead to a high PUCCH load on the PCell. A PUCCH on an SCell may be used to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgement (ACK), and/or non-acknowledgement (NACK) to a base station. Cells may be grouped into multiple PUCCH groups, and one or more cells within a group may be configured with a PUCCH. One SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, for example, timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

A timer may be considered to be running after it is started, until it is stopped, or until it expires; otherwise it may be considered to not be running. A timer can be started if it is not running or restarted if it is running. For example, a timer may be started or restarted from its initial value.

Features described herein may enable operation of multi-carrier communications. Features may comprise a non-transitory tangible computer readable media comprising instructions executable by one or more processors to cause operation of multi-carrier communications. The features may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The devices herein may include processors, memory, interfaces, and/or the like. Features may comprise communication networks comprising devices such as base stations, wireless devices (or user equipment: UE), servers, switches, antennas, and/or the like.

FIG. 10A and FIG. 10B show examples for interfaces between a 5G core network (e.g., NGC) and base stations (e.g., gNB and eLTE eNB). A base station, such as a gNB 1020, may be interconnected to an NGC 1010 control plane employing an NG-C interface. The base station, for example, the gNB 1020, may also be interconnected to an NGC 1010 user plane (e.g., UPGW) employing an NG-U interface. As another example, a base station, such as an eLTE eNB 1040, may be interconnected to an NGC 1030 control plane employing an NG-C interface. The base station, for example, the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (RX/TX) wireless device in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

A master base station may be an LTE eNB 1102A or an LTE eNB 1102B, which may be connected to EPC nodes 1101A or 1101B, respectively. This connection to EPC nodes may be, for example, to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

A master base station may be a gNB 1103C or a gNB 1103D, which may be connected to NGC nodes 1101C or 1101D, respectively. This connection to NGC nodes may be, for example, to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

A master base station may be an eLTE eNB 1102E or an eLTE eNB 1102F, which may be connected to NGC nodes 1101E or 1101F, respectively. This connection to NGC nodes may be, for example, to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

FIG. 12A, FIG. 12B, and FIG. 12C are example diagrams for radio protocol structures of tight interworking bearers. An LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

A gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

An eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, for example, an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

At least one cell in a SCG may have a configured UL CC and one of them, for example, a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, for example, with security key change and a RACH procedure. A direct bearer type change, between a split bearer and an SCG bearer, may not be supported. Simultaneous configuration of an SCG and a split bearer may not be supported.

A master base station and a secondary base station may interact. The master base station may maintain the RRM measurement configuration of the wireless device. The master base station may determine to ask a secondary base station to provide additional resources (e.g., serving cells) for a wireless device. This determination may be based on, for example, received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, for example, for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, for example, for the SFN acquired from an MIB of the PSCell of an SCG.

FIG. 13A and FIG. 13B show examples for gNB deployment. A core 1301 and a core 1310 may interface with other nodes via RAN-CN interfaces. In a non-centralized deployment example, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In a centralized deployment example, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1312, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation (e.g., after the Fs interface setup procedure), or the functional split option may change only in the Fs setup procedure (e.g., the functional split option may be static during operation after Fs setup procedure).

Figure 14:
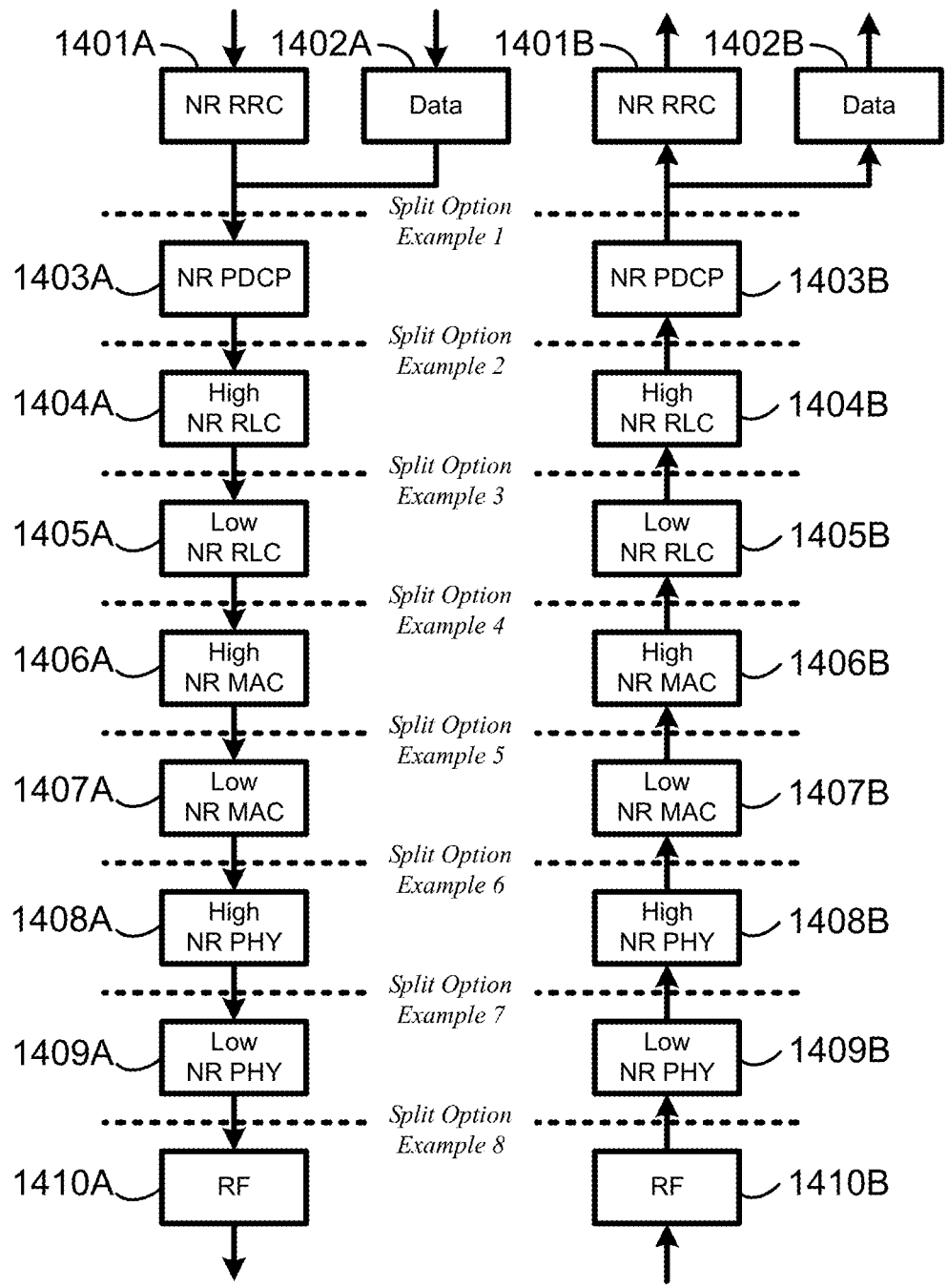
FIG. 14 shows functional split option examples of a centralized gNB deployment.

FIG. 14 shows examples for different functional split options of a centralized gNB deployment. Element numerals that are followed by "A" or "B" designations in FIG. 14 may represent the same elements in different traffic flows, for example, either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, or with other granularities. In per CU split, a CU may have a fixed split, and DUs may be configured to match the split option of CU. In per DU split, each DU may be configured with a different split, and a CU may provide different split options for different DUs. In per wireless device split, a gNB (CU and DU) may provide different split options for different wireless devices. In per bearer split, different split options may be utilized for different bearer types. In per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, for example, by one or more slice ID(s) or NSSAI(s) provided by a wireless device or provided by an NGC (e.g. NG CP). The slice ID(s) or NSSAI(s) may identify one or more of pre-configured network slices in a PLMN. For an initial attach, a wireless device may provide a slice ID and/or an NSSAI, and a RAN node (e.g. gNB) may use the slice ID or the NSSAI for routing an initial NAS signaling to an NGC control plane function (e.g. NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over cellular networks is expected to increase for many years to come. The number of users/devices is increasing, and each user/device accesses an increasing number and variety of services, for example video delivery, large files, and images. This requires not only high capacity in the network, but also provisioning very high data rates to meet customers' expectations on interactivity and responsiveness. More spectrum is therefore needed for network operators to meet the increasing demand. Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, for example, to help address the traffic explosion in some examples, such as hotspot areas. LAA offers an alternative for operators to make use of unlicensed spectrum, for example, if managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may use at least energy detection to determine the presence or absence of other signals on a channel to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access, for example, via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices; time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. LAA may employ a mechanism to adaptively change the energy detection threshold, for example, LAA may employ a mechanism to adaptively change the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementation scenarios, in some situations, and/or in some frequencies, no LBT procedure may be performed by the transmitting entity. Category 2 (e.g. LBT without random back-off) may be implemented. The duration of time that the channel is sensed to be idle before the transmitting entity transmits may be deterministic. Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle, for example, before the transmitting entity transmits on the channel.

LAA may employ uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme include, but are not limited to, multiplexing of multiple UEs in a single subframe.

A DL transmission burst may be a continuous transmission from a DL transmitting node, for example, with no transmission immediately before or after from the same node on the same CC. An UL transmission burst from a wireless device perspective may be a continuous transmission from a wireless device, for example, with no transmission immediately before or after from the same wireless device on the same CC. A UL transmission burst may be defined from a wireless device perspective or from an eNB perspective. If an eNB is operating DL+UL LAA over the same unlicensed carrier, DL transmission burst(s) and UL transmission burst(s) on LAA may be scheduled in a TDM manner over the same unlicensed carrier. An instant in time may be part of a DL transmission burst or an UL transmission burst.

A wireless device configured for operation with wireless resources (e.g., bandwidth parts (BWPs)) of a serving cell may be configured by higher layers for the serving cell. The wireless device may be configured for a set of BWPs for receptions by the wireless device (e.g., DL BWP set) and/or or a set of BWPs for transmissions by the wireless device (e.g., UL BWP set). For a DL BWP, an UL BWP in a set of DL BWPs, or an UL BWPs, the wireless device may be configured with at least one of following for the serving cell: a subcarrier spacing (SCS) for DL BWP and/or UL BWP, a cyclic prefix (CP) for DL BWP and/or UL BWP, a number of contiguous PRBs for DL BWP and/or UL BWP, an offset of the first PRB of DL BWP and/or UL BWP in the number of contiguous PRBs relative to the first PRB of a reference location, and/or Q control resource sets (e.g., if the BWP is a DL BWP). Higher layer signaling may configure a wireless device with Q control resource sets, for example, for each serving cell. For a control resource set q, such that $0 \leq q < Q$, the configuration may comprise one or more of following: a first OFDM symbol, a number of consecutive OFDM symbols, a set of resource blocks, a CCE-to-REG mapping, a REG bundle size (e.g., for interleaved CCE-to-REG mapping), and/or antenna port quasi-collocationBWP.

A control resource set may comprise a set of CCEs numbered from 0 to $N_{CCE,q}-1$, where $N_{CCE,q}$ may be the number of CCEs in control resource set q. Sets of PDCCH candidates that a wireless device monitors may be defined in terms of PDCCH wireless device-specific search spaces. A PDCCH wireless device-specific search space at CCE aggregation level $L \in \{1,2,4,8\}$ may be defined by a set of PDCCH candidates for CCE aggregation level L. A wireless device may be configured (e.g., for a DCI format), per serving cell by one or more higher layer parameters, for a number of PDCCH candidates per CCE aggregation level L A wireless device may monitor (e.g., in non-DRX mode operation) one or more PDCCH candidate in control resource set q according to a periodicity of $W_{PDCCHq}$ symbols. The symbols may be configured by one or more higher layer parameters for control resource set q. The carrier indicator field value may correspond to cif-InSchedulingCell, for example, if a wireless device is configured with a higher layer parameter (e.g., cif-InSchedulingCell). For the serving cell on which a wireless device may monitor one or more PDCCH candidate in a wireless device-specific search space, the wireless device may monitor the one or more PDCCH candidates without carrier indicator field (e.g., if the wireless device is not configured with a carrier indicator field). For the serving cell on which a wireless device may monitor one or more PDCCH candidates in a wireless device-specific search space, the wireless device may monitor the one or more PDCCH candidates with carrier indicator field (e.g., if a wireless device is configured with a carrier indicator field). A wireless device may not monitor one or more PDCCH candidates on a secondary cell, for example, if the wireless device is configured to monitor one or more PDCCH candidates with carrier indicator field corresponding to that secondary cell in another serving cell. For the serving cell on which the wireless device may monitor one or more PDCCH candidates, the wireless device may monitor the one or more PDCCH candidates at least for the same serving cell.

A wireless device may receive PDCCH and PDSCH in a DL BWP according to a configured SCS and CP length for the DL BWP. A wireless device may transmit PUCCH and/or PUSCH in an UL BWP according to a configured SCS and CP length for the UL BWP.

A wireless device may be configured, by one or more higher layer parameters, for a DL BWP from a configured DL BWP set for DL receptions. A wireless device may be configured, by one or more higher layer parameters, for an UL BWP from a configured UL BWP set for UL transmissions. A DL BWP index field value may indicate a DL BWP (such as from the configured DL BWP set) for DL receptions, for example, if the DL BWP index field is configured in a DCI format scheduling PDSCH reception to a wireless device. An UL-BWP index field value may indicate the UL BWP (such as from the configured UL BWP set) for UL transmissions, for example, if the UL-BWP index field is configured in a DCI format scheduling PUSCH transmission from a wireless device.

A wireless device may determine that the center frequency for the DL BWP is or should be the same as the center frequency for the UL BWP, such as for TDD. The wireless device may not monitor PDCCH, for example, if the wireless device performs measurements over a bandwidth that is not within the DL BWP for the wireless device.

A wireless device may identify the bandwidth and/or frequency of an initial active DL BWP, such as for an initial active DL BWP. The wireless device may identify the bandwidth and/or frequency after or in response to receiving the NR-PBCH. A bandwidth of an initial active DL BWP may be confined within the wireless device minimum bandwidth for the given frequency band. The bandwidth may be indicated in PBCH, such as for flexible DL information scheduling. Some bandwidth candidates may be predefined. A number of bits (e.g., x bits) may be used for a bandwidth indication.

A frequency location of an initial active DL BWP may be derived from the bandwidth and SS block (e.g., a center frequency of the initial active DL BWP). The edge of the SS block PRB and data PRB boundary may not be aligned. An SS block may have a frequency offset, for example, if the edge of the SS block PRB and data PRB are not aligned. Predefining the frequency location of an SS block and an initial active DL BWP may reduce the PBCH payload size such that additional bits may not be needed for an indication of a frequency location of an initial active DL BWP. The bandwidth and frequency location may be informed in RMSI, for example, for the paired UL BWP.

A base station may configure a set of BWPs for a wireless device by RRC signaling. The wireless device may transmit or receive in an active BWP from the configured BWPs in a given time instance. Activation and/or a deactivation of DL bandwidth part may be based on a timer for a wireless device. The wireless device may switch its active DL bandwidth part to a default DL bandwidth part, for example, if a timer expires. If the wireless device has not received scheduling DCI for a time period (e.g., X ms, or after expiry of a timer), the wireless device may switch to the default DL BWP.

A new timer (e.g., BWPDeactivationTimer) may be defined to deactivate the original BWP and/or switch to the default BWP. The new timer (e.g., BWPDeactivationTimer) may be started if the original BWP is activated by the activation and/or deactivation DCI. If PDCCH on the original BWP is received, a wireless device may restart the timer (e.g., BWPDeactivationTimer) associated with the original BWP. If the timer (e.g., BWPDeactivationTimer) expires, a wireless device may deactivate the original BWP, switch to the default BWP, stop the timer for the original BWP, and/or flush (or not flush) all HARQ buffers associated with the original BWP.

A base station and a wireless device may have a different understanding of the starting of the timer, for example, if the wireless device misses one or more scheduling grants. The wireless device may be triggered to switch to the default BWP, but the base station may schedule the wireless device in the previous active BWP. The base station may restrict the location of the CORESET of BWP2 to be within BWP1 (e.g., the narrow band BWP1 may be the default BWP), for example, if the default BWP is nested within other BWPs. The wireless device may receive an indication (e.g., CORESET) and switch back to BWP2, for example, if the wireless device previously mistakenly switched to the default BWP.

Restricting the location of the indication (e.g., CORESET) may not solve a miss switching problem, for example, if the default BWP and the other BWPs are not overlapped in frequency domain. The base station may maintain a timer for a wireless device. If the timer expires (e.g., if there is no data scheduled for the wireless device for a time period such as Y ms), and/or if the base station has not received feedback from the wireless device for a time period (such as Y' ms), the wireless device may switch to the default BWP. The wireless device may switch to the default BWP to send a paging signal and/or to re-schedule the wireless device in the default BWP.

A base station may not fix the default BWP to be the same as an initial active BWP. The initial active DL BWP may be the SS block bandwidth which is common to wireless devices in the cell. The traffic load may be very heavy, for example, if many wireless devices fall back to a small bandwidth for data transmission. Configuring the wireless devices with different default BWPs may help to balance the load in the system bandwidth.

There may be no initial active BWP on an SCell, for example, if the initial access is performed on the PCell. An DL BWP and/or UL BWP that is initially activated based on the SCell being activated may be configured or reconfigured by RRC signaling. The default BWP of the SCell may also be configured and/or reconfigured by RRC signaling. The default BWP may be configured or reconfigured by the RRC signaling, and/or the default BWP may be one of the configured BWPs of the wireless device, which may provide a unified design for both PCell and SCell.

The base station may configure a wireless device-specific default DL BWP other than an initial active BWP. The base station may configure the wireless device-specific default DL BWP, for example, after RRC connection, which may be performed for the purpose of load balancing. The default BWP may support connected mode operations other than operations supported by initial active BWP. Other connected mode operations may comprise, for example, fall back and/or connected mode paging. The default BWP may comprise a common search space, such as at least the search space needed for monitoring the pre-emption indications. The default DL and UL BWPs may be independently configured to the wireless device, such as for FDD.

The initial active DL BWP and/or UL BWP may be set as default DL BWP and/or UL BWP, respectively. A wireless device may return to default DL BWP and/or UL BWP. For example, if a wireless device does not receive control for a long time (e.g., based on a timer expiration or a time duration reaching a threshold), the wireless device may fall back to a default BWP (e.g., default DL BWP and/or default UL BWP).

A base station may configure a wireless device with multiple BWPs. The multiple BWPs may share at least one CORESET including a default BWP. CORESET for RMSI may be shared for all configured BWPs. The wireless device may receive control information via the common CORESET, for example, without going back to another BWP or a default BWP. The common CORESET may schedule data within only a default BWP, which may minimize the ambiguity of resource allocation, for example, if a frequency region of a default BWP may belong to all or more than one of the configured BWPs.

A semi-static pattern of BWP switching to default BWP may be performed, for example, if the configured BWP is associated with a different numerology from a default BWP. Switching to a default BWP may be performed, for example, to check RMSI at least periodically. Switching to a default BWP may be necessary particularly if BWPs use different numerologies.

Reconfiguration of a default BWP from an initial BWP may be performed, such as for RRC connected wireless devices. A default BWP may be the same as an initial BWP, such as for RRC IDLE wireless devices. Additionally or alternatively, a wireless device (e.g., RRC IDLE wireless device) may fall back to an initial BWP regardless of a default BWP. If a wireless device performs a measurement based on SS block, reconfiguration of a default BWP outside of an initial BWP may become very inefficient, for example, due to frequent measurement gaps. If a default BWP is reconfigured to outside of an initial BWP, the following conditions may be satisfied: a wireless device may be in a CONNECTED mode, and/or a wireless device may not be configured with an SS block based measurement for both serving cell and neighbor cells.

A DL BWP other than the initial active DL BWP may be configured as the default DL BWP for a wireless device. Reconfiguring the default DL BWP may be performed based on load balancing and/or different numerologies used for an active DL BWP and an initial active DL BWP. A default BWP on a PCell may be an initial active DL BWP for a transmission of RMSI. The transmission of RMSI may comprise one or more of an RMSI CORESET with a CSS, and/or a wireless device-specific search space (e.g., USS). The initial active BWP and/or default BWP may remain an active BWP for a user after a wireless device becomes RRC connected.

Downlink and uplink BWPs may be independently activated, such as for a paired spectrum. Downlink and uplink bandwidth parts may be jointly activated, such as for an unpaired spectrum. In bandwidth adaptation (e.g., where the bandwidth of the active downlink BWP may be changed), a joint activation of a new downlink BWP and a new uplink BWP may be performed (e.g., for an unpaired spectrum). A new DL/UL BWP pair may be activated such that the bandwidth of the uplink BWPs may be the same (e.g., there may not be a change of an uplink BWP).

There may be an association of DL BWP and UL BWP in RRC configuration. For example, a wireless device may not retune the center frequency of a channel bandwidth (BW) between DL and UL, such as for TDD. If the RF is shared between DL and UL (e.g., in TDD), a wireless device may not retune the RF BW for every alternating DL-to-UL and UL-to-DL switching.

Applying an association between a DL BWP and an UL BWP may enable an activation and/or deactivation command to switch both DL and UL BWPs. Such switching may comprise switching a DL BWP together with switching an UL BWP. If an association is not applied between a DL BWP and an UL BWP, separate BWP switching commands may be necessary.

A DL BWP and an UL BWP may be configured separately for the wireless device. Pairing of the DL BWP and the UL BWP may impose constraints on the configured BWPs (e.g., the paired DL BWP and UL BWP may be activated simultaneously or near simultaneously such as within a threshold time period). A base station may indicate a DL BWP and an UL BWP to a wireless device for activation, for example, in a FDD system. A base station may indicate to a wireless device a DL BWP and an UL BWP with the same center frequency for activation, for example, in a TDD system. No pairing and/or association of the DL BWP and UL BWP may be mandatory, even for TDD system, for example, if the activation and/or deactivation of the BWP for the wireless device is instructed by the base station. Pairing and/or association of the DL BWP and UL BWP may be determined by a base station.

An association between a DL carrier and an UL carrier within a serving cell may be performed by carrier association. A wireless device may not be expected to retune the center frequency of a channel BW between DL and UL, such as for a TDD system. An association between a DL BWP and an UL BWP may be required for a wireless device. An association may be performed by grouping DL BWP configurations with same center frequency as one set of DL BWPs and grouping UL BWP configurations with same center frequency as one set of UL BWPs. The set of DL BWPs may be associated with the set of UL BWPs sharing the same center frequency. There may be no association between a DL BWP and an UL BWP, for example, if the association between a DL carrier and an UL carrier within a serving cell may performed by carrier association, such as for an FDD serving cell.

A wireless device may identify a BWP identity from a DCI, which may simplify an indication process. The total number of bits for a BWP identity may depend on the number of bits that may be used within a scheduling DCI (and/or a switching DCI), and/or the wireless device minimum BW. The number of BWPs may be determined based on the wireless device supported minimum BW and/or the network maximum BW. The maximum number of BWPs may be determined based on the network maximum BW and/or the wireless device minimum BW. For example, if 400 MHz is the network maximum BW and 50 MHz is the wireless device minimum BW, 8 BWPs may be configured to the wireless device such that 3 bits may be required within the DCI to indicate the BWP. Such a split of the network BW (e.g., depending on the wireless device minimum BW) may be useful for creating one or more default BWPs from the network side by distributing wireless devices across the entire network BW (e.g., for load balancing purposes).

At least two DL and two UL BWPs may be supported by a wireless device for a BWP adaption. The total number of BWPs supported by a wireless device may be given by 2≤number of DL/UL BWP≤floor (network maximum BW/wireless device minimum DL/UL BW), where floor(x) may be a floor function that returns the greatest integer being less than or equal to x. For example, a maximum number of configured BWPs may be four for DL and UL, respectively, or a maximum number of configured BWPs for UL may be two. Any other number of BWPs, for example, greater than or equal to 2 and less than or equal to a floor, may be supported by a wireless device.

Different sets of BWPs may be configured for different DCI formats and/or scheduling types, respectively. BWPs may be configured for non-slot-based scheduling (e.g., for larger BWPs) or for slot-based scheduling (e.g., for smaller BWPs). If different DCI formats are defined for slot-based scheduling and non-slot-based scheduling, different BWPs may be configured for different DCI formats. Different BWP configurations may provide flexibility between different scheduling types without increasing DCI overhead. A 2-bit field may be used to indicate a BWP among four BWPs for a DCI format. For example, four DL BWPs or two or four UL BWPs may be configured for each DCI format. The same or different BWPs may be configured for different DCI formats.

A required maximum number of configured BWPs (which may exclude the initial BWP) may depend on the flexibility needed for a BWP functionality. It may be sufficient to be able to configure one DL BWP and one UL BWP (or a single DL/UL BWP pair for an unpaired spectrum), which may correspond to minimal support of bandlimited devices. There may be a need to configure at least two DL BWPs and at least a single uplink BWP for a paired spectrum (or two DL/UL BWP pairs for an unpaired spectrum), such as to support bandwidth adaptation. There may be a need to configure one or more DL (or UL) BWPs that jointly cover different parts of the downlink (or uplink) carrier, such as to support dynamic load balancing between different parts of the spectrum. Two BWPs may be sufficient, for example, for dynamic load balancing. In addition to the two BWPs, two other BWPs may be needed, such as for bandwidth adaptation. A maximum number of configured BWPs may be four DL BWPs and two UL BWPs for a paired spectrum. A maximum number of configured BWPs may be four DL/UL BWP pairs for an unpaired spectrum.

A wireless device may monitor for RMSI and broadcasted OSI, which may be transmitted by a base station within a common search space (CSS) on the PCell. RACH response and paging control monitoring on the PCell may be transmitted within the CSS. A wireless device may not monitor the common search space, for example, if the wireless device is allowed to be on an active BWP configured with a wireless device-specific search space (USSS or USS).

At least one of configured DL bandwidth parts may comprise at least one CORESET with a CSS type, such as for a PCell. To monitor RMSI and broadcast OSI, the wireless device may periodically switch to the BWP containing the CSS. The wireless device may periodically switch to the BWP containing the CSS for RACH response and paging control monitoring on the PCell.

BWP switching to monitor the CSS may result in increasing overhead, for example, if the BWP switching occurs frequently. The overhead due to the CSS monitoring may depend on an overlapping in frequency between any two BWPs. In a nested BWP configuration (e.g., where one BWP may be a subset of another BWP), the same CORESET configuration may be used across the BWPs. A default BWP may comprise the CSS, and another BWP may comprise the CSS, for example, if the default BWP is a subset of another BWP. The BWPs may be partially overlapping. A CSS may be across a first BWP and a second BWP, for example, if the overlapping region is sufficient. Two non-overlapping BWP configurations may exist.

There may be one or more benefits from configuring the same CORESET containing the CSS across BWPs. For example, the RMSI and broadcast OSI monitoring may be performed without necessitating BWP switching, RACH response and paging control monitoring on the PCell may be performed without switching, and/or robustness for BWP switching may improve. A base station and a wireless device may be out-of-sync as to which BWP is currently active and the DL control channel may still work, for example, if CORESET configuration is the same across BWPs. One or more constraints on BWP configuration may be acceptable. A BWP may provide power saving, such that various configurations, including a nested configuration, may be very versatile for different applications.

Group-common search space (GCSS) may be supported (e.g., in NR). The GCSS may be used in addition to or as an alternative to CSS for certain information. A base station may configure GCSS within a BWP for a wireless device. Information such as RACH response and paging control may be transmitted on GCSS. The wireless device may monitor GCSS, for example, instead of switching to the BWP containing the CSS for such information. A base station may transmit information on GCSS, for example, for a pre-emption indication and other group-based commands on a serving cell. A wireless device may monitor the GCSS for the information (e.g., for the SCell which may not have CSS).

A CORESET may be configured without using a BWP. The CORESET may be configured based on a BWP, which may reduce signaling overhead. A first CORESET for a wireless device during an initial access may be configured based on a default BWP. A CORESET for monitoring PDCCH for RAR and paging may be configured based on a DL BWP. The CORESET for monitoring group common (GC)-PDCCH for SFI may be configured based on a DL BWP. The CORESET for monitoring GC-DCI for a pre-emption indication may be configured based on a DL BWP. A BWP index may be indicated in the CORESET configuration. A default BWP index may not be indicated in the CORESET configuration.

A contention-based random access (CBRA) RACH procedure may be supported via an initial active DL BWP and/or an initial active UL BWP, for example, if the wireless device identity is unknown to the base station. The contention-free random access (CFRA) RACH procedure may be supported via the USS configured in an active DL BWP for the wireless device. An additional CSS for RACH purposes may not need to be configured per BWP, such as for the CFRA RACH procedure supported via the USS configured in an active DL BWP for the wireless device. Idle mode paging may be supported via an initial active DL BWP. Connected mode paging may be supported via a default BWP. No additional configurations for the BWP for paging purposes may be needed for paging. A configured BWP (e.g., on a serving cell) may have the CSS configured for monitoring pre-emption indications for a pre-emption.

A group-common search space may be associated with at least one CORESET configured for the same DL BWP (e.g., for a configured DL BWP). The wireless device may or may not autonomously switch to a default BWP (e.g., where a group-common search space may be available) to monitor for a DCI, for example, depending on the monitoring periodicity of different group-common control information types. A group-common search space may be configured in the same CORESET, for example, if there is at least one CORESET configured on a DL BWP.

A center frequency of an activated DL BWP may or may not be changed. If the center frequency of the activated DL BWP and the deactivated DL BWP is not aligned, the active UL BWP may be switched implicitly (e.g., for TDD).

BWPs with different numerologies may be overlapped. Rate matching for CSI-RS and/or SRS of another BWP in the overlapped region may be performed, which may achieve dynamic resource allocation of different numerologies in a FDM and/or a TDM manner. For a CSI measurement within one BWP, if the CSI-RS and/or SRS collides with data and/or an RS in another BWP, the collision region in another BWP may be rate matched. CSI information over the two or more BWPs may be determined by a base station based on wireless device reporting. Dynamic resource allocation with different numerologies in a FDM manner may be achieved by base station scheduling.

PUCCH resources may be configured in a configured UL BWP, in a default UL BWP, and/or in both a configured UL BWP and a default UL BWP. If the PUCCH resources are configured in the default UL BWP, a wireless device may retune to the default UL BWP for transmitting an SR. The PUCCH resources may be configured per a default BWP or per a BWP other than the default BWP. The wireless device may transmit an SR in the current active BWP without retuning. If a configured SCell is activated for a wireless device, a DL BWP may be associated with an UL BWP at least for the purpose of PUCCH transmission, and/or a default DL BWP may be activated. If the wireless device is configured for UL transmission in the same serving cell, a default UL BWP may be activated.

At least one of configured DL BWPs may comprise one CORESET with common search space (CSS), for example, at least in a primary component carrier. The CSS may be needed at least for RACH response (e.g., a msg2) and/or a pre-emption indication. One or more of configured DL bandwidth parts for a PCell may comprise a CORESET with the CSS type for RMSI and/or OSI, for example, if there is no periodic gap for RACH response monitoring on the PCell. A configured DL BWP for a PCell may comprise one CORESET with the CSS type for RACH response and paging control for a system information update. A configured DL BWP for a serving cell may comprise a CORESET with the CSS type for a pre-emption indication and/or other group-based commands.

BWPs may be configured with respect to common reference point (e.g., PRB 0) on a component carrier. The BWPs may be configured using TYPE1 RA as a set of contiguous PRBs, with PRB granularity for the START and LENGTH. The minimum length may be determined by the minimum supported size of a CORESET. A CSS may be configured on a non-initial BWP, such as for RAR and paging.

To monitor common channel or group common channel for a connected wireless device (e.g., RRC CONNECTED UE), an initial DL BWP may comprise a control channel for RMSI, OSI, and/or paging. The wireless device may switch a BWP to monitor such a control channel. A configured DL BWP may comprise a control channel (e.g., for a Msg2). A configured DL BWP may comprise a control channel for a SFI. A configured DL BWP may comprise a pre-emption indication and/or other group common indicators such as for power control.

A DCI may explicitly indicate activation and/or deactivation of a BWP. A DCI without data assignment may comprise an indication to activate and/or deactivate BWP. A wireless device may receive a first indication via a first DCI to activate and/or deactivate a BWP. A second DCI with a data assignment may be transmitted by the base station, for example, for a wireless device to start receiving data. The wireless device may receive the first DCI in a target CORESET within a target BWP. A base station scheduler may make conservative scheduling decisions, for example, until the base station receives CSI feedback.

A DCI without scheduling for active BWP switching may be transmitted, for example, to measure the CSI before scheduling. A DCI with scheduling for active BWP switching may comprise setting the resource allocation field to zero, such that no data may be scheduled. Other fields in the DCI may comprise one or more CSI and/or SRS request fields.

Single scheduling a DCI to trigger active BWP switching may provide dynamic BWP adaptation for wireless device power saving during active state. Wireless device power saving during active state may occur for an ON duration, and/or if an inactivity timer is running and/or if C-DRX is configured. A wireless device may consume a significant amount of power monitoring PDCCH, without decoding any grant, for example if a C-DRX is enabled. To reduce the power consumption during PDCCH monitoring, two BWPs may be configured: a narrower BWP for PDCCH monitoring, and a wider BWP for scheduled data. The wireless device may switch back-and-forth between the narrower BWP and the wider BWP, depending on the burstiness of the traffic. The wireless device may revisit a BWP that it has previously used. Combining a BWP switching indication and a scheduling grant may provide an advantage of low latency and/or reduced signaling overhead for BWP switching.

An SCell activation and/or deactivation may or may not trigger a corresponding action for its configured BWP. A dedicated BWP activation and/or deactivation DCI may impact a DCI format. A scheduling DCI with a dummy grant may be used. The dummy grant may be constructed by invalidating one or some of the fields, such as the resource allocation field. A fallback scheduling DCI format (which may contain a smaller payload) may be used, which may improve the robustness for BWP DCI signaling without incurring extra work by introducing a new DCI format.

A DCI with data assignment may comprise an indication to activate and/or deactivate a BWP along with a data assignment. A wireless device may receive a combined data allocation and BWP activation and/or deactivation message. A DCI format may comprise a field to indicate BWP activation and/or deactivation and/or a field indicating an UL grant and/or a DL grant. The wireless device may start receiving data with a single DCI, such as the DCI format described above. The DCI may indicate one or more target resources of a target BWP. A base station scheduler may have insufficient information about the CSI in the target BW and may make conservative scheduling decisions.

The DCI may be transmitted on a current active BWP, and scheduling information may be for a new BWP, for example, for the DCI with data assignment. There may be a single active BWP. There may be one DCI in a slot for scheduling the current BWP or scheduling another BWP. The same CORESET may be used for the DCI scheduling of the current BWP and the DCI scheduling of another BWP. The DCI payload size for the DCI scheduling current BWP and the scheduling DCI for BWP switching may be the same, which may reduce the number of blind decoding attempts.

In A BWP group may be configured by a base station, in which a numerology in one group may be the same, which may support using the scheduling DCI for BWP switching. The BWP switching for the BWP group may be configured, such that BIF may be present in the CORESETs for one or more BWPs in the group. Scheduling DCI for BWP switching may be configured per BWP group, in which an active BWP in the group may be switched to any other BWP in the group.

A DCI comprising a scheduling assignment and/or grant may not comprise an active-BWP indicator. A scheduling DCI may switch a wireless devices active BWP to the transmission direction for which the scheduling is valid (e.g., for a paired spectrum). A scheduling DCI may switch the wireless devices active DL/UL BWP pair regardless of the transmission direction for which the scheduling is valid (e.g., for an unpaired spectrum). A downlink scheduling assignment and/or grant with no assignment may occur, which may allow for a switching of an active BWP without scheduling downlink and/or uplink transmissions.

A timer-based activation and/or deactivation BWP may be supported. A timer for activation and/or deactivation of DL BWP may reduce signaling overhead and may allow wireless device power savings. The activation and/or deactivation of a DL BWP may be based on an inactivity timer, which may be referred to as a BWP inactive (or inactivity) timer. A wireless device may start and/or reset a timer upon reception of a DCI. The timer may expire, for example, if the wireless device is not scheduled for the duration of the timer. The wireless device may activate and/or deactivate the appropriate BWP based on the expiry of the timer. The wireless device may, for example, activate the default BWP and/or deactivate the active BWP.

A BWP inactive timer may be beneficial for power saving for a wireless device. A wireless device may reduce power, for example, by switching to a default BWP with a smaller bandwidth. A wireless device may use a BWP inactive timer, for example, for a fallback if missing a DCI based activation and/or deactivation signaling, such as by switching from one BWP to another BWP. Triggering conditions of the BWP inactive timer may follow triggering conditions for the DRX timer in LTE or any other system. An on-duration of the BWP inactive timer may be configured and/or the timer may start, for example, if a wireless device-specific PDCCH is successfully decoded indicating a new transmission during the on-duration. The timer may restart, for example, if a wireless device-specific PDCCH is successfully decoded indicating a new transmission. The timer may stop, for example, if the wireless device is scheduled to switch to the default DL BWP. The BWP inactive timer may start, for example, if the wireless device switches to a new DL BWP. The timer may restart, for example, if a wireless device-specific PDCCH is successfully decoded, wherein the wireless device-specific PDCCH may be associated with a new transmission, a retransmission, SPS activation and/or deactivation, or another purpose.

A wireless device may switch to a default BWP, for example, if the wireless device does not receive any control and/or data from the network during the running of the BWP inactive timer. The timer may be reset, for example, upon reception of any control and/or data. The timer may be triggered, for example, if wireless device receives a DCI to switch its active DL BWP from the default BWP to another BWP. The timer may be reset, for example, if a wireless device receives a DCI to schedule PDSCH(s) in the BWP other than the default BWP.

A DL BWP inactive timer may be defined separately from a UL BWP inactive timer. Timers for the DL BWP and UL BWP may be set independently and/or jointly. For the separate timers (e.g., if there is DL data and UL timer expires), UL BWP may not be deactivated since PUCCH configuration may be affected if both DL BWP and UL BWP are activated. For the uplink, if there is UL feedback signal related to DL transmission, the timer may be reset. The UL timer may not be set if there is DL data. If there is UL data and the DL timer expires, there may be no issue if the DL BWP is deactivated since UL grant is transmitted in the default DL BWP. A BWP inactivity-timer may allow fallback to default BWP on a PCell and/or SCell.

A timer-based activation and/or deactivation of BWP may be similar to a wireless device DRX timer. There may not be a separate inactivity timer for BWP activation and/or deactivation for the wireless device DRX timer. A wireless device DRX inactivity timer may trigger BWP activation and/or deactivation. There may be separate inactivity timers for BWP activation and/or deactivation for the wireless device DRX timer. For example, the DRX timers may be defined in a MAC layer, and the BWP timer may be defined in a physical layer. A wireless device may stay in a wider BWP for as long as the inactivity timer is running, for example, if the same DRX inactivity timer is used for BWP activation and/or deactivation. The DRX inactivity timer may be set to a large value of 100~200 milliseconds for a C-DRX cycle of 320 milliseconds, which may be larger than the ON duration (e.g., 10 milliseconds). Setting the DRX inactivity timer in the above manner may provide power savings, for example, based on a narrower BWP not being achievable. To realize wireless device power saving promised by BWP switching, a new timer may be defined and it may be configured to be smaller than the DRX inactivity timer. From the point of view of DRX operation, BWP switching may allow wireless device to operate at different power levels during the active state, effectively providing intermediate operating points between the ON and OFF states.

With a DCI explicit activation and/or deactivation of BWP, a wireless device and a base station may not be synchronized with respect to which BWP is activated and/or deactivated. The base station scheduler may not have CSI information related to a target BWP for channel-sensitive scheduling. The base station may be limited to conservative scheduling for one or more first several scheduling occasions. The base station may rely on periodic or aperiodic CSI-RS and associated CQI report(s) to perform channel-sensitive scheduling. Relying on periodic or aperiodic CSI-RS and associated CQI report(s) may delay channel-sensitive scheduling and/or lead to signaling overhead, such as if aperiodic CQI is requested (e.g., by a base station). To mitigate a delay in acquiring synchronization and channel state information, a wireless device may transmit an acknowledgement upon receiving an activation and/or deactivation of a BWP. A CSI report based on the provided CSI-RS resource may be transmitted after activation of a BWP and may be used as acknowledgment of activation and/or deactivation.

A base station may provide a sounding reference signal for a target BWP after a wireless device tunes to a new BWP. The wireless device may report the CSI, which may be used as an acknowledgement by the base station to confirm that the wireless device receives an explicit DCI command and activates and/or deactivates the appropriate BWPs. For an explicit activation and/or deactivation via DCI with data assignment, a first data assignment may be carried out without a CSI for the target BWP A guard period may be defined to take RF retuning and related operations into account. A wireless device may neither transmit nor receive signals in the guard period. A base station may need to know the length of the guard period. For example, the length of the guard period may be reported to the base station as a wireless device capability. The length of the guard period may be based on the numerologies of the BWPs and the length of the slot. The length of the guard period for RF retuning may be reported as a wireless device capability. The wireless device may report the guard period as an absolute time and/or in symbols.

The base station may maintain the time domain position of guard period in alignment between the base station and the wireless device, for example, if the base station knows the length of the guard period. The guard period for RF retuning may be predefined for time pattern triggered BWP switching. The BWP switching and/or guard period may be triggered by DCI and/or a timer. For BWP switching following a time pattern, the position of the guard period may be defined. The guard period may not affect the symbols carrying CSS, for example, if the wireless device is configured to switch periodically to a default BWP for CSS monitoring.

A single DCI may switch the wireless device's active BWP from one to another within a given serving cell. The active BWP may be switched to a second BWP of the same link direction, for example an UL BWP or a DL BWP. A separate field may be used in the scheduling DCI to indicate the index of the BWP for activation such that wireless device may determine the current DL/UL BWP according to a detected DL/UL grant without requiring any other control information. The multiple scheduling DCIs transmitted in this duration may comprise the indication to the same BWP, for example, if the BWP change does not happen during a certain time duration. During the transit time wherein potential ambiguity may happen, base station may send scheduling grants in the current BWP or together in the other BWPs containing the same target BWP index, such that wireless device may obtain the target BWP index by detecting the scheduling DCI in either one of the BWPs. The duplicated scheduling DCI may be transmitted an arbitrary number (e.g., K) times. A wireless device may switch to the target BWP and start to receive or transmit (UL) in the target BWP according to the BWP indication field, for example, if the wireless device receives one of the K times transmissions.

Switching between BWPs may introduce time gaps, for example, if wireless device is unable to receive one or more messages due to re-tuning. Breaks of several time slots may severely affect the TCP ramp up as the wireless device may not be able to transmit and receive during those slots, affecting obtained RTT and data rate. A break in reception may make wireless device out of reach from network point of view reducing network interest to utilize short inactivity timer. If BWP switching takes significant time and a wireless device requires new reference symbols to update AGC, channel estimation, etc., active BWP switching may not be adopted in the wireless device. In some configurations, BWP switching may be performed where the BWP center frequency remains the same if switching between BWPs.

A frequency location of a wireless device's RF bandwidth may be indicated by a base station. The RF bandwidth of the wireless device may be smaller than the carrier bandwidth for considering the wireless device RF bandwidth capability. The supported RF bandwidth for a wireless device is usually a set of discrete values (e.g., 10 MHz, 20 MHz, 50 MHz, etc.). For energy saving purpose, the wireless device RF bandwidth may be determined as the minimum available bandwidth supporting the bandwidth of the BWP. The granularity of BWP bandwidth may be PRB level, which may be decoupled with wireless device RF bandwidth. As a result, the wireless device RF bandwidth may be larger than the BWP bandwidth. The wireless device may receive signals outside the carrier bandwidth, especially if the BWP is configured near the edge of the carrier bandwidth. Inter-system interference or the interference from an adjacent cell outside the carrier bandwidth may affect the receiving performance of the BWP. To keep the wireless device RF bandwidth in the carrier bandwidth, the frequency location of the wireless device RF bandwidth may be indicated by the base station.

A gap duration may be determined based on a measurement duration and a retuning gap. The retuning gap may vary. If a wireless device does not need to switch its center, the retuning may be relatively short, such as 20 μs. A wireless device may indicate the necessary retuning gap for a measurement configuration, for example, if the network may not know whether the wireless device needs to switch its center or not to perform measurement. The retuning gap may depend on the current active BWP that may be dynamically switched via a switching mechanism. Wireless devices may need to indicate the retuning gap dynamically.

The measurement gap may be indirectly created, for example, if the network may configure a certain measurement gap. The measurement gap may comprise the smallest retuning latency. The smallest returning latency may be determined, for example, if a small retuning gap may be utilized and/or if both measurement bandwidth and active BWP is included within the wireless device maximum RF capability and the center frequency of the current active BWP may be not changed. The wireless device may skip receiving and/or transmitting, for example, if a wireless device needs more gap than the configured.

A different measurement gap and retuning gap may be utilized for RRM and CSI. For CSI measurement, if periodic CSI measurement outside of active BWP may be configured, a wireless device may need to perform its measurement periodically per measurement configuration. For RRM, it may be up to wireless device implementation where to perform the measurement as long as it satisfies the measurement requirements. The worst case retuning latency for a measurement may be used. As the retuning latency may be different between intra-band and inter-band retuning, separate measurement gap configurations between intra-band and inter-band measurement may be considered.

A respective DCI format may comprise an explicit identifier to distinguish them, for example, for multiple DCI formats with the same DCI size of a same RNTI. The same DCI size may come from zero-padding bits in at least a wireless device-specific search space.

In BWP switching, a DCI in the current BWP may need to indicate resource allocation in the next BWP that the wireless device may be expected to switch. The resource allocation may be based on the wireless device-specific PRB indexing, which may be per BWP. A range of the PRB indices may change as the BWP changes. The DCI to be transmitted in the current BWP may be based on the PRB indexing for the current BWP. The DCI may need to indicate the RA in the new BWP, which may cause a resource conflict. To resolve the conflict without significantly increasing wireless devices blind detection overhead, the DCI size and bit fields may not change per BWP for a given DCI type.

As the range of the PRB indices may change as the BWP changes, one or more employed bits among the total bit field for RA may be dependent on the employed BWP. A wireless device may use the indicated BWP ID that the resource allocation may be intended to identify the resource allocation bit field.

The DCI size of the BWP may be based on a normal DCI detection without BWP retuning and/or on a DCI detection during the BWP retuning. A DCI format may be independent of the BW of the active DL/UL BWP, which may be called as fallback DCI. At least one of DCI format for DL may be configured to have the same size for a wireless device for one or more configured DL BWPs of a serving cell. At least one of the DCI formats for UL may be configured to have the same size for a wireless device for one or more configured UL BWPs of a serving cell. A BWP-dependent DCI format may be monitored at the same time (e.g. a normal DCI) for both active DL BWP and active UL BWP. A wireless device may monitor both DCI formats at the same time. A base station may assign the fallback DCI format to avoid ambiguity during a transition period in the BWP activation and/or deactivation.

If a wireless device is configured with multiple DL or UL BWPs in a serving cell, an inactive DL and/or UL BWP may be activated by a DCI scheduling a DL assignment or UL grant in the BWP. As the wireless device may be monitoring the PDCCH on the currently active DL BWP, the DCI may comprise an indication to a target BWP that the wireless device may switch to for PDSCH reception or UL transmission. A BWP indication may be inserted in the wireless device-specific DCI format. The bit width of this field may depend on the maximum possible and/or presently configured number of DL and/or UL BWPs. The BWP indication field may be a fixed size based on the maximum number of configured BWPs.

A DCI format size may match the BW of the BWP in which the PDCCH may be received. To avoid an increase in the number of blind decodes, the wireless device may identify the RA field based on the scheduled BWP. For a transition from a small BWP to a larger BWP, the wireless device may identify the RA field as being the LSBs of the required RA field for scheduling the larger BWP.

The same DCI size for scheduling different BWPs may be defied by keeping the same size of resource allocation fields for one or more configured BWPs. A base station may be aware of a wireless device switching BWPs based on a reception of ACK/NACK from the wireless device. The base station may not be aware of a wireless device switching BWPs, for example, if the base station does not receive at least one response from the wireless device. To avoid such a mismatch between base station and wireless device, a fallback mechanism may be used. The base station may transmit the scheduling DCI for previous BWPs and for newly activated BWP since the wireless device may receive the DCI on either BWP, for example, if there is no response from the wireless device. The base station may confirm the completion of the active BWP switching, for example, after or in response to the base station receiving a response from the wireless device. The base station may not transmit multiple DCIs, for example, if the same DCI size for scheduling different BWPs may be considered and CORE-SET configuration may be the same for different BWPs. DCI format(s) may be configured user-specifically per cell rather than per BWP. The wireless device may start to monitor pre-configured search-space on the CORESET, for example, if a wireless device synchronizes to a new BWP.

The size of DCI format in different BWPs may vary and may change at least due to different size of RA bitmap on different BWPs. The size of DCI format configured in a cell for a wireless device may be dependent on scheduled BWPs. If the DCI formats may be configured per cell, the corresponding header size in DCI may be relatively small.

The monitored DCI format size on a search-space of a CORESET may be configurable with sufficiently fine granularity and/or the granularity may be predefined. The monitored DCI format size with sufficient granularity may be beneficial, for example, if a base station may freely set the monitoring DCI format size on the search-spaces of a CORESET. The DCI format size may be set such that it may accommodate the largest actual DCI format size variant among one or more BWPs configured in a serving cell.

For a wireless device-specific serving cell, one or more DL BWPs and one or more UL BWPs may be configured by a dedicated RRC for a wireless device. This may be done as part of the RRC connection establishment procedure for a PCell. For an SCell, this may be done via RRC configuration indicating the SCell parameters.

A default DL and/or a default UL BWP may be activated since there may be at least one DL and/or UL BWP that may be monitored by the wireless device depending on the properties of the SCell (DL only, UL only, or both), for example, if a wireless device receives an SCell activation command. The BWP may be activated upon receiving an SCell activation command. The BWP may be informed to the wireless device via the RRC configuration that configured the BWP on this serving cell. For an SCell, RRC signaling for SCell configuration/reconfiguration may be used to indicate which DL BWP and/or UL BWP may be activated if the SCell activation command is received by the wireless device. The indicated BWP may be the initially active DL and/or UL BWP on the SCell. The SCell activation command may activate DL and/or UL BWP.

For an SCell, RRC signaling for the SCell configuration/reconfiguration may be used for indicating a default DL BWP on the SCell. The default DL BWP may be used for fallback purposes. The default DL BWP may be same or different from the initially activated DL and/or UL BWP indicated to wireless device as part of the SCell configuration. A default UL BWP may be configured to a wireless device for transmitting PUCCH for SR, for example, if the PUCCH resources are not configured in every BWP for SR.

An SCell may be for DL only. For a DL only SCell, a wireless device may keep monitoring an initial DL BWP (e.g., initial active or default) until the wireless device receives SCell deactivation command. An SCell may be for UL only. For the UL only SCell, the wireless device may transmit on the indicated UL BWP, for example, if a wireless device receives a grant. The wireless device may not maintain an active UL BWP if wireless device does not receive a grant. A failure to maintain the active UL BWP due to a grant not being received may not deactivate the SCell. An SCell may be for UL and DL. For a UL and DL SCell, a wireless device may keep monitoring an initial DL BWP (e.g., initial active or default) until the wireless device receives an SCell deactivation command. The UL BWP may be used if there may be a relevant grant or an SR transmission.

A BWP deactivation may not result in a SCell deactivation. The active DL and/or UL BWPs may be considered deactivated, for example, if the wireless device receives the SCell deactivation command.

A wireless device may be expected to perform RACH procedure on an SCell during activation. Activation of UL BWP may be needed for the RACH procedure. At an SCell activation, DL only (only active DL BWP) and/or DL/UL (both DL/UL active BWP) may be configured. A wireless device may select default UL BWP based on measurement or the network configures which one in its activation.

One or more BWPs may be semi-statically configured via wireless device-specific RRC signaling. If a wireless device maintains RRC connection with a primary component carrier (CC), the BWP in a secondary CC may be configured via RRC signaling in the primary CC. One or more BWPs may be semi-statically configured to a wireless device via RRC signaling in a PCell. A DCI transmitted in an SCell may indicate a BWP among the one or more configured BWP and grant detailed resource based on the indicated BWP. For cross-CC scheduling, a DCI transmitted in a PCell may indicate a BWP among the one or more configured BWPs, and grants detailed resource based on the indicated BWP.

A DL BWP may be initially activated for configuring CORESET for monitoring the first PDCCH in the SCell, for example, if an SCell may be activated. The DL BWP may serve as a default DL BWP in the SCell. For the wireless device performing initial access via a SS block in PCell, the default DL BWP in an SCell may not be derived from SS block for initial access. The default DL BWP in an SCell may be configured by RRC signaling in the PCell.

An indication indicating which DL BWP and/or which UL BWP are active may be in the RRC signaling for SCell configuration and/or reconfiguration, for example, if an SCell is activated. The RRC signaling for SCell configuration/reconfiguration may be used for indicating which DL BWP and/or which UL BWP are initially activated if the SCell may be activated. An indication indicating which DL BWP and/or which UL BWP are active may be in the SCell activation signaling, for example, if an SCell is activated. SCell activation signaling may be used for indicating which DL BWP and/or which UL BWP are initially activated if the SCell may be activated.

For PCells and SCells, initial default BWPs for DL and UL (e.g., for RMSI reception and PRACH transmission) may be valid until at least one BWP is configured for the DL and UL via RRC wireless device-specific signaling respectively. The initial default DL/UL bandwidth parts may become invalid and new default DL/UL bandwidth parts may take effect. The SCell configuration may comprise default DL/UL bandwidth parts.

An initial BWP on a PCell may be defined by a master information block (MIB). An initial BWP and default BWP may be separately configurable for the SCell. An initial BWP may be the widest configured BWP of the SCell. A wireless device may retune to a default BWP that may be the narrow BWP. The SCell may be active and may be ready to be opened if an additional data burst arrives.

A BWP on SCell may be activated by means of cross-cell scheduling DCI. The cross-cell scheduling may be configured for a wireless device. The base station may activate a BWP on the SCell by indicating CIF and BWP in the scheduling DCI.

A wireless device and/or base station may perform synchronization tracking within an active DL BWP without a SS block. A tracking reference signal (TRS) and/or the DL BWP configuration may be configured. A DL BWP with a SS block or TRS may be configured as a reference for synchronization tracking.

SS-block based RRM measurements may be decoupled within the BWP framework. Measurement configurations for each RRM and CSI feedback may be independently configured from the BWP configurations. CSI and SRS measurements/transmissions may be performed within the BWP framework.

For a modulation coding scheme (MCS) assignment of the first one or more DL data packets after active DL BWP switching, the network may assign robust MCS to a wireless device for the first one or more DL data packets based on RRM measurement reporting. For a MCS assignment of the first one or more DL data packets after active DL BWP switching, the network may signal to a wireless device by active DL BWP switching DCI to trigger aperiodic CSI measurement/reporting to speed up link adaptation convergence. For a wireless device, periodic CSI measurement outside the active BWP in a serving cell may not supported. For a wireless device, RRM measurement outside active BWP in a serving cell may be supported. For a wireless device, RRM measurement outside configured BWPs in a serving cell may be supported. RRM measurements may be performed on a SSB and/or CSI-RS. The RRM/RLM measurements may be independent of BWPs.

A wireless device may not be configured with aperiodic CSI reports for non-active DL BWPs. The CSI measurement may be obtained after the BW opening and the wide-band CQI of the previous BWP may be used as starting point for the other BWP on the component carrier.

A wireless device may perform CSI measurements for the BWP before scheduling. Before scheduling on a new BWP, a base station may intend to find the channel quality on the potential new BWPs before scheduling the user on that BWP. The wireless device may switch to a different BWP and measure channel quality for the BWP and then transmit the CSI report. There may be no scheduling neededcase.

One or more scheduling request (SR) configurations may be configured for a BWP of a cell for a wireless device. A wireless device may use SR resources configured by the SR configurations in a BWP to indicate to the base station the numerology/TTI/service type of a logical channel (LCH) or logical channel group (LCG) that triggered the SR. The maximum number of SR configurations may be the maximum number of logical channels/logical channel groups.

There may be at most one active DL BWP and at most one active UL BWP at a given time for a serving cell. A BWP of a cell may be configured with a specific numerology and/or TTI. For a logical channel and/or logical channel group that triggers a SR transmission while the wireless device operates in one active BWP, the corresponding SR may remain triggered based on BWP switching.

The logical channel and/or logical channel group to SR configuration mapping may be configured and/or reconfigured based on switching of the active BWP. The RRC dedicated signaling may configure and/or reconfigure the logical channel and/or logical channel group to SR configuration mapping on the new active BWP if the active BWP is switched.

Mapping between the logical channel and/or logical channel group to SR configuration may be configured when BWP is configured. RRC may pre-configure mapping between logical channel and/or logical channel group to SR configurations for all the configured BWPs. In response to the switching of the active BWP, the wireless device may employ the RRC configured mapping relationship for the new BWP. If BWP is configured, RRC may configure the mapping between logical channel and SR configurations for the BWA mapping between a logical channel and/or logical channel group and SR configuration may be configured if a BWP is configured. The RRC may pre-configure mapping between logical channels and/or logical channel groups to SR configurations for the configured BWPs. Based on switching of the active BWP, a wireless device may use the RRC configured mapping relationship for the new BWP. A RRC may configure the mapping between logical channel and SR configurations for the BWP. The sr-ProhibitTimer and SR_COUNTER corresponding to a SR configuration may continue and the value of the sr-ProhibitTimer and the value of the SR_COUNTER may be their values before the BWP switchingP.

A plurality of logical channel/logical channel group to SR configuration mappings may be configured in a serving cell. A logical channel/logical channel group may be mapped to at most one SR configuration per BWP. A logical channel/ logical channel group mapped onto multiple SR configurations in a serving cell may have one SR configuration active at a time, such as that of the active BWP. A plurality of logical channel/logical channel group to SR-configuration mappings may be supported in carrier aggregation (CA). A logical channel/logical channel group may be mapped to one (or more) SR configuration(s) in each of PCell and PUCCH-SCell. A logical channel/logical channel group configured to be mapped to one (or more) SR configuration(s) in each of both PCell and PUCCH-SCell may have two active SR configurations (one on PCell and one on PUCCH-SCell) at a time for CA. The SR resource is received first may be used.

A base station may configure one SR resource per BWP for the same logical channel/logical channel group. If a SR for one logical channel/logical channel group is pending, a wireless device may transmit a SR with the SR configuration in another BWP after BWP switching. The sr-ProhibitTimer and SR_COUNTER for the SR corresponding to the logical channel/logical channel group may continue based on BWP switching. The wireless device may transmit the SR in another SR configuration corresponding to the logical channel/logical channel group in another BWP after BWP switching if a SR for one logical channel/logical channel group may be pending.

If multiple SRs for logical channels/logical channel groups mapped to different SR configurations are triggered, the wireless device may transmit one SR corresponding to the highest priority logical channel/logical channel group. The wireless device may transmit multiple SRs with different SR configurations. SRs triggered at the same time (e.g., in the same NR-UNIT) by different logical channels/logical channel groups mapped to different SR configurations may be merged into a single SR corresponding to the SR triggered by the highest priority logical channel/logical channel group.

If an SR of a first SR configuration is triggered by a first logical channel/logical channel group while an SR procedure triggered by a lower priority logical channel/logical channel group may be on-going on another SR configuration, the later SR may be allowed to trigger another SR procedure on its own SR configuration independently of the other SR procedure. A wireless device may be allowed to send independently triggered SRs for logical channels/logical channel groups mapped to different SR configurations. A wireless device may be allowed to send triggered SRs for LCHs corresponding to different SR configurations independently.

The dsr-TransMax may be independently configured per SR configuration. The SR_COUNTER may be maintained for each SR configuration independently. A common SR_COUNTER may be maintained for all the SR configurations per BWP.

PUCCH resources may be configured per BWP. The PUCCH resources in the currently active BWP may be used for UCI transmission. PUCCH resources may be configured per BWP. PUCCH resources may be utilized in a BWP not currently active for UCI transmission. PUCCH resources may be configured in a default BWP and BWP switching may be necessary for PUCCH transmission. A wireless device may be allowed to send SR1 in BWP1 even though BWP1 may be no longer active. The network may reconfigure (e.g., pre-configure) the SR resources so that both SR1 and SR2 may be supported in the active BWP. An anchor BWP may be used for SR configuration. The wireless device may send SR2 as a fallback.

A logical channel/logical channel group mapped to a SR configuration in an active BWP may also be mapped to the SR configuration in another BWP to imply same or different information, such as numerology and/or TTI and priority. A MAC entity can be configured with a plurality of SR configurations within the same BWP. The plurality of the SR configurations may be on the same BWP, on different BWPs, or on different carriers. The numerology of the SR transmission may differ from the numerology that the logical channel/logical channel group that triggered the SR may be mapped to.

The PUCCH resources for transmission of the SR may be on different BWPs or different carriers for a LCH mapped to multiple SR configurations. The selection of which configured SR configuration within the active BWP to transmit one SR may be up to wireless device implementation if multiple SRs are triggered. A single BWP can support multiple SR configurations. Multiple sr-ProhibitTimers (e.g., each for one SR configuration) may be running at the same time. A drs-TransMax may be independently configured per SR configuration. A SR_COUNTER may be maintained for each SR configuration independently. A single logical channel/logical channel group may be mapped to zero or one SR configurations. A PUCCH resource configuration may be associated with a UL BWP. One or more logical channels may be mapped to none or one SR configuration per BWP in CA.

A BWP may consist of a group of contiguous PRBs in the frequency domain. The parameters for each BWP configuration may include numerology, frequency location, bandwidth size (e.g., in terms of PRBs), CORESET. CORESET may be required for each BWP configuration, such as for a single active DL bandwidth part for a given time instant. One or more BWPs may be configured for each component carrier, for example, if the wireless device is in RRC connected mode.

The configured downlink assignment may be initialized (e.g., if not active) or re-initialized (e.g., if already active) using PDCCH if a new BWP may be activated. For uplink SPS, the wireless device may have to initialize and/or re-initialize the configured uplink grant if switching from one BWP to anther BWP. If a new BWP is activated, the configured uplink grant may be initialized (e.g., if not already active) or re-initialized (e.g., if already active) using PDCCH.

For type 1 uplink data transmission without grant, there may be no L1 signaling to initialize or re-initialize the configured grant. The wireless device may not determine that the type 1 configured uplink grant may be active if the BWP may be switched, for example, even if the wireless device is already active in the previous BWP. The type 1 configured uplink grant may be re-configured using RRC dedicated signaling for switching the BWP. The type 1 configured uplink grant may be re-configured using dedicated RRC signaling if a new BWP is activated.

If SPS is configured on the resources of a BWP and the BWP is subsequently deactivated, the SPS grants or assignments may not continue. All configured downlink assignments and configured uplink grants using resources of this BWP may be cleared, for example, if a BWP is deactivated. The MAC entity may clear the configured downlink assignment or/and uplink grants after receiving activation and/or deactivation of BWP.

The units of drx-RetransmissionTimer and drx-ULRetransmissionTimer may be OFDM symbol corresponding to the numerology of the active BWP. If a wireless device is monitoring an active DL BWP for a long time without activity, the wireless device may move to a default BWP in order to save power. A BWP inactivity timer may be introduced to switch from an active BWP to the default BWP. Autonomous switching to a DL default BWP may consider both DL BWP inactivity timers and/or DRX timers, such as HARQ RTT and DRX retransmission timers. A DL BWP inactivity timer may be configured per MAC entity. A wireless device may be configured to monitor PDCCH in a default BWP, for example, if a wireless device uses a long DRX cycle.

A power headroom report (PHR) may not be triggered due to the switching of BWP. The support of multiple numerologies/BWPs may not impact PHR triggers. A PHR may be triggered upon BWP activation. A prohibit timer may start upon PHR triggering due to BWP switching. A PHR may not be triggered due to BWP switching while the prohibit timer may be running. A PHR may be reported per activated and/or deactivated BWP.

Packet Data Convergence Protocol (PDCP) duplication may be in an activated state while the wireless device receives the BWP deactivation command. The PDCP duplication may not be deactivated, for example, if the BWP on which the PDCP duplication is operated on is deactivated. The PDCP entity may stop sending the data to the deactivated RLC buffer, for example, even if the PDCP duplication may not be deactivated.

RRC signaling may configure a BWP to be activated, for example, if the SCell is activated. Activation and/or deactivation MAC CE may be used to activate both the SCell and the configured BWP. A HARQ entity can serve different BWP within one carrier.

For a wireless device-specific serving cell, one or more DL BWPs and one or more UL BWPs may be configured by dedicated RRC for a wireless device. A single scheduling DCI may switch the wireless device's active BWP from one to another. An active DL BWP may be deactivated by means of timer for a wireless device to switch its active DL bandwidth part to a default DL bandwidth part. A narrower BWP may be used for DL control monitoring and a wider BWP may be used for scheduled data. Small data may be allowed in the narrower BWP without triggering BWP switching.

A base station may transmit a plurality of beams to a wireless device. A serving beam may be determined, from the plurality of beams, for the wireless communications between the base station and the wireless device. One or more candidate beams may also be determined, from the plurality of beams, for providing the wireless communications if a beam failure event occurs, for example, such that the serving beam becomes unable to provide the desired communications. One or more candidate beams may be determined by a wireless device and/or by a base station. By determining and configuring a candidate beam, the wireless device and base station may continue wireless communications if the serving beam experiences a beam failure event.

Single beam and multi-beam operations may be supported, for example, in a NR (New Radio) system. In a multi-beam example, a base station (e.g., gNB) may perform a downlink beam sweep to provide coverage for downlink Synchronization Signals (SSs) and common control channels. Wireless devices may perform uplink beam sweeps to access a cell. For a single beam, a base station may configure time-repetition transmission within one SS block. This time-repetition may comprise, for example, one or more of a primary synchronization signal (PSS), a secondary synchronization signal (SSS), or a physical broadcast channel (PBCH). These signals may be in a wide beam. In a multi-beam example, a base station may configure one or more of these signals and physical channels, such as in an SS block, in multiple beams. A wireless device may identify, for example, from an SS block, an OFDM symbol index, a slot index in a radio frame, and a radio frame number from an SS block.

Figure 15:
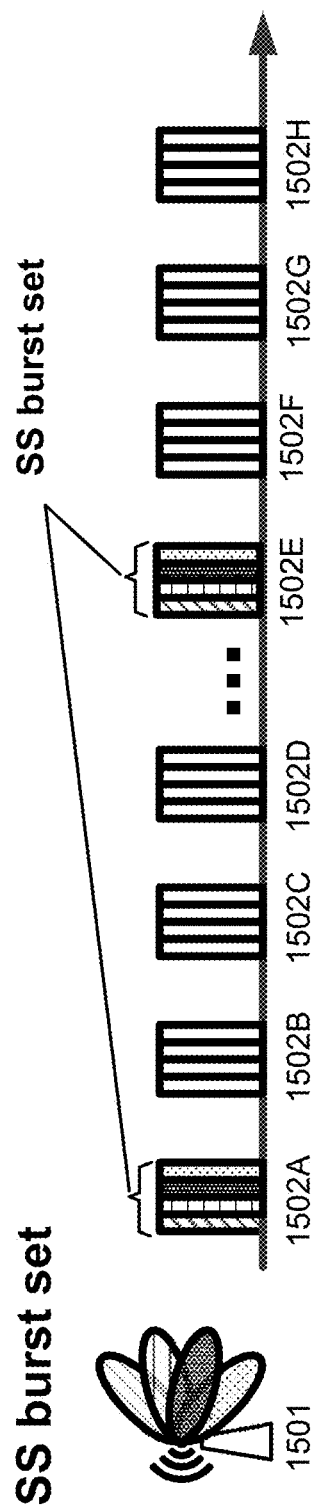
FIG. 15 shows an example configuration of a synchronization signal (SS) Burst Set.

In an RRC_INACTIVE state or in an RRC_IDLE state, a wireless device may assume that SS blocks form an SS burst and an SS burst set. An SS burst set may have a given periodicity. SS blocks may be transmitted together in multiple beams (e.g., in multiple beam examples) to form an SS burst. One or more SS blocks may be transmitted via one beam. If multiple SS bursts are transmitted with multiple beams, these SS bursts together may form an SS burst set, such as shown in FIG. 15. A base station 1501 (e.g., a gNB in NR) may transmit SS bursts 1502A to 1502H during time periods 1503. A plurality of these SS bursts may comprise an SS burst set, such as an SS burst set 1504 (e.g., SS bursts 1502A and 1502E). An SS burst set may comprise any number of a plurality of SS bursts 1502A to 1502H. Each SS burst within an SS burst set may transmitted at a fixed or variable periodicity during time periods 1503.

A wireless device may detect one or more of PSS, SSS, or PBCH signals for cell selection, cell reselection, and/or initial access procedures. The PBCH or a physical downlink shared channel (PDSCH) scheduling system information may be broadcasted by a base station to multiple wireless devices. The PDSCH may be indicated by a physical downlink control channel (PDCCH) in a common search space. The system information may comprise system information block type 2 (SIB2). SIB2 may carry one or more physical random access channel (PRACH) configurations. A base station (e.g., a gNB in NR) may have one or more RACH configurations which may include a PRACH preamble pool, time and/or frequency radio resources, and other power related parameters. A wireless device may select a PRACH preamble from a RACH configuration to initiate a contention-based RACH procedure or a contention-free RACH procedure. A wireless device may perform a 4-step RACH procedure, which may be a contention-based RACH procedure or a contention-free RACH procedure.

Figure 16:
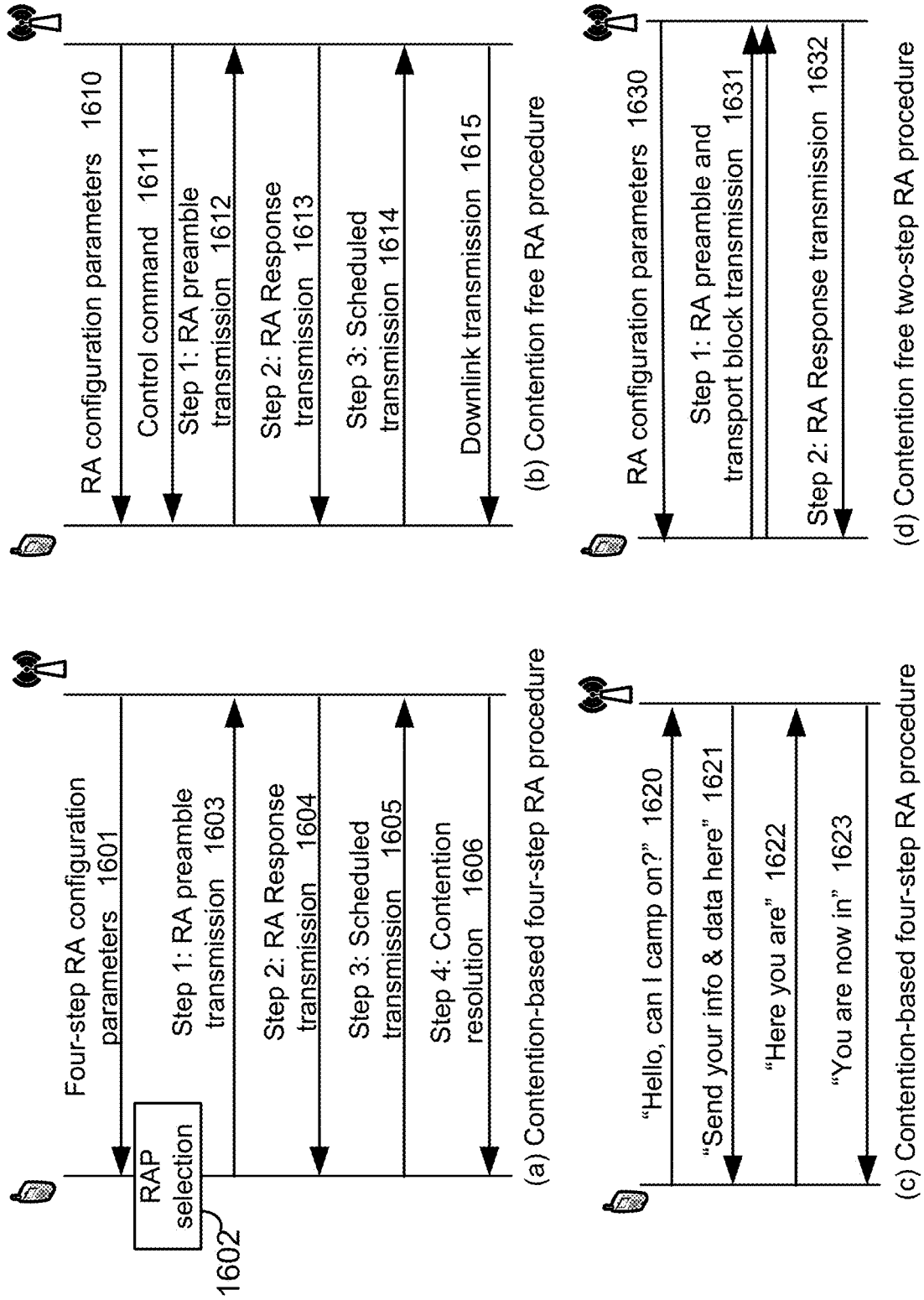
FIG. 16 shows examples of Random Access (RA) procedures.

FIG. 16 shows examples of (a) a contention-based four-step RA procedure, (b) a contention free three-step RA procedure, (c) descriptions of a contention-based four-step RA procedure, and (d) a contention free two-step RA procedure. A four-step RA procedure may comprise a RAP transmission in a first step, an RAR transmission in a second step, a scheduled transmission of one or more transport blocks (TBs) in a third step, and contention resolution in a fourth step.

In step 1601, a base station may transmit four-step RA configuration parameters to a wireless device (e.g., a UE). The base station may generate and transmit RA configuration parameters periodically, e.g., based on a timer. The base station may broadcast RA configuration parameters in one or more messages. The wireless device may perform a RAP selection process at step 1602, e.g., after receiving the four-step RA configuration parameters. In a contention-based RA procedure, such as shown in part (a) of FIG. 16, the RA configuration parameters may comprise a root sequence that may be used by the wireless device to generate a RAP. The RAP may be randomly selected by the wireless device, among various RAP candidates generated by the root sequence, during the RAP selection process. The wireless device may perform the RAP selection using one or more RAP selections procedures, such as described herein.

In a first step of the RA procedure, at step 1603, a wireless device may transmit a RAP, e.g., using a configured RA preamble format with a transmission (Tx) beam. A random access channel (RACH) resource may be defined as a time-frequency resource to transmit a RAP. Broadcast system information may indicate whether wireless device should transmit one preamble, or multiple or repeated preambles, within a subset of RACH resources.

A base station may configure an association between a downlink (DL) signal and/or channel, and a subset of RACH resources and/or a subset of RAP indices, for determining the DL transmission in the second step. Based on the DL measurement and the corresponding association, a wireless device may select the subset of RACH resources and/or the subset of RAP indices. Two RAP groups may be informed by broadcast system information and one may be optional. If a base station configures the two groups in the four-step RA procedure, a wireless device may use determine which group from which the wireless device selects an RAP, for example, based on the pathloss and/or a size of the message to be transmitted by the wireless device in the third step. A base station may use a group type to which a RAP belongs as an indication of the message size in the third step and the radio conditions at a wireless device. A base station may broadcast the RAP grouping information along with one or more thresholds on system information.

In the second step of the four-step RA procedure, at step 1604, a base station may transmit a random access response (RAR) to the wireless device. The base station may transmit the RAR in response to an RAP that the wireless device may transmit. A wireless device may monitor the PDCCH carrying a DCI, to detect RARs transmitted on a PDSCH in an RA response window. The DCI may be CRC-scrambled by the RA-RNTI (Random Access-Radio Network Temporary Identifier). The RA-RNTI may be used on the PDCCH if Random Access Response messages are transmitted. The RA-RNTI may unambiguously identify which time-frequency resource is used by the MAC entity to transmit the Random Access preamble. The RA response window may start at a subframe that contains the end of an RAP transmission, plus three subframes. The RA response window may have the length indicated by ra-ResponseWindowSize. A wireless device may determine the RA-RNTI associated with the PRACH in which the wireless device transmits an RAP by the following operation:

$$\text{RA-RNTI} = 1 + t\_id + 10 * f\_id$$

where t_id is the index of the first subframe of the specified PRACH ($0 \leq t\_id < 10$), and f_id is the index of the specified PRACH within that subframe, in ascending order of frequency domain ($0 \leq f\_id < 6$). Different types of wireless devices, e.g., narrow band-Internet of Things (NB-IoT), bandwidth limited (BL)-UE, and/or UE-Extended Coverage (UE-EC), may use different formulas or operations for determining RA-RNTI. A base station may configure an association between a DL signal or channel, a subset of RACH resources, and/or a subset of RAP indexes. Such an association may be for determining the DL transmission in the second step of the RA procedure, at step 1604 of FIG. 16. Based on the DL measurement and the corresponding association, a wireless device may select the subset of RACH resources and/or the subset of RAP indices. FIG. 18 shows contents of a MAC RAR. For example, FIG. 18A shows the contents of a MAC RAR of a wireless device, FIG. 18B shows the contents of a MAC RAR of a MTC wireless device, and FIG. 18C shows the contents of MAC RAR of a NB-IOT wireless device In the third step of the four-step RA procedure (e.g., step 1605 in FIG. 16), a wireless device may adjust an UL time alignment by using the TA value corresponding to the TA command in the received RAR in the second step (e.g., step 1604 in FIG. 16). A wireless device may transmit one or more TBs to a base station using the UL resources assigned in the UL grant in the received RAR. One or more TBs that a wireless device may transmit in the third step (e.g., step 1605 in FIG. 16) may comprise RRC signaling, such as an RRC connection request, an RRC connection Re-establishment request, or an RRC connection resume request. The one or more TBs may also comprise a wireless device identity, e.g., which may be used as part of the contention-resolution mechanism in the fourth step (e.g., step 1606 in FIG. 16)

The fourth step in the four-step RA procedure (e.g., step 1606 in FIG. 16) may comprise a DL message for contention resolution. Based on the second step (e.g., step 1604 in FIG. 16), one or more wireless devices may perform simultaneous RA attempts selecting the same RAP in the first step (e.g., step 1603 in FIG. 16), and/or receive the same RAR with the same TC-RNTI in the second step (e.g., step 1604 in FIG. 16). The contention resolution in the fourth step may be to ensure that a wireless device does not incorrectly use another wireless device identity. The contention resolution mechanism may be based on either a C-RNTI on a PDCCH, or a wireless device Contention Resolution Identity on a DL-SCH, e.g., depending on whether or not a wireless device has a C-RNTI. If a wireless device has a C-RNTI, e.g., if the wireless device detects the C-RNTI on the PDCCH, the wireless device may determine the success of RA procedure. If the wireless device does not have a C-RNTI (e.g., if a C-RNTI is not pre-assigned), the wireless device may monitor a DL-SCH associated with a TC-RNTI, e.g., that a base station may transmit in an RAR of the second step. In the fourth step (e.g., step 1606 in FIG. 16), the wireless device may compare the identity in the data transmitted by the base station on the DL-SCH with the identity that the wireless device transmits in the third step (e.g., step 1605 in FIG. 16). If the wireless determines that two identities are the same or satisfy a threshold similarity, the wireless device may determine that the RA procedure is successful. If the wireless device determines that the RA is successful, the wireless device may promote the TC-RNTI to the C-RNTI. A TC-RNTI may be an identifier initially assigned to a wireless device when the wireless device first attempts to access a base station. A TC-RNTI may be used for a wireless device in an idle state. After access is allowed by the base station, a C-RNTI may be used for indicating the wireless device. A C-RNTI may be used for a wireless device in an inactive or an active state.

The fourth step in the four-step RA procedure (e.g., step 1606 in FIG. 16) may allow HARQ retransmission. A wireless device may start a mac-ContentionResolutionTimer when the wireless device transmits one or more TBs to a base station in the third step (e.g., step 1605 in FIG. 16). The wireless device may restart the mac-ContentionResolutionTimer at each HARQ retransmission. When a wireless device receives data on the DL resources identified by C-RNTI or TC-RNTI in the fourth step (e.g., step 1606 in FIG. 16), the wireless device may stop the mac-ContentionResolutionTimer. If the wireless device does not detect the contention resolution identity that matches the identity transmitted by the wireless device in the third step (e.g., step 1605 in FIG. 16), the wireless device may determine that the RA procedure has failed and the wireless device may discard the TC-RNTI. Additionally or alternatively, if the mac-ContentionResolutionTimer expires, the wireless device may determine that the RA procedure has failed and the wireless device may discard the TC-RNTI. If the wireless device determines that the contention resolution has failed, the wireless device may flush the HARQ buffer used for transmission of the MAC PDU and the wireless device may restart the four-step RA procedure from the first step (e.g., step 1603 in FIG. 16). The wireless device may delay subsequent RAP transmission, e.g., by a backoff time. The backoff time may be randomly selected, e.g., according to a uniform distribution between 0 and the backoff parameter value corresponding to the BI in the MAC PDU for RAR.

In a four-step RA procedure, the usage of the first two steps may be, for example, to obtain an UL time alignment for a wireless device and/or to obtain an uplink grant. The third and fourth steps may be used to setup RRC connections, and/or resolve contention from different wireless devices.

Part (b) of FIG. 16 shows a three-step contention free RA procedure. A base station may transmit RA configuration parameters to a wireless device (e.g., a UE), in step 1610. In a contention-free RA procedure, such as shown in part (b) of FIG. 16, the configuration parameters may indicate to the wireless device what preamble to send to the base station and when to send the preamble. The base station may also transmit a control command to the wireless device at step 1611. The control command may comprise, e.g., downlink control information. In a first step of the RA procedure, the wireless device may transmit a random access preamble transmission to the base station at step 1612. The RAP transmission may be based on the RA configuration parameters and the control command. In a second step of the RA procedure, the base station may transmit to the wireless device a random access response at step 1613. In a third step of the RA procedure, the wireless device may transmit scheduled transmissions at step 1614. The scheduled transmissions may be based on the RAR. The contention free RA procedure may end with the third step. Thereafter, the base station may transmit a downlink transmission to the wireless device at step 1615. This downlink transmission may comprise, e.g., an acknowledgement (ACK) indication, a non-acknowledgement (NACK) indication, data, or other information. Contention-free RA procedures such as described above may have reduced latency compared with contention-based RA procedures. Contention-based RA procedures may involve collisions, such as when more than one wireless device is attempting to communicate with the same base station at the same time.

Part (c) of FIG. 16 shows an example of common language descriptions that may facilitate an understanding of some of the messaging involved in the contention-based four-step RA procedure described above regarding part (a) of FIG. 16. In step 1 of the RA procedure, a wireless device may send a communication to a base station similar to a request such as, "Hello, can I camp on?" (step 1620). If the base station can accommodate the wireless device request, the base station may respond to the wireless device with a message similar to an instruction such as "Send your info & data here" (step 1621). Based on the base station's response, the wireless device may send a message similar to a response such as "Here you are" (step 1622). Based on the information received by the base station, the base station may respond with a message similar to a grant such as "You are now in" (step 1623).

Part (d) of FIG. 16 shows an example of a two-step contention free random access procedure of a wireless device. At step 1630, the wireless device may receive RA configuration parameters from a base station (e.g., from a handover source base station, and/or from a handover target base station via the handover source base station). The RA configuration parameters may comprise one or more parameters indicating a type of a random access process. The type of the random access process may indicate a two-step random access process. At step 1631, the wireless device may transmit an RA preamble and one or more transport blocks as a first step of the procedure, e.g., overlapping in time with each other. In response to the RA preamble and/or the one or more transport blocks, at step 1632, the wireless device may receive an RA response from a base station (e.g., a handover target base station).

Figure 17:
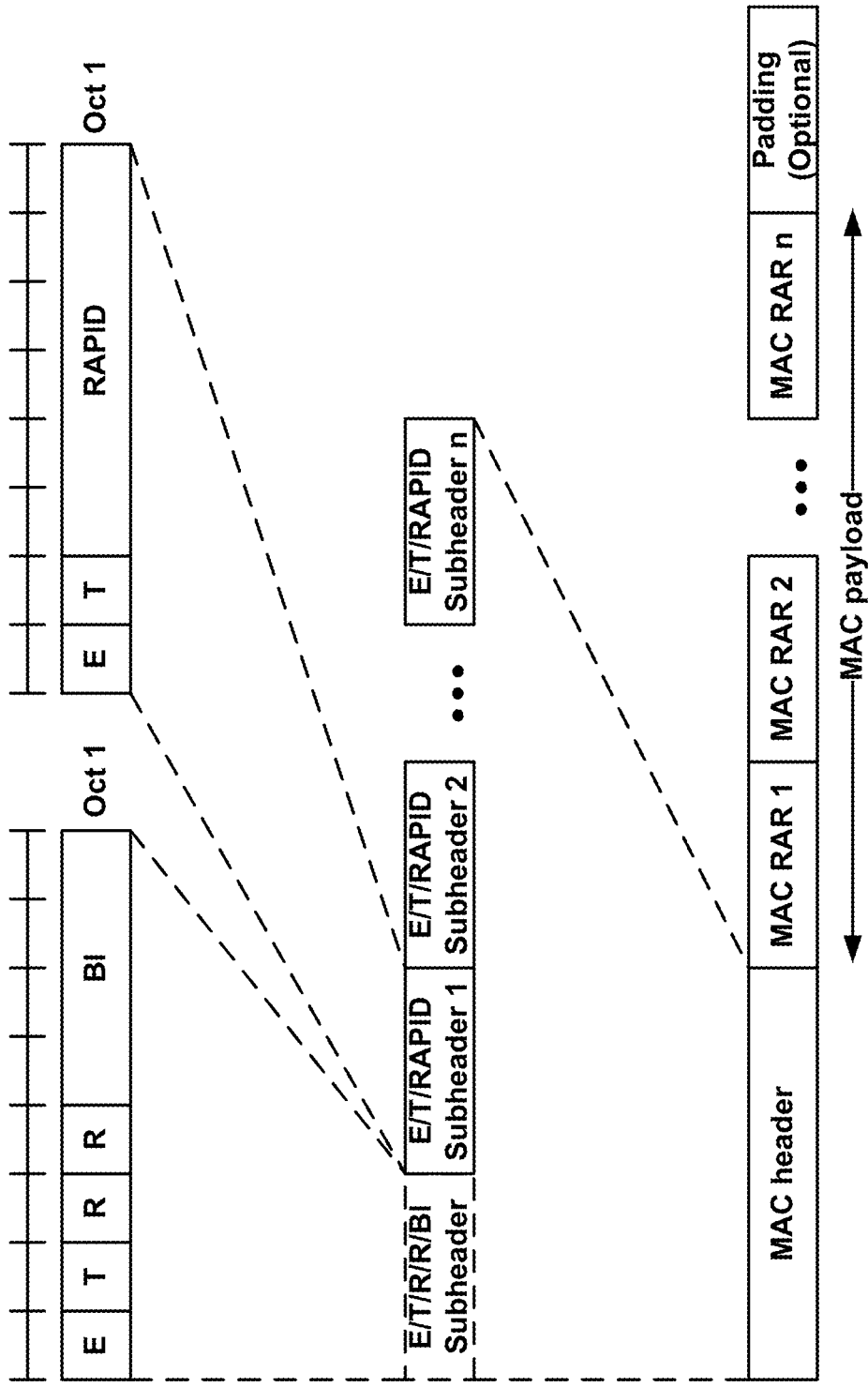
FIG. 17 shows an example media access control (MAC) packet data unit (PDU) comprising a MAC header and MAC random access responses (RARs).

FIG. 17 shows an example of a MAC PDU comprising a MAC header and MAC RARs. A four-step RA procedure may use the arrangement shown in FIG. 17. A two-step RA procedure may also use the arrangement shown in FIG. 17. Additionally or alternatively, a two-step RA procedure may use a variation of the arrangement shown in FIG. 17, e.g., with additional or fewer fields, and/or with longer or shorter fields. If an RAR comprises a RAPID corresponding to a RAP that a wireless device transmits, the wireless device may process the data in the RAR. The data in the RAR may comprise, e.g., one or more of a timing advance (TA) command, a UL grant, and/or a Temporary C-RNTI (TC-RNTI). The MAC header may comprise subheaders, such as an E/T/R/R/BI subheader (described further below) and up to n number of E/T/RAPID subheaders (described further below). The E/T/R/R/BI subheader may comprise an octet of bits comprising 1 bit each of E, T, R, and R, and four bits of BI. Each of n E/T/RAPID subheaders may comprise an octet comprising 1 bit each of E and T, and 6 bits of an RAPID.

Figure 19:
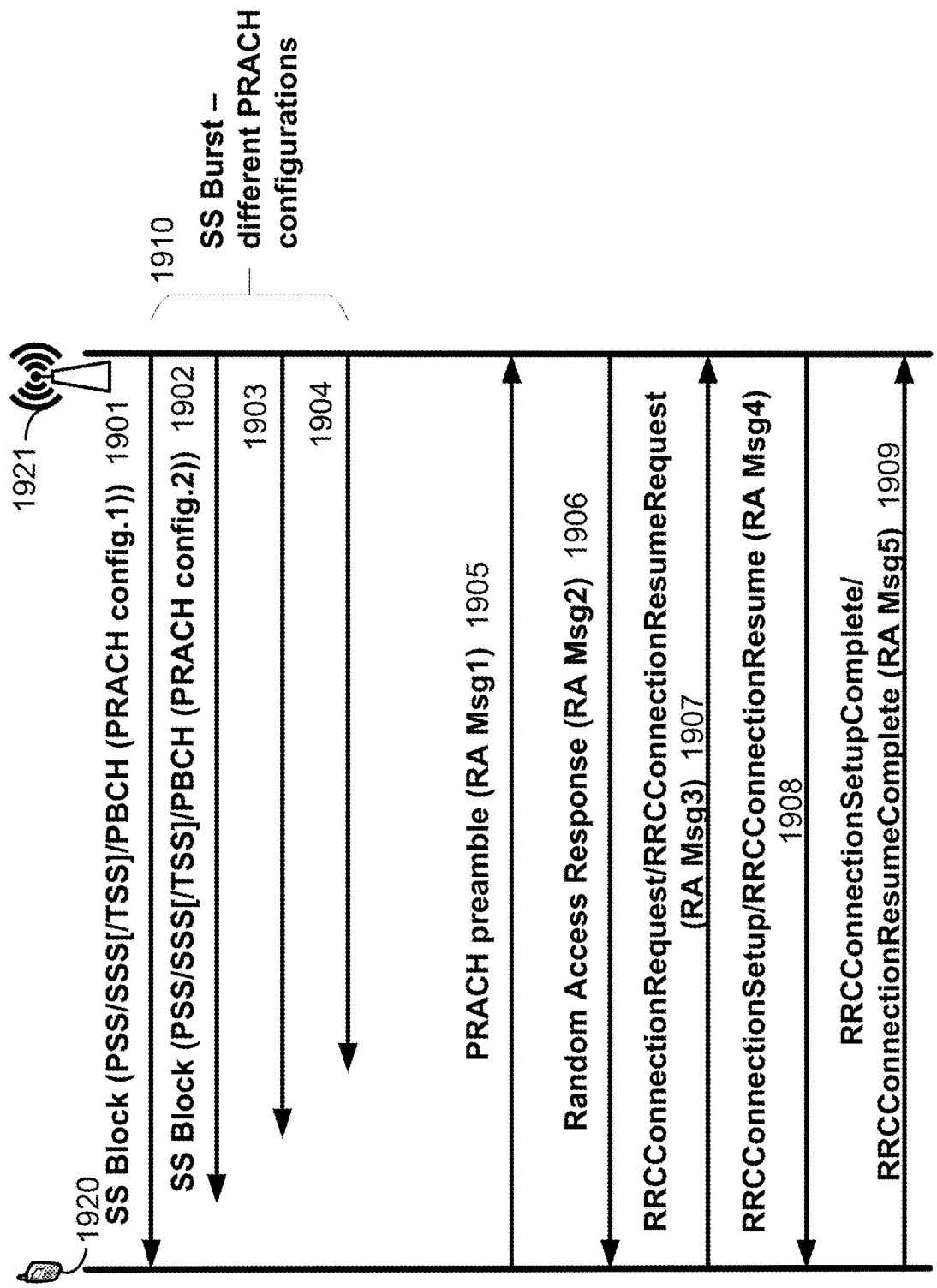
FIG. 19 shows an example of random access procedure in a multiple-beam system.

PSS, SSS, and/or PBCH may be repeated, for example, for multiple beams for a cell, to support cell selection, reselection, and/or initial access procedures. A RACH process is shown in FIG. 19. For an SS burst, the associated PBCH, or a PDSCH (e.g., indicated by a PPDCCH in a common search space), scheduling system information (e.g., a SIB2), may be broadcasted to multiple wireless devices. The system information (e.g., a SIB2) may carry a PRACH configuration for a beam. A base station may have a RACH configuration for a beam, which may include PRACH preamble pool, time and/or frequency radio resources, and/or other power related parameters.

A wireless device may use a PRACH preamble selected from a RACH configuration to initiate a contention-based RACH procedure or a contention-free RACH procedure. The wireless device may perform a 4-step RACH procedure, which may be a contention-based or contention-free RACH procedure. The wireless device may select a beam associated with an SS block that may have the best receiving signal quality. The wireless device may successfully detect a cell identifier that may be associated with the cell and decode system information with a RACH configuration. The wireless device may use one PRACH preamble and select one PRACH resource from RACH resources indicated by the system information associated with the selected beam. A PRACH resource may comprise at least one of: a PRACH index indicating a PRACH preamble, a PRACH format, a PRACH numerology, time and/or frequency radio resource allocation, power setting of a PRACH transmission, and/or other radio resource parameters. For a contention-free RACH procedure, the PRACH preamble and resource may be indicated in a DCI or other high layer signaling.

FIG. 19 shows an example of a random access procedure (e.g., via a RACH) that may include sending, by a base station, one or more SS blocks. A wireless device 1920 (e.g., a UE) may transmit one or more preambles to a base station 1921 (e.g., a gNB in NR). Each preamble transmission by the wireless device may be associated with a separate random access procedure, such as shown in FIG. 19. The random access procedure may begin at step 1901 with a base station 1921 (e.g., a gNB in NR) sending a first SS block to a wireless device 1921 (e.g., a UE). Any of the SS blocks may comprise one or more of a PSS, SSS, tertiary synchronization signal (TSS), or PBCH signal. The first SS block in step 1901 may be associated with a first PRACH configuration. At step 1902, the base station 1921 may send to the wireless device 1920 a second SS block that may be associated with a second PRACH configuration. At step 1903, the base station 1921 may send to the wireless device 1920 a third SS block that may be associated with a third PRACH configuration. At step 1904, the base station 1921 may send to the wireless device 1920 a fourth SS block that may be associated with a fourth PRACH configuration. Any number of SS blocks may be sent in the same manner in addition to, or replacing, steps 1903 and 1904. An SS burst may comprise any number of SS blocks. For example, SS burst 1910 comprises the three SS blocks sent during steps 1902-1904.

The wireless device 1920 may send to the base station 1921 a preamble, at step 1905, for example, after or in response to receiving one or more SS blocks or SS bursts. The preamble may comprise a PRACH preamble, and may be referred to as RA Msg 1. The PRACH preamble may be transmitted in step 1905 according to or based on a PRACH configuration that may be received in an SS block (e.g., one of the SS blocks from steps 1901-1904) that may be determined to be the best SS block beam. The wireless device 1920 may determine a best SS block beam from among SS blocks it may receive prior to sending the PRACH preamble. The base station 1921 may send a random access response (RAR), which may be referred to as RA Msg2, at step 1906, for example, after or in response to receiving the PRACH preamble. The RAR may be transmitted in step 1906 via a DL beam that corresponds to the SS block beam associated with the PRACH configuration. The base station 1921 may determine the best SS block beam from among SS blocks it previously sent prior to receiving the PRACH preamble. The base station 1921 may receive the PRACH preamble according to or based on the PRACH configuration associated with the best SS block beam.

The wireless device 1920 may send to the base station 1921 an RRCConnectionRequest and/or RRCConnectionResumeRequest message, which may be referred to as RA Msg3, at step 1907, for example, after or in response to receiving the RAR. The base station 1921 may send to the wireless device 1920 an RRCConnectionSetup and/or RRCConnectionResume message, which may be referred to as RA Msg4, at step 1908, for example, after or in response to receiving the RRCConnectionRequest and/or RRCConnectionResumeRequest message. The wireless device 1920 may send to the base station 1921 an RRCConnectionSetupComplete and/or RRCConnectionResumeComplete message, which may be referred to as RA Msg5, at step 1909, for example, after or in response to receiving the RRCConnectionSetup and/or RRCConnectionResume. An RRC connection may be established between the wireless device 1920 and the base station 1921, and the random access procedure may end, for example, after or in response to receiving the RRCConnectionSetupComplete and/or RRCConnectionResumeComplete message.

A best beam, including but not limited to a best SS block beam, may be determined based on a channel state information reference signal (CSI-RS). A wireless device may use a CSI-RS in a multi-beam system for estimating the beam quality of the links between the wireless device and a base station. For example, based on a measurement of a CSI-RS, a wireless device may report CSI for downlink channel adaption. A CSI parameter may include a precoding matrix index (PMI), a channel quality index (CQI) value, and/or a rank indicator (RI). A wireless device may report a beam index based on a reference signal received power (RSRP) measurement on a CSI-RS. The wireless device may report the beam index in a CSI resource indication (CRI) for downlink beam selection, and associated with the RSRP value of the beam. A base station may transmit a CSI-RS via a CSI-RS resource, such as via one or more antenna ports, or via one or more time and/or frequency radio resources. A beam may be associated with a CSI-RS. A CSI-RS may comprise an indication of a beam direction. Each of a plurality of beams may be associated with one of a plurality of CSI-RSs. A CSI-RS resource may be configured in a cell-specific way, for example, via common RRC signaling. Additionally or alternatively, a CSI-RS resource may be configured in a wireless device-specific way, for example, via dedicated RRC signaling and/or layer 1 and/or layer 2 (L1/L2) signaling. Multiple wireless devices in or served by a cell may measure a cell-specific CSI-RS resource. A dedicated subset of wireless devices in or served by a cell may measure a wireless device-specific CSI-RS resource. A base station may transmit a CSI-RS resource periodically, using aperiodic transmission, or using a multi-shot or semi-persistent transmission. In a periodic transmission, a base station may transmit the configured CSI-RS resource using a configured periodicity in the time domain. In an aperiodic transmission, a base station may transmit the configured CSI-RS resource in a dedicated time slot. In a multi-shot or semi-persistent (SP) transmission, a base station may transmit the configured CSI-RS resource within a configured period. A base station may transmit one or more SP CSI-RS with a configured periodicity, with a limited or unlimited duration. A base station may configure different CSI-RS resources in different terms for different purposes. Different terms may include, for example, cell-specific, device-specific, periodic, aperiodic, multi-shot, or other terms. Different purposes may include, for example, beam management, CQI reporting, or other purposes.

Figure 20:
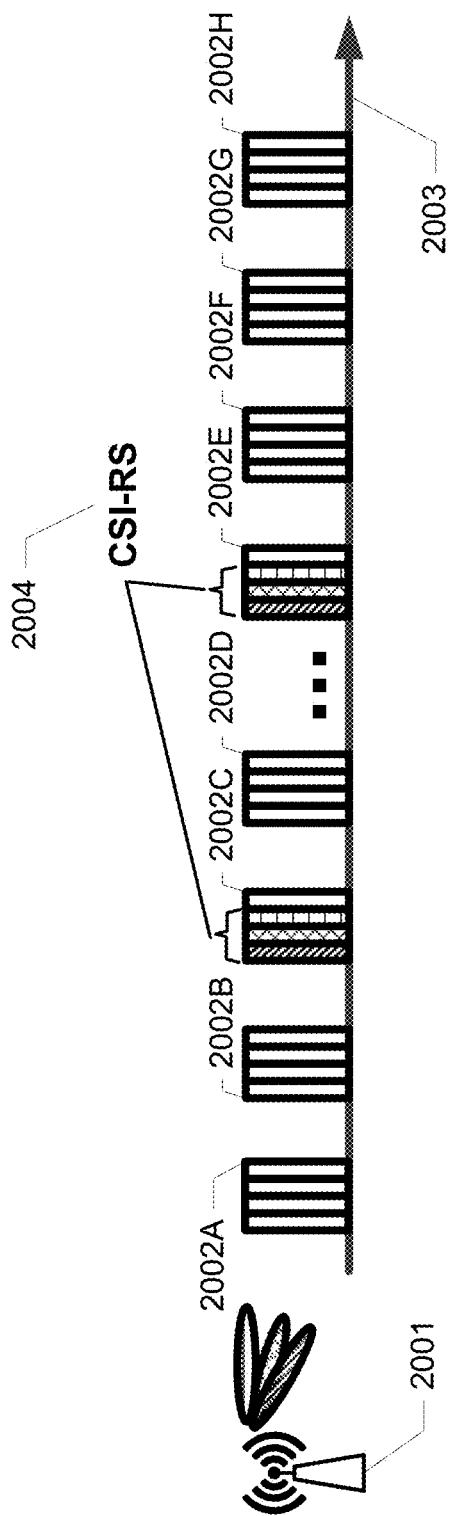
FIG. 20 shows an example channel state information-reference signal (CSI-RS) transmission in a multi-beam system.

FIG. 20 shows an example of transmitting CSI-RSs periodically for a beam. A base station 20701 may transmit a beam in a predefined order in the time domain, such as during time periods 2003. Beams used for a CSI-RS transmission, such as for CSI-RS 2004 in transmissions 2002C and/or 2003E, may have a different beam width relative to a beam width for SS-blocks transmission, such as for SS blocks 2002A, 2002B, 2002D, and 2002F-2002H. Additionally or alternatively, a beam width of a beam used for a CSI-RS transmission may have the same value as a beam width for an SS block. Some or all of one or more CSI-RSs may be included in one or more beams. An SS block may occupy a number of OFDM symbols (e.g., 4), and a number of subcarriers (e.g., 240), carrying a synchronization sequence signal. The synchronization sequence signal may identify a cell.

Figure 21:
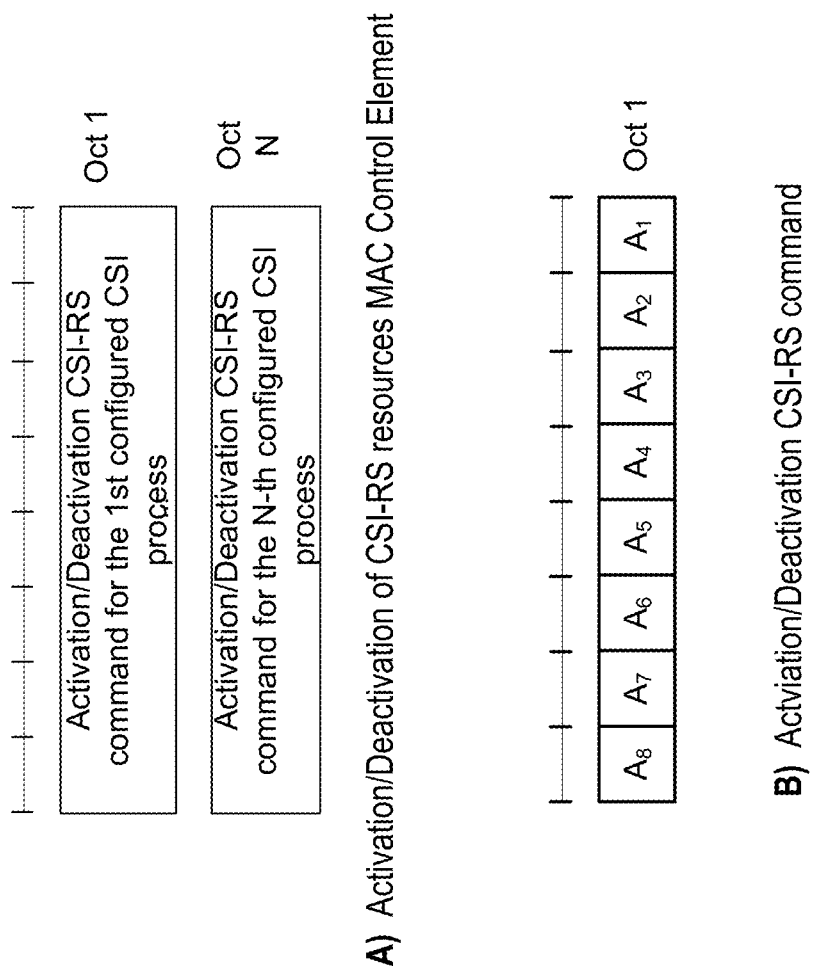
FIG. 21 shows an example of activation/Deactivation of a CSI-RS resources MAC Control Element and a CSI-RS command.

FIG. 21 part "A" shows an example of an activation/deactivation CSI-RS resources MAC control element. The activation/deactivation CSI-RS resources MAC control element may be identified by a MAC subheader with LCID. The activation/deactivation CSI-RS resources MAC control element may have a variable size that may be based on the number of CSI processes configured with csi-RS-NZP-Activation by RRC (N). The N number of octets, shown in FIG. 21A, each of which may comprise a number of A fields (e.g., A1 to Ai, described below), may be included in ascending order of a CSI process ID, such as the CSI-ProcessId.

FIG. 21 part "B" shows an example of an activation/deactivation CSI-RS command that may activate and/or deactivate CSI-RS resources for a CSI process. For example, for a wireless device that is configured with transmission mode 9, N equals 1. Transmission mode 9 may be a transmission mode in which a base station may transmit data packets with up to 8 layers, for example, if configured with multiple antennas. A wireless device may receive the data packets based on multiple DMRSs (e.g., up to 8 DMRSs (or DMRS ports)). The activation/deactivation CSI-RS resources MAC control element may apply to the serving cell on which the wireless device may receive the activation/deactivation of CSI-RS resources MAC control element.

Activation/deactivation CSI-RS resources MAC control elements may comprise an octet of fields, shown as fields A1 to A8, that may indicate the activation/deactivation status of the CSI-RS resources configured by upper layers for the CSI process. A1 may correspond to the first entry in a list of CSI-RS, which may be specified by csi-RS-ConfigNZP-ApList configured by upper layers. A2 may correspond to the second entry in the list of CSI-RS, and each of A3 through A8 may correspond to the third through eighth entry, respectively, in the list of CSI-RS. The Ai field may be set to "1" to indicate that the $i^{th}$ entry in the list of CSI-RS, which may be specified by csi-RS-ConfigNZP-ApList, shall be activated. The Ai field may be set to "0" to indicate that the $i^{th}$ entry in the list shall be deactivated. For each CSI process, the number of Ai fields (e.g., i=1, 2, . . . , 8) which are set to "1" may be equal to the value of a higher-layer parameter, such as activatedResources.

A wireless device may be triggered with aperiodic CSI reporting, for example, after receiving a RRC for CSI-RS configuration and a MAC layer signaling for CSI-RS activation. The aperiodic CSI reporting may be associated with the CSI-RS resources indicated in a DCI, for example, with DCI format 0C. A CSI request field in DCI format 0C may indicate for which CSI process and/or CSI-RS resource the CSI reporting is configured, such as shown in FIG. 22.

Figure 23:
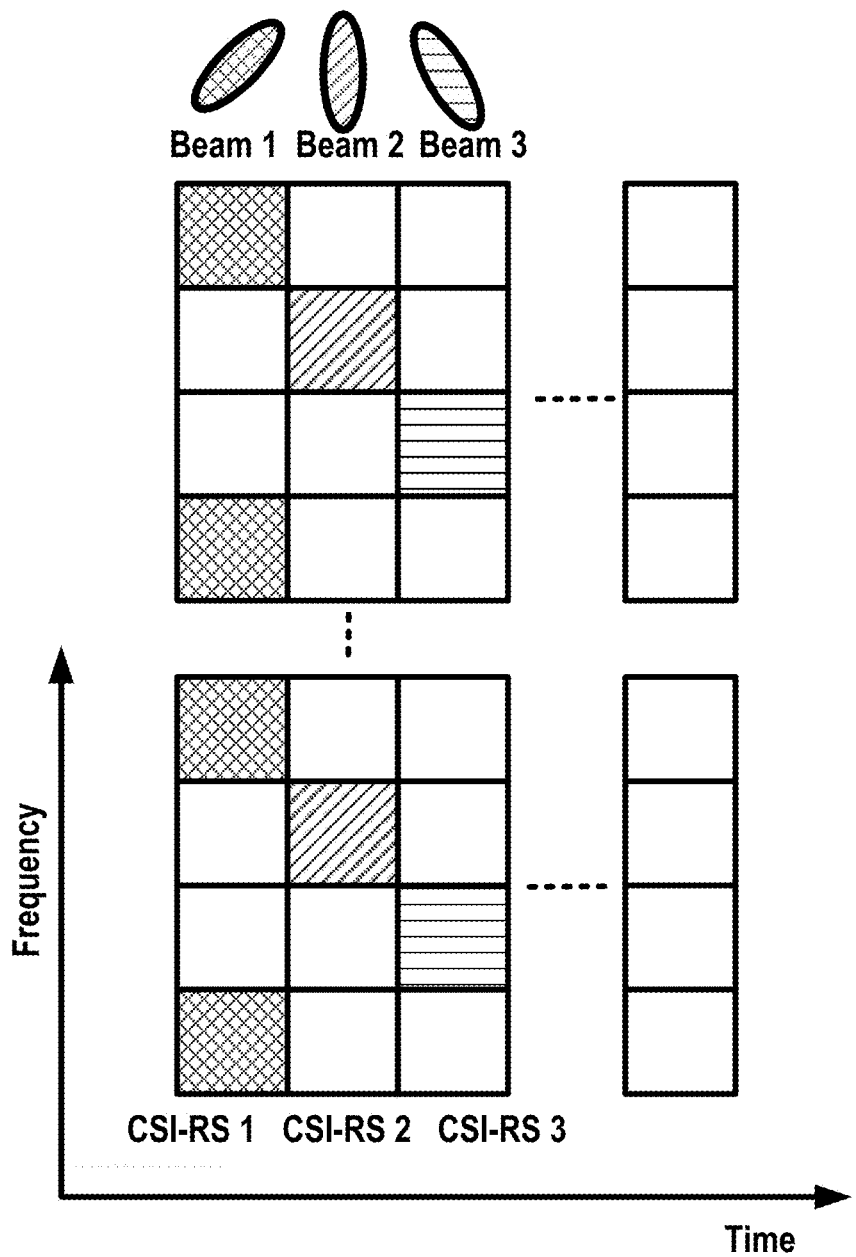
FIG. 23 shows an example of a CSI-RS mapping in time and frequency domains.

As shown in FIG. 23, a CSI-RS may be mapped in time and frequency domains. Each square shown in FIG. 23 may represent a resource block within a bandwidth of a cell. Each resource block may comprise a number of subcarriers. A cell may have a bandwidth comprising a number of resource blocks. A base station (e.g., a gNB in NR) may transmit one or more Radio Resource Control (RRC) messages comprising CSI-RS resource configuration parameters for one or more CSI-RS. One or more of the following parameters may be configured by higher layer signaling for each CSI-RS resource configuration: CSI-RS resource configuration identity, number of CSI-RS ports, CSI-RS configuration (e.g., symbol and RE locations in a subframe), CSI-RS subframe configuration (e.g., subframe location, offset, and periodicity in a radio frame), CSI-RS power parameter, CSI-RS sequence parameter, CDM type parameter, frequency density, transmission comb, QCL parameters (e.g., QCL-scramblingidentity, crs-portscount, mbsfn-subframeconfiglist, csi-rs-configZPid, qcl-csi-rs-configNZPid), and/or other radio resource parameters.

CSI-RS may be configured using common parameters, for example, when a plurality of wireless devices receive the same CSI-RS signal. CSI-RS may be configured using wireless device dedicated parameters, for example, when a CSI-RS is configured for a specific wireless device. CSI-RSs may be included in RRC signaling. A wireless device may be configured, for example, depending on different MIMO beamforming types (e.g., CLASS A or CLASS B), with one or more CSI-RS resource configurations per CSI process. A wireless device may be configured using at least RRC signaling.

FIG. 23 shows three beams that may be configured for a wireless device, for example, in a wireless device-specific configuration. Any number of additional beams (e.g., represented by the column of blank squares) or fewer beams may be included. Beam 1 may be allocated with CSI-RS 1 that may be transmitted in some subcarriers in a resource block (RB) of a first symbol. Beam 2 may be allocated with CSI-RS 2 that may be transmitted in some subcarriers in a RB of a second symbol. Beam 3 may be allocated with CSI-RS 3 that may be transmitted in some subcarriers in a RB of a third symbol. All subcarriers in a RB may not necessarily be used for transmitting a particular CSI-RS (e.g., CSI-RS1) on an associated beam (e.g., beam 1) for that CSI-RS. By using frequency division multiplexing (FDM), other subcarriers, not used for beam 1 for the wireless device in the same RB, may be used for other CSI-RS transmissions associated with a different beam for other wireless devices. Additionally or alternatively, by using time domain multiplexing (TDM), beams used for a wireless device may be configured such that different beams (e.g., beam 1, beam 2, and beam 3) for the wireless device may be transmitted using some symbols different from beams of other wireless devices.

A wireless device may perform downlink beam management using a wireless device-specific configured CSI-RS. In a beam management procedure, a wireless device may monitor a channel quality of a beam pair link. The beam pair link may comprise a transmitting beam from a base station (e.g., a gNB in NR) and a receiving beam by the wireless device (e.g., a UE). When multiple CSI-RSs associated with multiple beams are configured, a wireless device may monitor multiple beam pair links between the base station and the wireless device.

A wireless device may transmit one or more beam management reports to a base station. A beam management report may indicate one or more beam pair quality parameters, comprising, for example, one or more beam identifications, RSRP, PMI, CQI, and/or RI, of a subset of configured beams.

Figure 24:
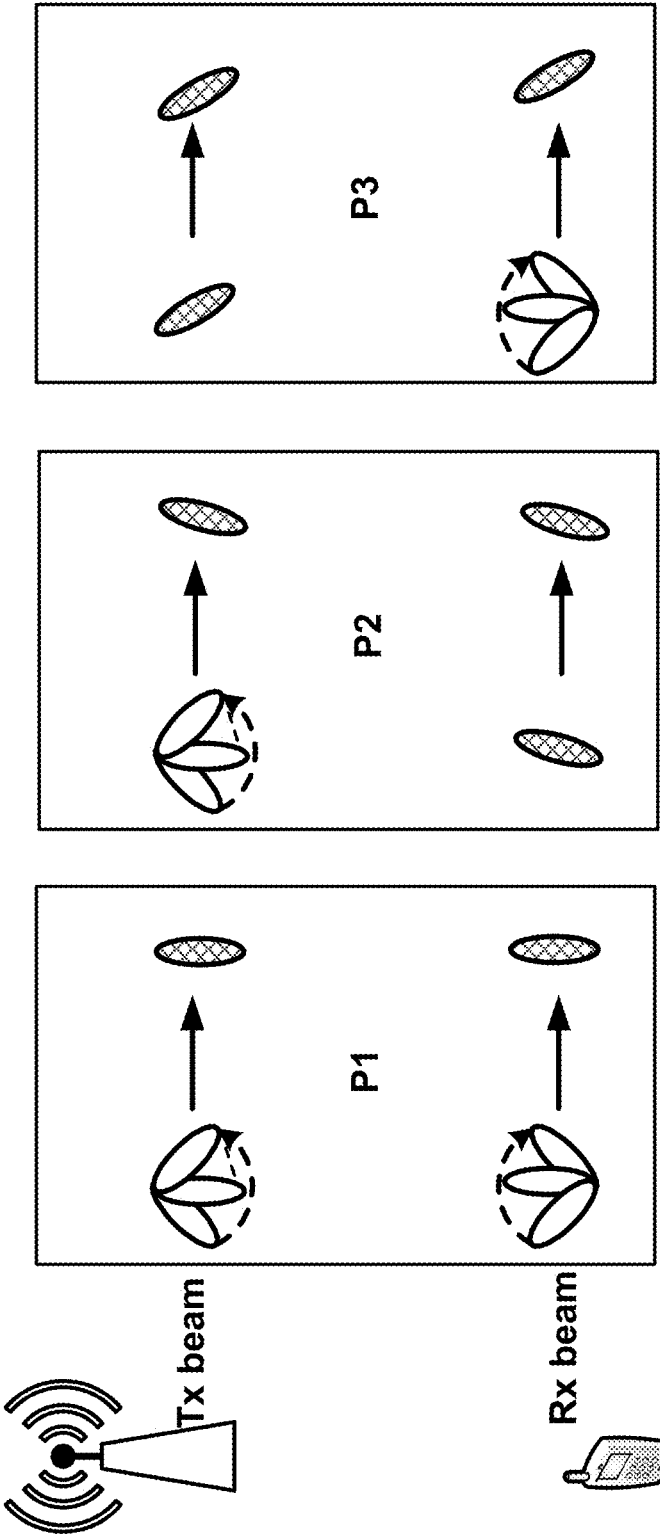
FIG. 24 shows an example of downlink beam management procedures.

A base station and/or a wireless device may perform a downlink L1/L2 beam management procedure. One or more downlink L1/L2 beam management procedures may be performed within one or multiple transmission and receiving points (TRPs) FIG. 24 shows examples of three beam management procedures, P1, P2, and P3. Procedure P1 may be used to enable a wireless device measurement on different transmit (Tx) beams of a TRP (or multiple TRPs), for example, to support a selection of Tx beams and/or wireless device receive (Rx) beam(s) (shown as shaded ovals in the top row and bottom row, respectively, of P1). Beamforming at a TRP (or multiple TRPs) may include, for example, an intra-TRP and/or inter-TRP Tx beam sweep from a set of different beams (shown, in the top rows of P1 and P2, as unshaded ovals rotated in a counter-clockwise direction indicated by the dashed arrow). Beamforming at a wireless device 2401, may include, for example, a wireless device Rx beam sweep from a set of different beams (shown, in the bottom rows of P1 and P3, as unshaded ovals rotated in a clockwise direction indicated by the dashed arrow). Procedure P2 may be used to enable a wireless device measurement on different Tx beams of a TRP (or multiple TRPs) (shown, in the top row of P2, as unshaded ovals rotated in a counter-clockwise direction indicated by the dashed arrow), for example, which may change inter-TRP and/or intra-TRP Tx beam(s). Procedure P2 may be performed, for example, on a smaller set of beams for beam refinement than in procedure P1. P2 may be a particular example of P1. Procedure P3 may be used to enable a wireless device measurement on the same Tx beam (shown as shaded oval in P3), for example, to change a wireless device Rx beam if the wireless device 2401 uses beamforming.

Based on a wireless device's beam management report, a base station may transmit, to the wireless device, a signal indicating that one or more beam pair links are the one or more serving beams. The base station may transmit PDCCH and/or PDSCH for the wireless device using the one or more serving beams.

A wireless device 2401 (e.g., a UE) and/or a base station 2402 (e.g., a gNB) may trigger a beam failure recovery mechanism. The wireless device 2401 may trigger a beam failure recovery (BFR) request transmission, for example, if a beam failure event occurs. A beam failure event may include, for example, a determination that a quality of beam pair link(s) of an associated control channel is unsatisfactory. A determination of an unsatisfactory quality of beam pair link(s) of an associated channel may be based on the quality falling below a threshold and/or an expiration of a timer.

The wireless device 2401 may measure a quality of beam pair link(s) using one or more reference signals (RS). One or more SS blocks, one or more CSI-RS resources, and/or one or more demodulation reference signals (DM-RSs) of a PBCH may be used as a RS for measuring a quality of a beam pair link. Each of the one or more CSI-RS resources may be associated with a CSI-RS resource index (CRI). A quality of a beam pair link may be based on one or more of an RSRP value, reference signal received quality (RSRQ) value, and/or CSI value measured on RS resources. The base station 2402 may indicate whether an RS resource, for example, that may be used for measuring a beam pair link quality, is quasi-co-located (QCLed) with one or more DM-RSs of a control channel. The RS resource and the DM-RSs of the control channel may be QCLed when the channel characteristics from a transmission via an RS to the wireless device 2401, and the channel characteristics from a transmission via a control channel to the wireless device, are similar or the same under a configured criterion.

A wireless device may monitor a PDCCH, such as a New Radio PDCCH (NR-PDCCH), on M beam pair links simultaneously, where M≥1 and the maximum value of M may depend at least on the wireless device capability. Such monitoring may increase robustness against beam pair link blocking. A base station may transmit, and the wireless device may receive, one or more messages configured to cause the wireless device to monitor NR-PDCCH on different beam pair link(s) and/or in different NR-PDCCH OFDM symbol.

A base station may transmit higher layer signaling, and/or a MAC control element (MAC CE), that may comprise parameters related to a wireless device Rx beam setting for monitoring NR-PDCCH on multiple beam pair links. A base station may transmit one or more indications of a spatial QCL assumption between a first DL RS antenna port(s) and a second DL RS antenna port(s). The first DL RS antenna port(s) may be for one or more of a cell-specific CSI-RS, device-specific CSI-RS, SS block, PBCH with DM-RSs of PBCH, and/or PBCH without DM-RSs of PBCH. The second DL RS antenna port(s) may be for demodulation of a DL control channel. Signaling for a beam indication for a NR-PDCCH (e.g., configuration to monitor NR-PDCCH) may be via MAC CE signaling, RRC signaling, DCI signaling, or specification-transparent and/or an implicit method, and any combination thereof.

For reception of unicast DL data channel, a base station may indicate spatial QCL parameters between DL RS antenna port(s) and DM-RS antenna port(s) of DL data channel. A base station may transmit DCI (e.g., downlink grants) comprising information indicating the RS antenna port(s). The information may indicate the RS antenna port(s) which may be QCLed with DM-RS antenna port(s). A different set of DM-RS antenna port(s) for the DL data channel may be indicated as a QCL with a different set of RS antenna port(s).

If a base station transmits a signal indicating a spatial QCL parameters between CSI-RS and DM-RS for PDCCH, a wireless device may use CSI-RSs QCLed with DM-RS for a PDCCH to monitor beam pair link quality. If a beam failure event occurs, the wireless device may transmit a beam failure recovery request, such as by a determined configuration.

If a wireless device transmits a beam failure recovery request, for example, via an uplink physical channel or signal, a base station may detect that there is a beam failure event, for the wireless device, by monitoring the uplink physical channel or signal. The base station may initiate a beam recovery mechanism to recover the beam pair link for transmitting PDCCH between the base station and the wireless device. The base station may transmit one or more control signals, to the wireless device, for example, after or in response to receiving the beam failure recovery request. A beam recovery mechanism may be, for example, an L1 scheme, or a higher layer scheme.

A base station may transmit one or more messages comprising, for example, configuration parameters for an uplink physical channel and/or a signal for transmitting a beam failure recovery request. The uplink physical channel and/or signal may be based on at least one of the following: a non-contention based PRACH (e.g., a beam failure recovery PRACH or BFR-PRACH), which may use a resource orthogonal to resources of other PRACH transmissions; a PUCCH (e.g., beam failure recovery PUCCH or BFR-PUCCH); and/or a contention-based PRACH resource. Combinations of these candidate signal and/or channels may be configured by a base station.

A base station may send a confirmation message to a wireless device, for example, after or in response to the base station receiving one or multiple BFR requests. The confirmation message may comprise the CRI associated with the candidate beam the wireless may indicate in the one or multiple BFR requests. The confirmation message may comprise an L1 control information.

LTE-Advanced introduced Carrier Aggregation (CA) in Release-10. In Release-10 CA, the Primary Cell (PCell) is always activated. In addition to the PCell, a base station may transmit one or more RRC message comprising configuration parameters for one or more secondary cells. In 3GPP LTE/LTE-A specification, there are many RRC messages used for Scell configuration/reconfiguration. For example, the base station may transmit a RRCconnectionReconfiguration message for parameters configuration of one or more secondary cells for a wireless device, wherein the parameters may comprise at least: cell ID, antenna configuration, CSI-RS configuration, SRS configuration, PRACH configuration, etc.

The one or more SCells configured in the RRC message can be activated or deactivated by at least one MAC Control Element (MAC CE). The SCell activation/deactivation processes were introduced to achieve battery power savings. After an SCell is deactivated, the wireless device may stop receiving downlink signals and stop transmission on the SCell. In LTE-A specification, the default state of an SCell is deactivated if the SCell has been configured/added. Additional activation procedure employing MAC CE Activation Command may be needed to activate the SCell. SCells may be deactivated either by an activation/deactivation MAC CE or by the sCellDeactivationTimer. The wireless device and base station maintain one sCellDeactivationTimer per SCell with a common value across SCells. A base station maintains the activation/deactivation status of an SCell for a wireless device. The same initial timer value may apply to each instance of the sCellDeactivationTimer and it is configured by RRC. sCellDeactivationTimer is included in Mac-MainConfig dedicated parameter in an RRC message. The configured SCells may be initially deactivated upon addition and after a handover.

The activation/deactivation MAC control element may be used in a variety of ways. The activation/deactivation MAC control element may be identified by a MAC PDU subheader, for example, with a pre-assigned LCID. The activation/deactivation MAC CE may have a fixed size, such as a single octet comprising seven C-fields and one R-field as shown in FIG. 25A and FIG. 27B. The activation/deactivation MAC control element may comprise field indicating by Ci. If there is an SCell configured with SCellIndex i, Ci may indicate the activation/deactivation status of the SCell with SCellIndex i, else the MAC entity may ignore the Ci field. The Ci field may be set to a value of "1" to indicate that the SCell with SCellIndex i may be activated. The Ci field may be set to a value of "0" to indicate that the SCell with SCellIndex i may be deactivated. The field R may correspond to a reserved bit, which may be set to a value of "0". If a wireless device is configured with a larger number of carriers (e.g., more than 5 or 7 carriers), the activation/deactivation MAC CE may comprise more than one byte, which may comprise a longer bitmap such as shown in FIG. 25B.

Deactivation timer management processes may be performed. For example, if a PDCCH on the activated SCell indicates an uplink grant or a downlink assignment; or if a PDCCH on a serving cell scheduling the activated SCell indicates an uplink grant or a downlink assignment for the activated SCell: the wireless device may restart an sCellDeactivationTimer associated with the SCell. A MAC entity may (e.g., for each TTI and for each configured SCell) perform certain functions related to activation and/or deactivation of one or more SCells. If the MAC entity receives an activation/deactivation MAC CE activating the SCell in a TTI, the MAC entity may: activate the SCell; start or restart the sCellDeactivationTimer associated with the SCell; and/or trigger PHR. If the MAC entity receives an activation/deactivation MAC CE deactivating the SCell in a TTI, or if the sCellDeactivationTimer associated with the activated SCell expires in the TTI, the MAC entity may: deactivate the SCell; stop the sCellDeactivationTimer associated with the SCell; and/or flush all HARQ buffers associated with the SCell.

If a wireless device activates the SCell, the wireless device may perform SCell operations including: SRS transmissions on the SCell; CQI, PMI, rank indicator (RI), and/or precoding type indicator (PTI) reporting for the SCell; PDCCH monitoring on the SCell; and/or PDCCH monitoring for the SCell. If the SCell is deactivated, a wireless device may perform the following actions: not transmit SRSs on the SCell; not report CQI, PMI, RI, and/or PTI for the SCell; not transmit on an UL-SCH on the SCell; not transmit on a RACH on the SCell; not monitor the PDCCH on the SCell; not monitor the PDCCH for the SCell. For an SCell that is self-scheduled (e.g., by a PDCCH transmitted on the SCell), the wireless device may not monitor the PDCCH on the SCell if the SCell is deactivated. For an SCell that is cross-carrier scheduled by a serving cell (e.g., a cell other than the SCell), the wireless device may not monitor the PDCCH for the SCell if the SCell is deactivated. If an SCell is deactivated, the ongoing random access procedure on the SCell, if any, may be aborted.

If a wireless device receives a MAC activation command for a secondary cell in subframe n, the corresponding actions in the MAC layer may be applied no later than a minimum time period (e.g., such as indicated in 3GPP TS 36.133) and no earlier than a maximum time period (e.g., subframe n+8), except for the following: the actions related to CSI reporting and the actions related to the sCellDeactivationTimer associated with the secondary cell, which may be applied in the maximum time period (e.g., subframe n+8). If a wireless device receives a MAC deactivation command for a secondary cell or the sCellDeactivationTimer associated with the secondary cell expires in subframe n, the corresponding actions in the MAC layer may apply no later than the minimum time period (e.g., such as indicated in 3GPP TS 36.133), except for the actions related to CSI reporting which may be applied in the maximum time period (e.g., subframe n+8).

Figure 26:
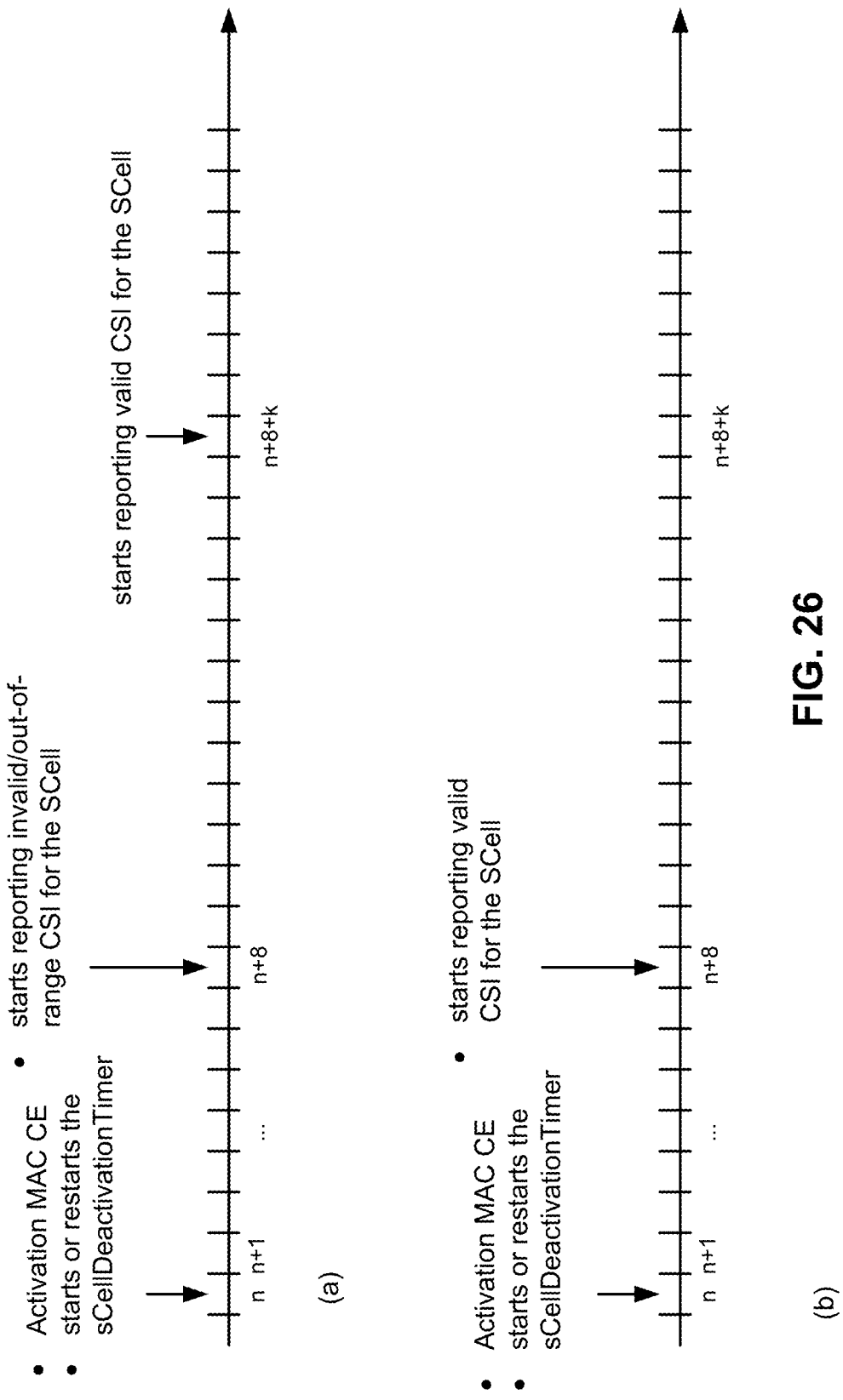
FIG. 26 shows an example of a sCellDeactivationTimer starting and CSI reporting for an SCell.

If a wireless device receives a MAC activation command for a secondary cell in subframe n, the actions related to CSI reporting and the actions related to the sCellDeactivationTimer associated with the secondary cell, may be applied in subframe n+8. If a wireless device receives a MAC deactivation command for a secondary cell or other deactivation conditions are met (e.g., the sCellDeactivationTimer associated with the secondary cell expires) in subframe n, the actions related to CSI reporting may be applied in subframe n+8. FIG. 26 shows an example timeline for a wireless device receiving a MAC activation command. The wireless device may start or restart the sCellDeactivationTimer in the $n^{th}$ subframe, if the wireless device receives a MAC activation command in the $n^{th}$ subframe, such as shown in parts "(a)" and "(b)" of FIG. 26. The wireless device may start reporting invalid (e.g., as shown in part "(a)") or valid (e.g., as shown in part "(b)") CSI for the SCell at the $(n+8)^{th}$ subframe, if the wireless device receives a MAC activation command in the $n^{th}$ subframe. A wireless device (e.g., having slow activation) may report an invalid CSI (e.g., out-of-range CSI) at the $(n+8)^{th}$ subframe, such as shown in part "(a)" of FIG. 26. The wireless device may start reporting a valid CSI for the SCell as a later subframe, such as subframe n+8+k, as shown in part "(a)". A wireless device (e.g., having a quick activation) may report a valid CSI at the $(n+8)^{th}$ subframe, such as shown in part "(b)" of FIG. 26.

If a wireless device receives a MAC activation command for an SCell in subframe n, the wireless device may start reporting CQI, PMI, RI, and/or PTI for the SCell at subframe n+8, and/or the wireless device may start or restart the sCellDeactivationTimer associated with the SCell at subframe n+8. The sCellDeactivationTimer may be maintained in both the base station and the wireless device, wherein both wireless device and base station may stop, start, and/or restart this timer in the same TTI. Without such maintaining of the timer, the sCellDeactivationTimer in the wireless device may not be in-sync with the corresponding sCellDeactivationTimer in the base station. The base station may start monitoring and/or receiving CSI (e.g., CQI, PMI, RI, and/or PTI) according to a predefined timing in the same TTI and/or after wireless device starts transmitting the CSI. If the CSI timings in wireless device and base station are not coordinated, for example, based on a common standard or air interface signaling, the network operation may result in inefficient operations and/or errors.

A base station may transmit, via a PDCCH, a DCI for scheduling decision and power-control commands. The DCI may comprise one or more of: downlink scheduling assignments, uplink scheduling grants, or power-control commands. The downlink scheduling assignments may comprise one or more of: PDSCH resource indication, transport format, HARQ information, control information related to multiple antenna schemes, or a command for power control of the PUCCH used for transmission of ACK/NACK based on or in response to downlink scheduling assignments. The uplink scheduling grants may comprise one or more of: PUSCH resource indication, transport format, HARQ related information, or a power control command of the PUSCH.

Different types of control information may correspond to different DCI message sizes. Supporting spatial multiplexing with noncontiguous allocation of RBs in the frequency domain may require a larger scheduling message in comparison with an uplink grant that may allow only frequency-contiguous allocation. The DCI may be categorized into different DCI formats (e.g., such as in an LTE system), where a format may correspond to a certain message size and/or usage. Table 2 below provides a summary of example DCI formats, including the size for an example of a 20 MHz FDD operation with two Tx antennas at the base station 2602 and no carrier aggregation.

A wireless device may monitor one or more PDCCH to detect one or more DCI with one or more DCI formats. The one or more PDCCH may be transmitted in common search space or wireless device-specific search space. The wireless device may monitor PDCCH with only a limited set of DCI format, for example, to save power consumption. The wireless device may not be required to detect a DCI with DCI format 6, which may be used for an eMTC wireless device. The wireless device may consume more power based on the number of DCI formats to be detected. The more DCI formats to be detected, the more power may be consumed by the wireless device.

The one or more PDCCH candidates that a wireless device monitors may be defined in terms of PDCCH wireless device-specific search spaces. A PDCCH wireless device-specific search space at CCE aggregation level L∈{1, 2, 4, 8} may be defined by a set of PDCCH candidates for CCE aggregation level L. For a DCI format, a wireless device may be configured per serving cell by one or more higher layer parameters a number of PDCCH candidates per CCE aggregation level L.

| | DCI format | Example size (Bits) | Usage |
|---|---|---|---|
| Uplink | 0 | 45 | Uplink scheduling grant |
| | 4 | 53 | Uplink scheduling grant with spatial multiplexing |
| | 6-0A, 6-0B | 46, 36 | Uplink scheduling grant for eMTC devices |
| Downlink | 1C | 31 | Special purpose compact assignment |
| | 1A | 45 | Contiguous allocation only |
| | 1B | 46 | Codebook-based beamforming using CRS |
| | 1D | 46 | MU-MIMO using CRS |
| | 1 | 55 | Flexible allocations |
| | 2A | 64 | Open-loop spatial multiplexing using CRS |
| | 2B | 64 | Dual-layer transmission using DM-RS (TM8) |
| | 2C | 66 | Multi-layer transmission using DM-RS (TM9) |
| | 2D | 68 | Multi-layer transmission using DM-RS (TM9) |
| | 2 | 67 | Closed-loop spatial multiplexing using CRS |
| | 6-1A, 6-1B | 46, 36 | Downlink scheduling grants for eMTC devices |
| Special | 3, 3A | 45 | Power control commands |
| | 5 | | Sidelink operation |
| | 6-2 | | Paging/direct indication for eMTC devices |

Information in the DCI formats that may be used for downlink scheduling may be organized into different groups. One or more fields of the DCI formats may comprise one or more of: resource information, such as a carrier indicator (e.g., 0 or 3 bits) and/or a RB allocation; a HARQ process number; an MCS, new data indicator (NDI), and/or RV (e.g., for the first TB and/or for the second TB); MIMO related information such as PMI, precoding information, a transport block swap flag, a power offset between PDSCH and a reference signal, a reference-signal scrambling sequence, a number of layers, and/or a number of antenna ports for a transmission; PDSCH resource-element mapping and/or QCI; downlink assignment index (DAI); a transmit power control (TPC) for PUCCH; a SRS request (e.g., 1 bit), that may comprise an indication of or trigger for a one-shot SRS transmission; an ACK and/or NACK offset; a DCI format indication, for example, which may be used to differentiate between DCI format 1A and DCI format 0 or other formats that may have the same message size; and/or padding (e.g., if necessary).

Information in the DCI formats that may be used for uplink scheduling may be organized into different groups. One or more fields of the DCI formats may comprise one or more of: resource information, such as a carrier indicator, resource allocation type, and/or a RB allocation; an MCS and/or NDI (e.g., for the first TB and/or for the second TB); a phase rotation of the uplink demodulation reference signal (DMRS); precoding information; a CSI request, a request for an aperiodic CSI report; a SRS request (e.g., 2 bits), that may comprise an indication of or a trigger for an aperiodic SRS transmission that may use one of up to three preconfigured settings; an uplink index/DAI; a TPC for PUSCH; a DCI format indication, for example, which may be used to differentiate between DCI format 1A and DCI format 0; and/or padding (e.g., if necessary).

A base station may perform CRC scrambling on a DCI, for example, before transmitting the DCI via a PDCCH. The base station may perform CRC scrambling, for example, by bit-wise addition (or, e.g., modulo-2 addition or exclusive OR (XOR) operation) of multiple bits of at least one wireless device identifier (e.g., C-RNTI, TC-RNTI, SI-RNTI, RA-RNTI, and the like) with the CRC bits of the DCI. The wireless device may check the CRC bits of the DCI, if detecting the DCI. The wireless device may receive the DCI if the CRC is scrambled by a sequence of bits that is the same as (or indicates a match with) the at least one wireless device identifier.

A base station may transmit one or more PDCCH in different control resource sets, for example, which may support wide bandwidth operation. The base station may transmit one or more RRC message comprising configuration parameters for one or more control resource sets. At least one of the one or more control resource sets may comprise one or more of: a first OFDM symbol (e.g., CORESET_StartSymbol); a number of consecutive OFDM symbols (e.g., CORESET_NumSymbol); a set of resource blocks (e.g., CORESET_RBSet); a CCE-to-REG mapping (e.g., CORESET_mapping); and/or a REG bundle size, such as for interleaved CCE-to-REG mapping (e.g., CORESET_REG_bundle). A wireless device may monitor PDCCH to detect a DCI on a subset of control resource sets (e.g., if control resource sets are configured). Such monitoring may reduce power consumption by the wireless.

A base station may transmit one or more messages comprising configuration parameters for one or more active bandwidth parts (BWPs). The one or more active BWPs may have different numerologies. The base station may transmit, to a wireless device, control information for cross-BWP scheduling.

Figure 27:
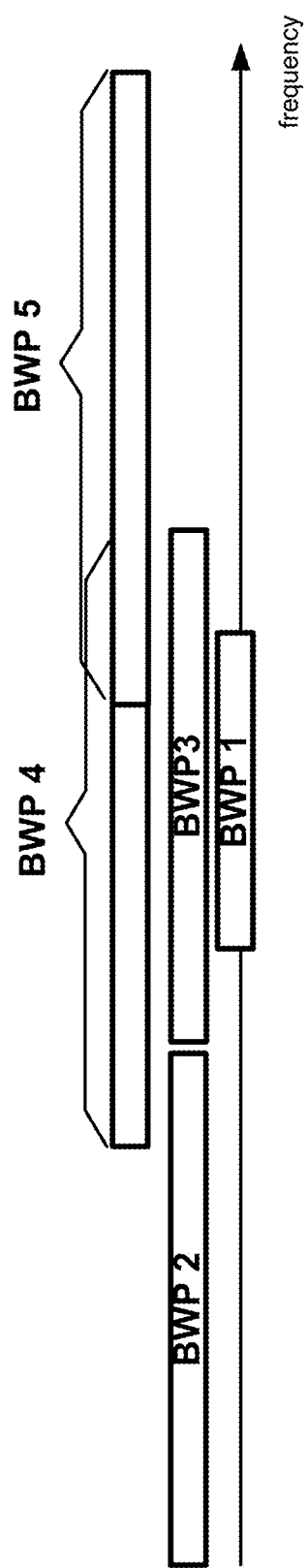
FIG. 27 shows an example of multiple Bandwidth Parts (BWPs) configuration in a frequency domain.

FIG. 27 shows an example of multiple BWP configurations. One or more BWPs may overlap with one or more other BWPs in a frequency domain. For example, BWP 1 may overlap BWP 3, both of which may overlap BWP 4 and BWP 5; BWP 2 may overlap BWP 4; and/or BWP 4 may overlap BWP 5. One or more BWPs may have a same central frequency with one or more other BWPs. For example, BWP 1 may have a same central frequency as BWP 3.

A base station may transmit one or more messages comprising configuration parameters for one or more DL BWPs and/or one or more UL BWPs for a cell. The one or more BWPs may comprise at least one BWP as the active DL BWP or the active UL BWP, and/or zero or one BWP as the default DL BWP or the default UL BWP. For a PCell, the active DL BWP may be the DL BWP on which the wireless device may monitor one or more PDCCH and/or receive PDSCH. The active UL BWP may be the UL BWP on which the wireless device may transmit an uplink signal. For an SCell, the active DL BWP may be the DL BWP on which the wireless device may monitor one or more PDCCH and receive PDSCH when the SCell is activated, for example, by receiving an activation/deactivation MAC CE. The active UL BWP may be the UL BWP on which the wireless device may transmit PRACH and/or PUCCH (e.g., if configured) and/or PUSCH if the SCell is activated, for example, by receiving an activation/deactivation MAC CE.

Configuration of multiple BWPs may be used to reduce a wireless device power consumption. A wireless device configured to use an active BWP and a default BWP may switch to the default BWP, for example, if there is no activity on the active BWP. A default BWP may be configured to use a narrow bandwidth, and/or an active BWP may be configured to use a wide bandwidth. If there is no signal transmitting on or receiving from an active BWP, the wireless device may switch the BWP to the default BWP, which may reduce power consumption.

Switching a BWP may be triggered by a DCI and/or a timer. If a wireless device receives a DCI indicating DL BWP switching from an active BWP to a new BWP, the wireless device may monitor PDCCH and/or receive PDSCH on the new BWP, for example, after or in response to receiving the DCI. If the wireless device receives a DCI indicating UL BWP switching from an active BWP to a new BWP, the wireless device may transmit PUCCH (e.g., if configured) and/or PUSCH on the new BWP, for example, after or in in response to receiving the DCI.

A base station may transmit, to a wireless device, one or more RRC messages comprising a BWP inactive timer. The wireless device may start the timer, for example, if it switches its active DL BWP to a DL BWP other than the default DL BWP. The wireless device may restart the timer to the initial value, for example, if it successfully decodes a DCI to schedule PDSCH(s) in its active DL BWP. The wireless device may switch its active DL BWP to the default DL BWP, for example, if the BWP timer expires.

Figure 28:
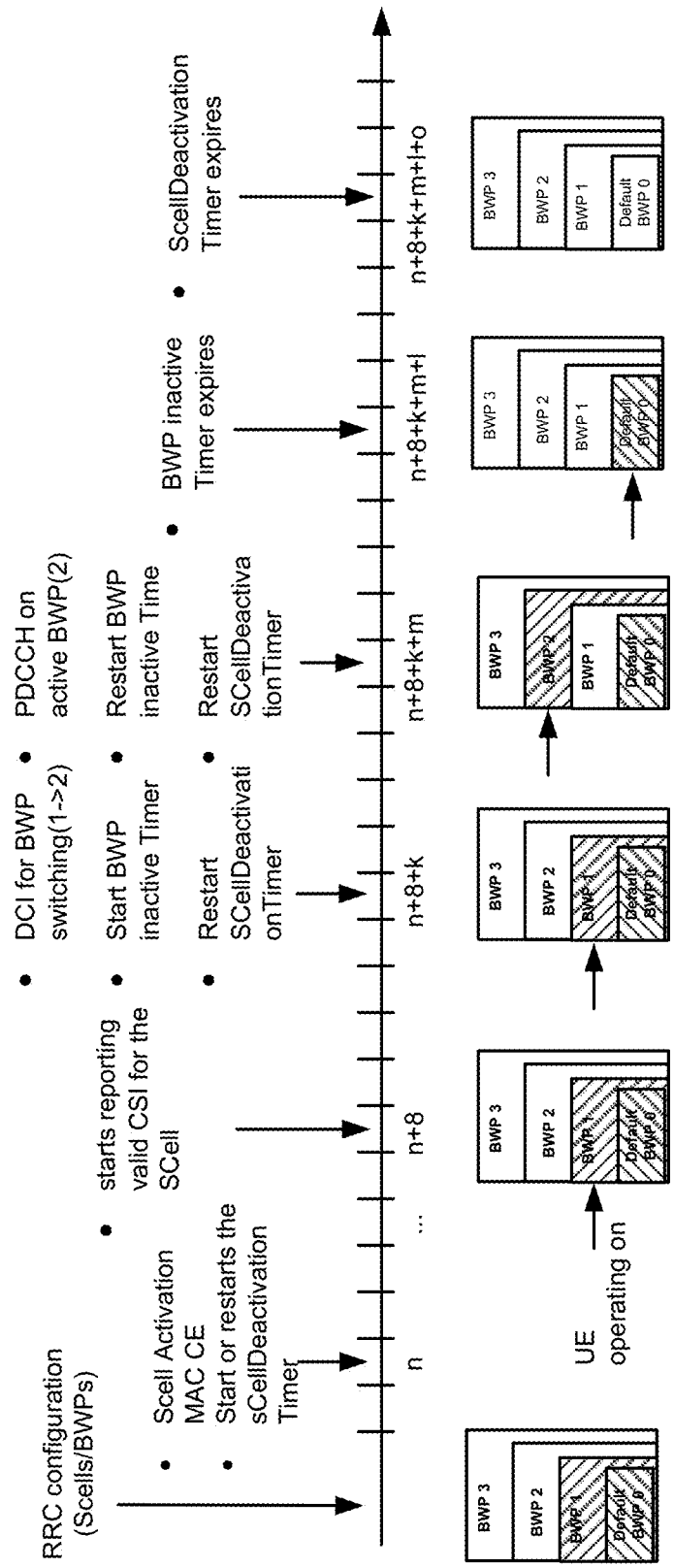
FIG. 28 shows an example of BWP inactivity timer and a sCellDeactivationTimer relation for an activated SCell.

FIG. 28 shows an example of BWP switching associated with a BWP inactive timer. A wireless device may receive one or more RRC messages comprising parameters for an SCell and one or more BWP configuration associated with the SCell. Among the one or more BWPs, at least one BWP may be configured as the first active BWP (e.g., BWP 1), and/or one BWP may be configured as the default BWP (e.g., BWP 0). The wireless device may receive a MAC CE to activate the SCell at the $n^{th}$ subframe. The wireless device may start or restart the sCellDeactivationTimer at the $n^{th}$ subframe, and may start action related to CSI reporting for the SCell, or for the initial active BWP of the SCell, at the $(n+8)^{th}$ subframe. The wireless device may start the BWP inactive timer and/or restart the sCellDeactivationTimer (e.g., if the wireless device receives a DCI indicating switching a BWP from BWP 1 to BWP 2), at the $(n+8+k)^{th}$ subframe. If the wireless device receives a PDCCH indicating a DL scheduling on BWP 2, for example, at the $(n+8+k+m)^{th}$ subframe, the wireless device may restart the BWP inactive timer and/or the wireless device may restart the sCellDeactivationTimer. The wireless device may switch back to the default BWP (e.g., BWP 0) if the BWP inactive timer expires, for example, at the $(n+8+k+m+1)^{th}$ subframe. The wireless device may deactivate the SCell if the sCellDeactivationTimer expires, for example, at the $(n+8+k+m+1+o)^{th}$ subframe.

The BWP inactive timer may be applied in a PCell. A base station may transmit one or more RRC messages comprising a BWP inactive timer to a wireless device. The wireless device may start the timer if the wireless devices switches its active DL BWP to a DL BWP other than the default DL BWP. The wireless device may restart the timer to the initial value if it successfully decodes a DCI to schedule PDSCH(s) in its active DL BWP. The wireless device may switch its active DL BWP to the default DL BWP if the BWP timer expires.

The BWP inactive timer may be used to reduce wireless device power consumption, for example, if the wireless device is configured with multiple cells and at least one cell has a wide bandwidth. For example, the wireless device may transmit on or receive from a narrow-bandwidth BWP on the PCell or SCell if there is no activity on an active BWP. The wireless device may deactivate the SCell, which may be triggered by sCellDeactivationTimer expiring, if there is no activity on the SCell.

CSI reporting and/or semi-persistent (SP) CSI reporting may be activated and/or deactivated by a MAC CE. The MAC CE may comprise a BWP identifier which may reduce activation time delay that may otherwise occur for BWP switching. The MAC CE comprising a BWP identifier may enable a base station flexibility in transmitting the MAC. The MAC CE comprising a BWP identifier may reduce downlink data scheduling delay. The MAC CE comprising a BWP identifier may increase spectrum efficiency of downlink data transmission. If activation of CSI reporting is transmitted after activation of a cell, the activation may be slow. For example, a MAC CE may not be transmitted in a time urgent manner, which may result in a delayed CSI report activation. Activation of BWPs, however, may be required to be relatively quick. For example, BWP activation and/or BWP switching may be based on physical layer switching. BWPs may be used for time-sensitive communications. A base station may determine a CSI reporting delay above a threshold may be unacceptable for scheduling on a BWP. By indicating a BWP in a MAC CE prior to BWP activation and/or BWP switching, CSI reporting activation delay may be reduced. A base station may transmit, to a wireless device, a MAC CE on a first BWP to activate one or more CSI resources on a second BWP indicated by the BWP identifier.

A base station may transmit, to a wireless device, one or more RRC messages comprising configuration parameters for a cell. The cell may comprise a PCell, an SCell (e.g., an SCell of a plurality of SCells). The configuration parameters may comprise one or more BWPs comprising at least a first BWP, and/or one or more CSI report configurations comprising at least a first CSI report configuration. The one or more CSI report configurations may be associated with a semi-persistent CSI reporting on a physical uplink control channel (PUCCH). The at least a first BWP may be associated with one or more of: a first parameter for a frequency location, a second parameter for a bandwidth, a third parameter for a subcarrier spacing, and/or a fourth parameter for a cyclic prefix. A value associated with the second parameter for a bandwidth may be less than a value associated with a bandwidth of the cell.

The base station may transmit, to the wireless device, a first MAC CE comprising: a BWP identifier field indicating the first BWP; and a channel state information (CSI) report configuration activation/deactivation field indicating activation of the first CSI report configuration. The activation/deactivation field may comprise an activation command and/or a deactivation command. Additionally or alternatively, the MAC CE may comprise a BWP identifier field indicating the first BWP; a semi-persistent (SP) CSI reference signal (CSI-RS) resource set; and/or an indicator indicating activation of the SP CSI-RS resource set. The BWP identifier may comprise any number of bits, such as, for example, 1, 2, 3, or 4 bits. The MAC CE may comprise a fixed and/or predetermined length. The at least a first CSI report configuration may be associated with one or more of: a report configuration type indicator (e.g., indicating a periodic, semi-persistent, or aperiodic report configuration); reference signal resource configuration parameters; report quantity parameters; frequency domain configuration parameters; and/or time domain configuration parameters. The one or more CSI reports may be based on: one or more reference signal resources indicated by the one or more reference signal resource parameters; and/or one or more frequency configuration parameters indicated by the one or more report frequency domain configuration parameters. The one or more CSI reports may comprise at least one of the one or more report quantities indicated by the one or more report quantity parameters.

The wireless device may receive the one or more RRC messages. The wireless device may receive the first MAC CE. The wireless device may activate the first CSI report configuration for the first BWP, for example, after or in response to receiving the first MAC CE. The wireless device may activate the first CSI report configuration via a BWP, for example, including via a BWP for the CSI reporting or via any other BWP. Additionally or alternatively, the wireless device may activate the SP CSI-RS resource set for the first BWP, for example, after or in response to receiving the first MAC CE. The wireless device may activate the SP CSI-RS resource set via a BWP, for example, including via a BWP for the SP CSI-RS resource set or via any other BWP. The wireless device may activate SP CSI reporting via a physical uplink control channel (PUCCH). The wireless device may transmit, to the base station, one or more CSI reports based on the first CSI report configuration. Additionally or alternatively, the wireless device may transmit, to the base station, one or more CSI reports based on the SP CSI-RS resource set. The wireless device may transmit the one or more CSI reports via an uplink control channel (e.g., a physical uplink control channel) and/or via a physical uplink shared channel. The uplink control channel and/or the physical uplink shared channel may be associated with the first CSI report configuration. The wireless device may transmit the one or more CSI reports with periodic, semi-persistent, or aperiodic transmission indicated by the report configuration type indicator. The wireless device may transmit, via an uplink control channel, the one or more CSI reports with semi-persistent transmission based on or in response to the report configuration type indicator indicating semi-persistent transmission. The wireless device may transmit, via a physical uplink shared channel, the one or more CSI reports with aperiodic transmission based on or in response to the report configuration type indicator indicating aperiodic transmission. The one or more CSI reports may comprise one or more of: a first parameter associated with a channel quality indicator; a second parameter associated with a precoding matrix indicator; a third parameter associated with a rank indicator; and/or a fourth parameter associated with a layer 1 reference signal received power.

The base station may transmit, to the wireless device, a second MAC CE comprising a second BWP identifier field indicating the first BWP; and a CSI report configuration activation/deactivation field indicating a deactivation of the first CSI report configuration. Additionally or alternatively, the base station may transmit, to the wireless device, a second MAC CE comprising a second BWP identifier field indicating the first BWP; an SP CSI-RS resource set; and an indicator indicating a deactivation of the SP CSI-RS resource set. The wireless device may receive the second MAC CE. The wireless device may deactivate the first CSI report configuration for the first BWP, for example, after or in response to receiving the second MAC CE. The wireless device may deactivate the first CSI report configuration via a BWP, for example, including via a BWP for the deactivation of the first CSI report configuration or via any other BWP. Additionally or alternatively, the wireless device may deactivate the SP CSI-RS resource set for the first BWP, for example, after or in response to receiving the second MAC CE. The wireless device may deactivate the SP CSI-RS resource set via a BWP, for example, including via a BWP for the deactivation of the SP CSI-RS resource set or via any other BWP. The wireless device may stop the transmission of the one or more CSI reports, for example, after or in response to the deactivating.

A base station may transmit one or more RRC message comprising one or more CSI configuration parameters. The one or more CSI parameters may comprise one or more: CSI-RS resource setting; CSI reporting settings and/or CSI measurement setting. A CSI-RS resource setting may comprise one or more CSI-RS resource sets. A CSI-RS resource set may be provided for a periodic CSI-RS, (P CSI-RS) and/or a semi-persistent (SP) CSI-RS. A base station may transmit one or more P CSI-RS and/or SP CSI-RS with a configured periodicity in a time domain. The base station may transmit the one or more SP CSI-RS with a limited transmission duration that may be configured by the base station. The base station may transmit the one or more SP CSI-RS for the wireless device, for example, prior to or until the base station deactivates the one or more SP CSI-RS. The base station may deactivate and/or stop transmission of the one or more SP CSI-RS, for example, by transmitting a SP CSI-RS deactivation MAC CE and/or DCI.

A CSI-RS resource set may comprise one or more of: CSI-RS type (e.g., periodic, aperiodic, semi-persistent); CSI-RS resources (e.g., comprising at a CSI-RS resource configuration identity and/or a number of CSI-RS ports); CSI RS configuration (e.g., a symbol and/or RE locations in a subframe); CSI RS subframe configuration (e.g., subframe location, offset, and/or periodicity in a radio frame); CSI-RS power parameter; CSI-RS sequence parameter; CDM type parameter; frequency density; transmission comb; and/or QCL parameters.

One or more CSI-RS resources may be transmitted periodically, using aperiodic transmission, using a multi-shot transmission, or using a semi-persistent transmission. In a periodic transmission, the configured CSI-RS resource may be transmitted using a configured periodicity in a time domain. In an aperiodic transmission, the configured CSI-RS resource may be transmitted, for example, in a dedicated time slot or subframe. In a multi-shot transmission or semi-persistent transmission, the configured CSI-RS resource may be transmitted within a configured period.

One or more CSI reporting settings may comprise one or more of: a report configuration identifier; a report type; reported CSI parameter(s); CSI type (e.g., a type I or a type II); codebook configuration; time-domain behavior; frequency granularity for CQI and/or PMI; and/or measurement restriction configurations. The report type may indicate a time domain behavior of the report (e.g., aperiodic, semi-persistent, or periodic). The one or more CSI reporting settings may comprise one or more of: a periodicity parameter; a duration parameter; and/or an offset (e.g., in unit of slots and/or subframes), for example, if the report type in a CSI reporting setting is a periodic report or a semi-persistent report. The periodicity parameter may indicate the periodicity of a CSI report. The duration parameter may indicate a duration of CSI report transmission. The offset parameter may indicate a value of a timing offset of a CSI report.

An SP CSI report may comprise multiple CSI reporting settings. An SP CSI report may comprise one CSI resource set for an SP CSI-RS. A CSI measurement setting may comprise one or more links comprising one or more link parameters. A link parameter may comprise one or more of: a CSI reporting setting indication, a CSI-RS resource setting indication, and/or measurement parameters. A base station may trigger a CSI reporting, for example, by transmitting am RRC message, a MAC CE, and/or a DCI, such as shown in FIG. 30.

A wireless device may transmit one or more SP-CSI reporting. The one or more SP-CSI reporting may be transmitted with a transmission periodicity. The one or more SP-CSI reporting may be triggered by the wireless device receiving a MAC CE, and/or DCI. The MAC CE or the DCI may indicate an SP-CSI reporting on one or more periodic (P) CSI-RS resources. The MAC CE or the DCI may indicate an SP-CSI reporting on one or more SP CSI-RS resources.

Figure 29:
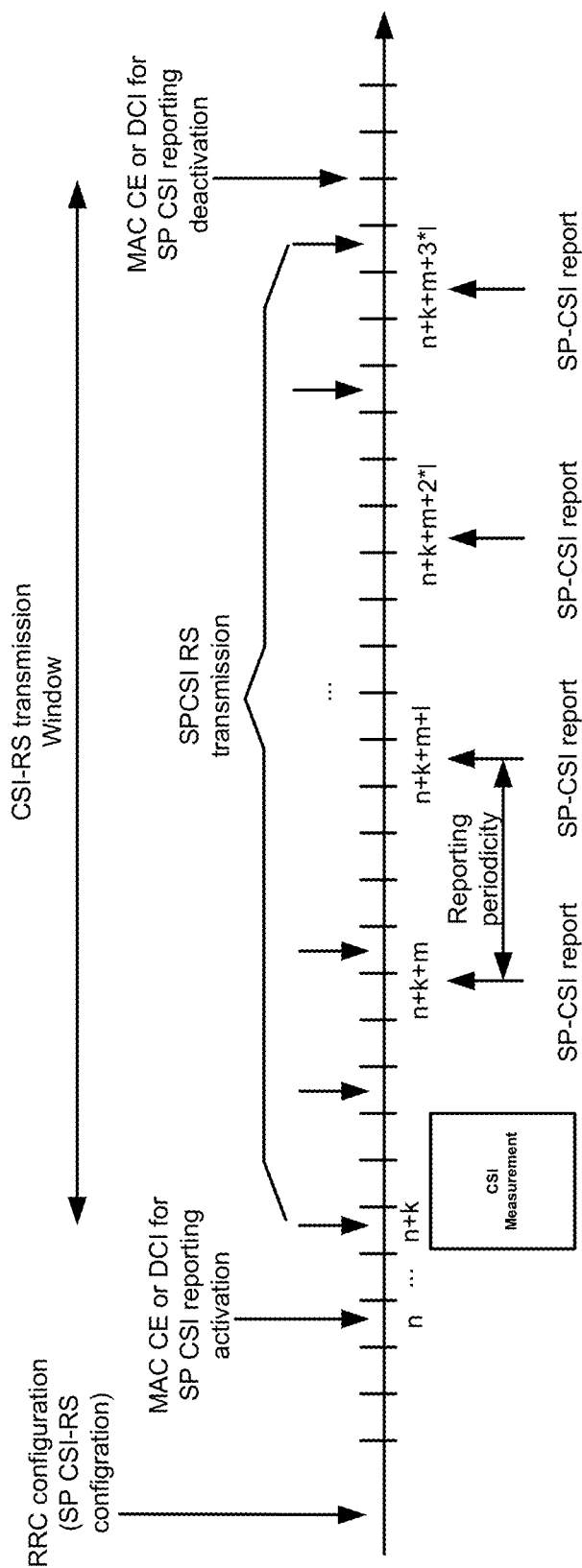
FIG. 29 shows an example of semi-persistent (SP) CSI configuration with a CSI activation MAC control element (CE) or DCI and a CSI deactivation MAC CE or DCI.

FIG. 29 shows an example of SP-CSI reporting. A base station may transmit, to a wireless device, one or RRC messages comprising configuration parameters. The configuration parameters may comprise, for example, one or more SP-CSI RS configurations. The base station may transmit, to the wireless device (e.g., at subframe n) a MAC CE and/or a DCI. The MAC CE and/or the DCI may comprise an indication of an SP CSI reporting activation. The wireless device may perform CSI measurement, for example, at subframe n+k. The base station may start transmitting (e.g., at the start of a CSI-RS transmission window) one or more SP CSI-RS at subframe n+k, for example, if the base station transmits at subframe n a MAC CE and/or DCI to trigger an SP CSI reporting. The value k may be zero, or an integer greater than zero. The value k may be configured in an RRC message and/or the value k may be predefined as a fixed value. The wireless device may transmit (e.g., during an SP-CSI RS transmission period) SP CSI reporting at subframe n+k+m, n+k+m+l, and/or n+k+m+2*l, n+k+m+3*l, etc., for example, with a periodicity of l subframes. The wireless device may stop transmitting SP CSI reporting, for example, after or in response to receiving a MAC CE and/or DCI for deactivating SP CSI reporting (e.g., which may end a CSI-RS transmission window). The value "m" may be configured with a RRC and/or may be predefined as a fixed value.

There may be a plurality of types of transmissions without dynamic grant (e.g. grant-free). A first type of grant-free transmisison may be configured grant Type 1, wherein an uplink grant may be provided via RRC signaling (e.g., one or more RRC messages) from a base station and stored as a configured uplink grant. A second type of grant-free transmission may be configured grant Type 2, wherein an uplink grant is provided via the PDCCH, and stored or cleared as configured uplink grant based on L1 signalling indicating configured grant activation or deactivation.

Type 1 and Type 2 may be configured via RRC signaling, for example, on a per serving cell or per BWP basis. Multiple configurations may be active simultaneously on different serving cells. For configured grant Type 2, activation and deactivation may be independent among the serving cells. For the same serving cell, the MAC entity may be configured with either Type 1 or Type 2.

RRC signaling may configure the following parameters if grant Type 1 is configured: cs-RNTI: CS-RNTI for retransmission; periodicity: periodicity of the configured grant Type 1; timeDomainOffset: Offset of a resource with respect to SFN=0 in time domain; and numberOfConfGrant-Processes: the number of HARQ processes.

RRC signaling may configure the following parameters if grant Type 2 is configured: cs-RNTI: CS-RNTI for both activation, deactivation, and retransmission; periodicity: periodicity of the configured grant Type 2; and numberOfConfGrant-Processes: the number of HARQ processes.

For configuration of a grant Type 1 configuration for a serving cell by upper layers, the MAC entity/wireless device may store the uplink grant provided by upper layers as a configured uplink grant for the indicated serving cell. The MAC entity/wireless device may initialise (if not active) or re-initialise (if already active) the configured uplink grant to start in the symbol according to timeDomainOffset, and to reoccur with periodicity.

If an uplink grant is configured for a grant Type 1 configuration, the MAC entity may consider sequentially that the Nth uplink grant occurs associated with the symbol for which: [(SFN*numberOfSlotsPerFrame* numberOfSymbolsPerSlot)+(slot number in the frame*numberOfSymbolsPerSlot)+symbol number in the slot]=(timeDomainOffset+N*periodicity) modulo 1024.

If an uplink grant is configured for a grant Type 2 configuration, the MAC entity/wireless device may consider sequentially that the Nth uplink grant occurs associated with the symbol for which: [(SFN*numberOfSlotsPerFrame*numberOfSymbolsPerSlot)+(slot number in the frame*numberOfSymbolsPerSlot)+symbol number in the slot]=[(SFNstart time*numberOfSlotsPerFrame*numberOfSymbolsPerSlot+slotstarttime*numberOfSymbolsPerSlot+symbolstart time)+N*periodicity] modulo 1024 where SFNstart time, slotstart time, and symbolstart time are the SFN, slot, and symbol, respectively, at the time the configured uplink grant was (re-)initialised.

If a configured grant is released by upper layers, the corresponding configurations may be released and corresponding uplink grants may be cleared as well.

If the configured grant has been triggered and not cancelled, and if the MAC entity has UL resources allocated for new transmission, the wireless device/MAC entity may instruct the Multiplexing and Assembly procedure to generate a Configured Grant Confirmation MAC CE. The MAC entity/wireless device may cancel the triggered configured grant confirmation.

For a configured grant Type 2, the MAC entity/wireless device may clear the configured uplink grant, for example, immediately after first transmission of Configured Grant Confirmation MAC CE triggered by the configured grant deactivation.

Retransmissions, except for repetition of configured grants, may use uplink grants addressed to CS-RNTI.

The SPS-Config IE may be used to configure semi-persistent transmission according to two possible schemes. The actual uplink grant may either be configured via RRC messaging (type1) or provided via the PDCCH (e.g., addressed to SPS-RNTI and/or CS-RNTI) (type2). The SP-Config IE may comprise a plurality of IEs indicating uplink periodicity, power control parameters, number of HARQ processes, one or more repetition parameters, configured uplink grant parameters, time domain offset, time domain allocation, frequency domain allocation, DMRS, MCS, TBS, etc.

The wireless device may transmit a configured grant confirmation MAC CE after receiving DCI activating or releasing one or more configured grants. The Configured Grant Confirmation MAC CE may be identified by a MAC PDU subheader with a corresponding LCID. The configured grant conformation MAC CE may have a fixed size of zero bits.

The time and frequency resources that may be used by the wireless device to report CSI may be controlled by the gNB. The CSI may comprise Channel Quality Indicator (CQI), precoding matrix indicator (PMI), CSI-RS resource indicator (CRI), strongest layer indication (SLI), rank indication (RI) and/or and L1-RSRP.

For CQI, PMI, CRI, SLI, RI, L1-RSRP, a wireless device may be configured by higher layers with N≥1 ReportConfig Reporting Settings, M≥1 ResourceConfig Resource Settings, and a single MeasConfig measurement setting containing L≥1 Links. A MeasConfig contains a list of reporting configurations (ReportConfigList), a list of resource configurations (ResourceConfigList), a list of link configurations (MeasLinkConfigList) and a list of trigger states (ReportTrigger).

A Reporting Setting ReportConfig may be associated with a single downlink BWP (higher layer parameter bandwidthPartId) and may contain the reported parameter(s) for a CSI reporting band: CSI Type (I or II) if reported, codebook configuration including codebook subset restriction, time-domain behavior, frequency granularity for CQI and PMI, measurement restriction configurations, the strongest layer indicator (SLI), the reported L1-RSRP parameter(s), CRI, and SSBRI (SSB Resource Indicator). Each ReportConfig may contain a ReportConfigID to identify the ReportConfig, a ReportConfigType to specify the time domain behavior of the report (either aperiodic, semi-persistent, or periodic), a ReportQuantity to indicate the CSI-related or L1-RSRP-related quantities to report, a ReportFreqConfiguration to indicate the reporting granularity in the frequency domain. For periodic/semi-persistent reporting, a ReportConfig may contain a ReportSlotConfig to specify the periodicity and slot offset. For aperiodic reporting, a ReportConfig may contain an AperiodicReportSlotOffset to specify a set of allowed values of the timing offset for aperiodic reporting (a particular value is indicated in DCI). The ReportFreqConfiguration may contain parameters to enable configuration of at least subband or wideband PMI and CQI reporting separately. The ReportConfig may also contain MeasRestrictionConfig-time-channel to specify parameters to enable configuration of time domain measurement restriction for channel. The ReportConfig may also contain MeasRestrictionConfig-time-interference to specify parameters to enable separate configuration of time domain measurement restriction for interference. The ReportConfig may also contain CodebookConfig, which may contain configuration parameters for Type-I or Type II CSI including codebook subset restriction.

A Resource Setting ResourceConfig may contain a configuration of S≥1 CSI-RS Resource Sets (higher layer parameter ResourceSetConfig), with each Resource Set consisting of CSI-RS resources (higher layer parameters NZP-CSI-RS-ResourceConfigList and CSI-IM-ResourceConfigList) and SS/PBCH Block resources used for L1-RSRP computation (higher layer parameter resource-config-SS-list). Each Resource setting is located in the BWP identified by the higher layer parameter BWP-info, and all linked Resource Settings of a CSI Report Setting have the same BWP.

For periodic and semi-persistent CSI Resource Settings, S=1. Each set s may contain Ks≥1 CSI-RS resources (higher layer parameter CSI-RS-ResourceConfig) each of which includes at least mapping to REs, number of ports and time-domain behavior. The allowable antenna port values and resource mapping patterns are specified in TS 38.211. The time domain behavior of the CSI-RS resources which are part of sets within a CSI-RS Resource Setting are indicated by the higher layer parameter ResourceConfig-Type and maybe aperiodic, periodic, or semi-persistent. The following may be configured via higher layer signaling for one or more CSI resource settings for channel and interference measurement: CSI-IM resource for interference measurement, Non-zero power CSI-RS resource for interference measurement; and/or Non-zero power CSI-RS resource for channel measurement A Link MeasLinkConfig in the higher layer-configured CSI measurement setting may contain the CSI Reporting Setting indication, CSI Resource Setting Indication, and MeasQuantity an indication of the quantity to be measured which maybe either channel measurement or interference measurement. ReportConfigMax indicates the maximum number of report configurations, ResourceConfigMax indicates the maximum number of resource configurations, MeasLinkConfigMax indicates the maximum number of link configurations, ResourceSetMax indicates the maximum number of resources sets per resource configuration, CSI-RS-ResourcePerSetMax indicates the maximum number of NZP-CSI-RS resources per NZP-CSI-RS resource set, NZP-CSI-RS-ResourceMax indicates the maximum number of NZP-CSI-RS resources, CSI-IM-ResourcePerSetMax indicates the maximum number of CSI-IM resources per CSI-IM resource set, CSI-IM-ResourceMax indicates the maximum number of CSI-IM resources, and AperiodicReportTrigger may contain trigger states for dynamically selecting one or more aperiodic reporting configurations.

The Reporting configuration for CSI may be aperiodic (using PUSCH), periodic (using PUCCH) or semi-persistent (using PUCCH, and DCI activated PUSCH). The CSI-RS Resources may be periodic, semi-persistent, or aperiodic. Different combinations of CSI Reporting configurations and CSI Resource configurations may be supported, and the CSI Reporting may be triggered for each CSI-RS configuration, see for example FIG. 30. Periodic CSI-RS may be configured by higher layers. Semi-persistent CSI-RS may be activated and deactivated Aperiodic CSI-RS may be configured and selected.

If the wireless device is configured with the higher layer configured parameter Number-CQI set to '1', a single CQI is reported for one codeword per CSI report. If the Number-CQI parameter is set to '2,' then one CQI for each codeword is reported per CSI report. The Number-CQI parameter may be contained in a reporting setting (e.g., ReportConfig).

If the wireless device is configured with a CSI-RS resource set and if the higher layer parameter CSI-RS-ResourceRep is set to 'OFF', the wireless device may determine a CRI from the supported set of CRI values and report the number in each CRI report. If the higher layer parameter CSI-RS-ResourceRep is set to 'ON', CRI is not reported.

For periodic or semi-persistent CSI reporting, the following periodicities (measured in slots) may be configured by the higher layer parameter ReportPeriodicity: {5, 10, 20, 40, 80, 160, 320}. If the UE is configured with the higher layer parameter ReportQuantity set to 'CRI/RSRP', and if the wireless device is configured with the higher layer parameter group-based-beam-reporting set to 'OFF', the wireless device is not required to update measurements for more than 64 [CSI-RS and or SSB] resources, and the wireless device may report in a single report nrofReportedRS (higher layer configured) different [CRI and SSBRI (SSB Resource Indicator)] for each report setting. If the higher layer parameter nrofReportedRS is configured to be one, the reported L1-RSRP value is defined by a 7-bit value in the range [−140, −44] dBm with 1 dB step size. If the higher layer parameter nrofReportedRS is configured to be larger than one, the wireless device mayuse largest L1-RSRP and differential L1-RSRP based reporting, where the largest value of L1-RSRP uses a 7-bit value and the differential L1-RSRP uses a 4-bit value. The differential L1-RSRP values are computed with 2 dB step size with a reference to the largest L1-RSRP value which is part of the same L1-RSRP reporting instance. If the UE is configured with the higher layer parameter ReportQuantity set to 'CRI/RSRP', and if the wireless device is configured with the higher layer parameter group-based-beam-reporting set to 'ON', the wireless device may report in a single reporting instance up to number-of-beams-reporting L1-RSRP and CSI reports, where up to number-of-beams-reporting [CSI-RS and or SSB] resources maybe received simultaneously by the wireless device either with a single spatial domain receive filter, or with multiple simultaneous spatial domain receive filters.

For L1-RSRP computation, the wireless device may be configured with CSI-RS resources, SS/PBCH Block resources or both CSI-RS and SS/PBCH Block resource. The wireless device may be configured with CSI-RS resource setting up to 16 CSI-RS resource sets having up to 64 resources within each set. The total number of different CSI-RS resources over all resource sets is no more than 128.

A wireless device configured with a CSI-RS resource, and configured with the higher layer parameter ReportQuantity set to 'No Report', may not report any information, otherwise the wireless device may report the information as configured by the ReportQuantity.

The ReportFreqConfiguration contained in a ReportConfig indicates the frequency granularity of the CSI Report. For CSI reporting, a wireless device may be configured via higher layer signaling with one out of two possible subband sizes, where a subband is defined as $N_{PRB}^{SB}$ contiguous PRBs and depends on the total number of PRBs in the carrier bandwidth part.

A CSI reporting setting configuration defines a CSI reporting band as a subset of subbands of the bandwidth part, and the ReportFreqConfiguration may indicate whether the CSI-ReportingBand is a contiguous or non-contiguous subset of subbands in the bandwidth part for which CSI may be reported. The wireless device is not expected to be configured with a CSI reporting band which contains subbands where reference signals for channel and interference are not present.

The ReportFreqConfiguration may indicate single CQI or multiple CQI reporting, as configured by the higher layer parameter CQI-FormatIndicator. If single CQI reporting is configured, a single CQI is reported for each codeword for the entire CSI reporting band. If multiple CQI reporting is configured, one CQI for each codeword may be reported for each subband in the CSI reporting band.

The ReportFreqConfiguration may indicate whether single PMI or multiple PMI reporting is configured by the higher layer parameter PMI-FormatIndicator. If single PMI reporting is configured, a single PMI may be reported for the entire CSI reporting band. If multiple PMI reporting is configured, except with 2 antenna ports, a single wideband indication may be reported for the entire CSI reporting band and one subband indication may be reported for each subband in the CSI reporting band. If multiple PMIs are configured with 2 antenna ports, a PMI may be reported for each subband in the CSI reporting band.

If a wireless device is configured with higher layer parameter CodebookType set to 'TypeI-SinglePanel' and PMI-FormatIndicator is configured for single PMI reporting, the wireless device may be configured with CSIReportQuantity to report RI/CRI, and a PMI consisting of a single wideband indication for the entire CSI reporting band; or, RI/CRI, CQI, and a PMI consisting of a single wideband indication for the entire CSI reporting band. The CQI may be calculated assuming PDSCH transmission with $N_p \geq 1$ precoders, where the wireless device assumes that one precoder is randomly selected from the set of $N_p$ precoders for each PRG on PDSCH, where the PRG size for CQI calculation may be configured by the higher layer parameter PUSCH-bundle-size-for-CSI If a wireless device is configured with semi-persistent CSI reporting, the wireless device may report CSI if both CSI-IM and non-zero power CSI-RS resources are configured as periodic or semi-persistent. If a wireless device is configured with aperiodic CSI reporting, the wireless device may report CSI if both CSI-IM and non-zero power CSI-RS resources are configured as periodic, semi-persistent or aperiodic.

A trigger state configured using the higher layer parameter ReportTrigger may be associated with one or multiple ReportConfig, wherein each ReportConfig may be linked to periodic, or semi-persistent, or aperiodic resource setting(s), If one resource setting is configured, the resource setting is for channel measurement for L1-RSRP computation. If two resource settings are configured, the first one resource setting may be for channel measurement and the second one may be for interference measurement performed on CSI-IM or on non-zero power CSI-RS. If three resource settings are configured, the first one resource setting may be for channel measurement, the second one may be for CSI-IM based interference measurement and the third one may be for non-zero power CSI-RS based interference measurement.

For CSI measurement(s), a wireless device may assume that each non-zero power CSI-RS port configured for interference measurement corresponds to an interference transmission layer. All interference transmission layers may be on non-zero power CSI-RS ports for interference measurement, taking into account the associated EPRE ratios; and other interference signals may be on REs of non-zero power CSI-RS resource for channel measurement, non-zero power CSI-RS resource for interference measurement, or CSI-IM resource for interference measurement.

If a wireless device is configured with the higher layer parameter ReportQuantity set to 'CRI/RI/CQI', the wireless device may be configured with higher layer parameter Non-PMI-PortIndication contained in a ReportConfig, where r ports are indicated in the order of layer ordering for rank r and each CSI-RS resource in the CSI resource setting linked to the ReportConfig in a MeasLinkConfig, based on the order of the associated NZP-CSI-RS-ResourceConfigID in the linked CSI resource setting linked for channel measurement. For calculating the CQI for a rank, the wireless device may use the ports indicated for that rank for the selected CSI-RS resource. The precoder for the indicated ports may be assumed to be the identity matrix.

For Resource Sets configured with the higher layer parameter ResourceConfigType set to 'aperiodic', trigger states for Reporting Setting(s) and/or Resource Set(s) for channel and/or interference measurement on one or more component carriers may be configured using the higher layer parameter AperiodicReportTrigger. For aperiodic CSI report triggering, a single set of CSI triggering states may be higher layer configured, wherein the CSI triggering states maybe associated with either candidate DL BWP. A wireless device is not expected to be triggered with a CSI report for a non-active DL BWP. A trigger state may be initiated using the DCI CSI request field. If the value of the DCI CSI request field is zero, no CSI is requested. If the number of configured CSI triggering states in AperiodicReportTrigger is greater than $2^{N_{TS}}-1$, where $N_{TS}$ is the number of bits in the DCI CSI request field, the wireless device receives a selection command [10, TS 38.321] used to map up to $2^{N_{TS}}-1$ trigger states to the codepoints of the DCI CSI request field. $N_{TS}$ is configured by the higher layer parameter ReportTriggerSize and $N_{TS} \in \{0,1,2,3,4,5,6\}$. If the number of CSI triggering states in AperiodicReportTrigger is less than or equal to $2^{N_{TS}}-1$, the DCI CSI request field directly indicates the triggering state and the wireless device's quasi-colocation assumption.

For each aperiodic CSI-RS resource associated with each CSI triggering state, the wireless device may be provided with the quasi co-location configuration of quasi co-location RS source(s) and quasi co-location type(s) through higher layer signaling of QCL-Info-aPerodicReportingTrigger, which contains a list of references to TCI-RS-SetConfig's for the aperiodic CSI-RS resources associated with the CSI triggering state. If a TCI-RS-SetConfig in the list is configured with a reference to an RS associated with QCL-TypeD, that RS may be an SS/PBCH block or a CSI-RS resource configured as periodic or semi-persistent.

For a wireless device configured with the higher layer parameter AperiodicReportTrigger, if a resource setting linked to a ReportConfig has multiple aperiodic resource sets and only a subset of the aperiodic resource sets is associated with the trigger state, a higher layer configured bitmap ResourceSetBitmap may be configured per trigger state per resource setting to select the CSI-IM/NZP CSI-RS resource set(s) from the resource setting.

If aperiodic CSI-RS is used with aperiodic reporting, the CSI-RS offset may be configured per resource set in the higher layer parameter AperiodicNZP-CSI-RS-TriggeringOffset. The CSI-RS triggering offset X may be measured in slots.

For semi-persistent reporting on PUSCH, a set of semi-persistent CSI report settings may be higher layer configured by Semi-persistent-on-PUSCHReportTrigger, and the CSI request field in DCI, scrambled with SP-CSI C-RNTI, may activate one of the semi-persistent CSI reports.

For semi-persistent reporting on PUCCH, a set of semi-persistent CSI report settings may be higher layer configured by reportConfigType with the PUCCH resource used for transmitting the CSI report. Semi-persistent reporting on PUCCH may be activated by an activation command, which may select one of the semi-persistent CSI Report settings for use by the wireless device on the PUCCH. If the field reportConfigType is not present, the wireless device may report the CSI on PUSCH.

For a wireless device configured with the higher layer parameter ResourceConfigType set to 'semi-persistent', if the wireless device receives an activation command for CSI-RS resource(s) for channel measurement and CSI-IM/NZP CSI-RS resource(s) for interference measurement associated with configured CSI resource setting(s) in slot n, the corresponding actions and the wireless device assumptions (including quasi-co-location assumptions provided by a reference to a TCI-RS-SetConfig) on CSI-RS/CSI-IM transmission corresponding to the configured CSI-RS/CSI-IM resource configuration(s) may be applied no later than a minimum threshold. If the wireless device receives a deactivation command for activated CSI-RS/CSI-IM resource(s) associated with configured CSI resource setting(s) in slot n, the corresponding actions and wireless device assumption on cessation of CSI-RS/CSI-IM transmission corresponding to the deactivated CSI-RS/CSI-IM resource(s) may apply no later than the minimum threshold. The wireless device may assume that the CSI-RS resource(s) for channel measurement and the CSI-IM/NZP CSI-RS resource(s) for interference measurement are spatially quasi co-located.

The CSI reference resource for a serving cell may be defined as follows. In the frequency domain, the CSI reference resource may be defined by the group of downlink physical resource blocks corresponding to the band to which the derived CQI value relates. In the time domain, for a wireless device configured with a single CSI resource set for the serving cell, the CSI reference resource may be defined by a single downlink slot n-nCQI_ref. For periodic and semi-persistent CSI reporting, nCQI_ref is the smallest value greater than or equal to a first value, such that it corresponds to a valid downlink slot. For aperiodic CSI reporting, if the wireless device is indicated by the DCI to report CSI in the same slot as the CSI request, nCQI_ref is such that the reference resource may be in the same valid downlink slot as the corresponding CSI request, otherwise nCQI_ref may be the smallest value greater than or equal to a second value, such that slot n-nCQI_ref corresponds to a valid downlink slot.

A slot in a serving cell maybe considered to be a valid downlink slot if it is configured as a downlink slot for that wireless device, and it does not fall within a configured measurement gap for that wireless device, and the active DL BWP in the slot is the same as the DL BWP for which the CSI reporting is performed. If there is no valid downlink slot for the CSI reference resource in a serving cell, CSI reporting may be omitted for the serving cell in uplink slot n. For deriving CSI feedback, it is not expected that a non-zero power CSI-RS resource for channel measurement overlaps with CSI-IM resource for interference measurement or non-zero power CSI-RS resource for interference measurement.

The wireless device may assume the following for the purpose of deriving the CQI index, and if also configured, PMI and RI: The first 2 OFDM symbols are occupied by control signaling; the number of PDSCH symbols is equal to 12; the bandwidth part subcarrier spacing is configured for the PDSCH reception; the reference resource uses the CP length and subcarrier spacing configured for PDSCH reception; no resource elements are used by primary or secondary synchronization signals or PBCH; no REs are allocated for CSI-RS and zero-power CSI-RS; the number of front loaded DM-RS symbols is the same as the maximum front-loaded symbols configured by the higher layer parameter DL-DMRS-max-len; the number of additional DM-RS symbols is the same as the additional symbols configured by the higher layer parameter DL-DMRS-add-pos; the PDSCH symbols are not containing DM-RS; and/or the PDSCH transmission scheme where the UE may assume that the gNB transmission on the PDSCH would be performed with up to 8 transmission layers on antenna ports [1000-1011].

A wireless device may perform aperiodic CSI reporting using PUSCH in slot n+Y on serving cell c based on successful decoding in slot n of an uplink DCI format for serving cell c, where Y is indicated in the decoded uplink DCI. The higher layer parameter AperiodicReportSlotOffset contains the allowed values of Y for a given Reporting Setting. If $N_{Rep} \geq 1$ reports are scheduled, let $Y_{i,j}$ be the ith allowed value for Report Setting j (j=0,K, $N_{Rep}-1$), and the ith codepoint of the DCI field corresponds to the allowed value $$Y_i = \max_j Y_{i,j}.$$

An aperiodic CSI report carried on the PUSCH supports wideband, partial band, and sub-band frequency granularities. An aperiodic CSI report carried on the PUSCH may support Type I and Type II CSI.

A wireless device may perform semi-persistent CSI reporting on the PUSCH based on successfully decoding an uplink DCI format. The uplink DCI format may contain one or more CSI Reporting Setting Indications where the associated CSI Measurement Links and CSI Resource Settings are higher layer configured. Semi-persistent CSI reporting on the PUSCH supports Type I and Type II CSI with wideband, partial band, and sub-band frequency granularities. The PUSCH resources and MCS may be allocated semi-persistently by an uplink DCI. CSI reporting on PUSCH may be multiplexed with uplink data on PUSCH. CSI reporting on PUSCH may also be performed without any multiplexing with uplink data from the wireless device.

Type I CSI feedback may be supported for CSI Reporting on PUSCH. Type I subband CSI may be supported for CSI Reporting on the PUSCH. Type II CSI may be supported for CSI Reporting on the PUSCH.

For Type I CSI feedback on PUSCH, a CSI report may comprise up to two parts.

Part 1 contains RI/CRI, CQI for the first codeword. Part 2 may contain PMI and main contain the CQI for the second codeword when RI>4.

For Type II CSI feedback on PUSCH, a CSI report may comprise up to two parts.

Part 1 may be used to identify the number of information bits in Part 2. Part 1 may be transmitted in its entirety before Part 2 and may be used to identify the number of information bits in Part 2. Part 1 may comprise a fixed payload size and may contain RI, CQI, and an indication of the number of non-zero wideband amplitude coefficients per layer for the Type II. The fields of Part 1—RI, CQI, and the indication of the number of non-zero wideband amplitude coefficients for each layer—may be separately encoded. Part 2 may contain the PMI of the Type II CSI. Part 1 and 2 may be separately encoded. A Type II CSI report that is carried on the PUSCH may be computed independently from any Type II CSI report that is carried on the Long PUCCH.

If the higher layer parameter ReportQuantity is configured with one of the values 'CRI/RSRP' or 'SSBRI/RSRP', the CSI feedback may comprise a single part. If CSI reporting on PUSCH comprises two parts, the wireless device may omit a portion of the Part 2 CSI. Omission of Part 2 CSI may be according to the priority order, where $N_{Rep}$ is the number of CSI reports in one slot. Priority 0 is the highest priority and priority $2N_{Rep}$ is the lowest priority and the CSI report numbers correspond to the order of the associated Report-ConfigID. For omitting Part 2 CSI information for a particular priority level, the wireless device may omit all of the information at that priority level.

If CSI is multiplexed with UL-SCH on PUSCH, Part 2 CSI is omitted only when the UCI code rate for transmitting all of Part 2 would be greater than a threshold code rate $c_T$, where $$c_T = \frac{c_{MCS}}{\beta_{offset}^{CSI-2}}$$

$c_{MCS}$ is the target PUSCH code rate from Table 6.1.4.1-1.
$\beta_{offset}^{CSI-2}$ is the CSI offset value.
Part 2 CSI is omitted level by level beginning with the lowest priority level until the lowest priority level is reached which causes the UCI code rate to be less than or equal to $c_T$.

A wireless device may be semi-statically configured by higher layers to perform periodic CSI Reporting on the PUCCH. A wireless device may be configured by higher layers for multiple periodic CSI Reports corresponding to one or more higher layer configured CSI Reporting Setting Indications, where the associated CSI Measurement Links and CSI Resource Settings are higher layer configured. Periodic CSI reporting on the short and the long PUCCH supports wideband and partial band frequency granularities. Periodic CSI reporting on the PUCCH may support Type I CSI.

A wireless device may perform semi-persistent CSI reporting on the PUCCH based on successfully decoding a selection command. The selection command may contain one or more CSI Reporting Setting Indications where the associated CSI Measurement Links and CSI Resource Settings are configured. Semi-persistent CSI reporting on the PUCCH may support Type I CSI. Semi-persistent CSI reporting on the Short PUCCH may support Type I CSI with wideband and partial band frequency granularities. Semi-persistent CSI reporting on the Long PUCCH may support Type I Subband CSI and Type I CSI with wideband and partial band frequency granularities.

Periodic CSI reporting on the short and long PUCCH may support wideband and partial band frequency granularities. Periodic CSI reporting on the PUCCH may support Type I CSI. If the short and long PUCCH carry Type I CSI with wideband and partial band frequency granularity, the CSI payload carried by the short PUCCH and long PUCCH may be identical irrespective of RI/CRI. For type I CSI sub-band reporting on long PUCCH, the payload may be split into two parts. The first part may contain RI/CRI, CQI for the first codeword, and the second part may contain PMI and the CQI for the second codeword when RI>4.

A periodic and/or semi-persistent report carried on the Long PUCCH may support Type II CSI feedback, but only Part 1 of Type II CSI feedback. Supporting Type II CSI reporting on the Long PUCCH may be a wireless device capability. A Type II CSI report (Part 1 only) carried on the Long PUCCH may be calculated independently of any Type II CSI reports carried on the PUSCH.

Two CSI reports may be said to collide if the time occupancy of the physical channels scheduled to carry the CSI reports overlap in at least one OFDM symbol and are transmitted on the same carrier. If a wireless device is configured to transmit two colliding CSI reports, the following rules may apply (for CSI reports transmitted on PUSCH, and/or for CSI reports transmitted on PUCCH). If an aperiodic CSI report containing Type I CSI collides with either a periodic CSI report containing Type I CSI or a semi-persistent CSI report containing Type I CSI, then the aperiodic Type I CSI report has priority and the periodic or semi-persistent Type I CSI report may not be sent by the wireless device. If a semi-persistent CSI report containing Type II CSI collides with an aperiodic CSI report also containing Type II CSI, then the aperiodic Type II CSI report has priority and the semi-persistent Type II CSI report may not be sent by the wireless device. If a semi-persistent CSI report collides with a periodic CSI report for Type I colliding with Type I and Type II colliding with Type II, the periodic CSI may not be sent by the wireless device. If a Type I CSI report to be carried on the PUSCH collides with a Type I CSI report to be carried on the PUCCH, then the Type I CSI report to be carried on the PUSCH has priority, and the Type I CSI report to be carried on the PUCCH may not be sent by the wireless device. If a Type II CSI report to be carried on the PUSCH collides with a Type II CSI report to be carried on the PUCCH, then the Type II CSI report to be carried on the PUSCH has priority, and the Type II CSI report to be carried on the PUCCH may not be sent by the wireless device. If an aperiodic Type I CSI report intended for the PUSCH collides with a semi-persistent Type I CSI report also intended for the PUSCH, then the aperiodic Type I CSI report has priority and the semi-persistent Type I CSI report may not be sent by the wireless device. If an aperiodic Type II CSI report intended for the PUSCH collides with a semi-persistent Type II CSI report also intended for the PUSCH, then the aperiodic Type II CSI report has priority and the semi-persistent Type II CSI report may not be sent by the wireless device. If an aperiodic Type I CSI report intended for the PUCCH collides with a Type I CSI report intended for the PUSCH, then the aperiodic Type I CSI report intended for the PUCCH has lower priority and may not be sent by the wireless device. If an aperiodic Type II CSI report intended for the PUCCH collides with a Type II CSI report intended for the PUSCH, then the aperiodic Type II CSI report intended for the PUCCH has lower priority and may not be sent by the wireless device.

The wireless device may be configured with a plurality of logical channels. An IE LogicalChannelConfig parameter may be used to configure the logical channel parameters. An allowedTiming parameter if present (e.g., configured), may indicate UL MAC PDUs from this logical channel can only be transmittedin the indicated timing. An allowedSubcarrierSpacing parameter, if present, may indicate UL MAC PDUs from this logical channel can only be mapped to the indicated numerology. A bucketSizeDuration parameter may indicate a bucket size in logical channel prioritization procedure. A logicalChannelGroup parameter may indicate an identifier of a logical channel group which the logical channel belongs to. A logicalChannelSR-Mask paremeter may indicate whether SR masking is configured for this logical channel. A logicalChannelSR-DelayTimerApplied parameter may indicate whether to apply the delay timer for SR transmission for this logical channel. This parameter may be set to FALSE if logicalChannelSR-DelayTimer is not included in BSR-Config. A priority may indicate the logical channel priority. A prioritsedBitRate parameter may indicate a PBR parameter in the logical channel proiritization procedure. A SchedulingRequestId parameter may indicate scheduling request identifier of the associated scheduling request configuration.

A wireless device may receive DCI for scheduling its uplink transmission. The DCI may have a format in a plurality of formats. A DCI format 0_0 may be used for the scheduling of PUSCH in one cell. The following information may be transmitted by means of the DCI format 0_0: Identifier for DCI formats; Frequency domain resource assignment; time domain resource assignment; Frequency hopping flag; Modulation and coding scheme; New data indicator; Redundancy version; HARQ process number; TPC command for scheduled PUSCH; UL/SUL indicator. If the number of information bits in format 0_0 is less than the payload size of format 1_0 for scheduling the same serving cell, zeros may be appended to format 0_0 until the payload size equals that of format 1_0.

A DCI format 0_1 may be used for the scheduling of PUSCH in one cell. The following information may be transmitted by means of the DCI format 0_1: Carrier indicator; Identifier for DCI formats; Bandwidth part indicator (the bitwidth for this field may be determined according to the higher layer parameter BandwidthPart-Config for the PUSCH); Frequency domain resource assignment; VRB-to-PRB mapping; Frequency hopping flag; Modulation and coding scheme; New data indicator; Redundancy version; HARQ process number; TPC command for scheduled PUSCH; SRS resource indicator; Precoding information and number of layers; Antenna ports; SRS request; CSI request; CBG transmission information; PTRS-DMRS association. For a wireless device configured with SUL in a cell, if PUSCH is configured to be transmitted on both the SUL and the non-SUL of the cell and if the number of information bits in format 0_1 for the SUL is not equal to the number of information bits in format 0_1 for the non-SUL, zeros may be appended to smaller format 0_1 until the payload size equals that of the larger format 0_1.

A wireless device may receive configuration parameters for one or more cells. The wireless device may receive the configuration parameters via RRC signaling. The one or more cells may comprise a primary cell. The one or more cells may comprise one or more secondary cells. The one or more cells may be configured by a first base station for communication with the first base station. The one or more cells may be configured by the first base station for communication with a second base station. The one or more cells may belong to a MCG. The one or more cells may belong to a SCG. The one or more cells may comprise a first cell. The configuration parameters may comprise grant-free scheduling configuration parameters. The grant-free configuration parameters may be for grant-free type 1 and/or grant-free type 2. For the grant-free type 1, a plurality of grant-free resources may be activated based on RRC configuration. For grant-free type 2, the plurality of grant-free resources may be activated based on RRC configuration and DCI activation. The configuration parameters may comprise semi-persistent channel state information (SP-CSI) configuration parameters. The SP-CSI configuration parameters may comprise configuration parameters for reporting SP-CSI on PUSCH. The configuration parameters may comprise one or more CSI configuration parameters comprising aperiodic and/or periodic CSI configurations.

The wireless device may receive a first downlink control information (DCI) indicating activation of grant-free resources on the first cell. The wireless device may determine that the first DCI is for activation of the grant-free resources after validating the first DCI as a grant-free activation DCI. The validation may comprise the first DCI being scrambled with a first RNTI. The first RNTI may be a configured scheduled (CS)-RNTI. The validation may comprise comparing values of one or more fields of the first DCI with one or more pre-defined values. The one or more fields may comprise a transmit power control field and/or a cyclic shift field and/or modulation and coding scheme field and/or new data indicator field and/or one or more other fields. The first DCI may comprise a field indicating the grant-free resources (e.g. resource blocks). The wireless device may determine the grant free resources based on the first DCI and the grant-free configuration parameters such as periodicity of grant-free resources and/or one or more parameters indicating time domain positions of the grant-free resources (e.g., time domain allocation, offset, etc.) and/or frequency domain positions of the grant-free resources. The wireless device may activate a plurality of grant-free resources on the first cell after receiving the grant free configuration parameters (e.g., type-2 grant free). The wireless device may determine and/or activate a plurality of gran-free resources on the first cell after receiving the grant free configuration parameters (e.g., type-2 grant free) without receiving an activation DCI. The grant configuration parameters may indicate and/or comprise (e.g., comprising a field indicating) a periodicity and/or power control parameters and/or resources (e.g., for type 2 grant-free) and/or MCS and/or DMRS parameters for the transmission of a plurality of grant-free packets on the plurality of grant-free resources. The grant-free resources may comprise first resources (e.g., resource blocks for transport blocks of data) on a first transmission time interval (TTI). The first resources may be for transmission of a first grant-free packet.

The wireless device may receive a first DCI comprising an uplink grant for transmission of a first packet via first resources on a first TTI. The first DCI may comprise transmission parameters for transmission of the first packet via PUSCH. The transmission parameters may comprise radio resources (e.g., resource blocks), power control parameters, HARQ parameters, bandwidth part parameters, TTI/numerology parameters, etc. The wireless device MAC entity may create the first packet based on the information in the uplink grant. The wireless device physical layer may employ the transmission parameters in the uplink grant for transmission of the first packet. The first resources may comprise resources for uplink transmission of data or a transport block, and may be, for example, granted based on a dynamic grant or a configured grant.

The wireless device may receive a second DCI indicating activation of SP-CSI resources on the first cell. The second DCI may be scrambled by second RNTI. The second DCI may be a SP-CSI RNTI. The second DCI may comprise a field, the value of the field indicating a reporting index for one of a plurality of SP-CSI reporting configurations. The SP-CSI reporting configurations may comprise the plurality of reporting configurations and/or their corresponding indexes. The SP-CSI resources may comprise second resources on the first TTI for transmission of a second SP-CSI signal.

The wireless device may determine and/or activate the SP-CSI resources based on the second DCI and/or the SP-CSI configuration parameters. The SP-CSI configuration parameters may indicate a periodicity of SP-CSI resources and/or the time occasion/TTIs and the second DCI may indicate the resource blocks/resource elements/frequency resources of the SP-CSI resources. The SP-CSI resources may be indicated by the SP-CSI configuration parameters. The SP-CSI resources may be indicated by the second DCI. The wireless device may determine the SP-CSI resources based on the SP-CSI configuration parameters and the second DCI. The field in the second DCI may indicate an index for the SP-CSI configuration and the index/SP-CSI configuration may indicate the SP-CSI resources. A SP-CSI configuration may comprise one or more parameters indicating the SP-CSI resource (e.g., in combination with the second activation DCI).

If there is a conflict, and multiple resources are scheduled for transmission during the same TTI, the wireless device may select, as selected resources for transmission, one of the first resources (e.g., corresponding to data or a transport block, e.g., based on a dynamic grant or a configured grant) or the second resources (e.g., corresponding to the SP-CSI signal) based on one or more selection criteria, and the non-selected resource may be skipped (e.g., not transmitted at the scheduled conflicting time) or scheduled for later transmission. Various criteria may be used for this selection. The wireless device may transmit one of the first grant-free packet/first packet or the second SP-CSI signal based on the selected resources. The wireless device may transmit the first grant-free packet/first packet based on selecting the first resources. The wireless device may transmit the SP-CSI signal based on selecting the second resources.

The wireless device may drop/ignore the unselected signal or packet (e.g., grant-free packet or dynamically scheduled packet) associated with unselected resources. The wireless device may drop/ignore the first resources and the packet/grant-free packet after selecting the second resources corresponding to the SP-CSI signal. The wireless device may drop/ignore the second resources after selecting the first resources corresponding to the packet/grant-free packet. After dropping/ignoring the unselected packet, the wireless device may keep the packet in an associated HARQ buffer. The base station may transmit a grant for retransmission of the packet.

The one or more selection criteria for selecting one of the first resources or the second resources may be based on a first size (e.g., first number of resource blocks/elements) of the first resources and/or a second size (e.g., second number of resource blocks/elements) of the second resources. The second resources may be selected based on the size of the first resources being smaller than a first threshold (e.g., a first number of bytes). The configuration parameters may indicate the first threshold. The wireless device may indicate the first threshold to the base station in a capability message. The second resources may be selected based on the size of the first resources being smaller than the size of the second resources and/or the second resources/SP-CSI signal not being possible to be multiplexed with and/or piggybacked on the first packet/grant-free packet. The second resources may be selected based on a difference between a size of the first resources and a size of the second resources being smaller than a threshold (or vice versa). The second resources may be selected based on the size of the first resources being smaller than the size of the second resources plus an offset (or vice versa). The configuration parameters may indicate the threshold and/or the offset. The wireless device may indicate the threshold to the base station in a capability message. The first resources may be selected based on the size of the first resources being larger than a second threshold. The configuration parameters may indicate the second threshold. The wireless device may multiplex/piggyback the SP-CSI signal in the first grant-free packet/packet based on the size of the first resources being larger than the second threshold. The wireless device may determine to select the first resource based on a size of the second resource being smaller than a second threshold (e.g., a second number of bytes).

The first packet/grant-free packet may be associated with a priority and/or service type and/or one or more logical channels and/or TTI/numerology/BWP. The one or more criteria for selecting the first resources or the second resources may be based on the priority and/or the service type and/or the one or more logical channels and/or TTI/numerology/BWP.

The one or more selection criteria for selecting the first resources may comprise selecting the first resources based on the priority associated with the first packet/grant-free packet being larger than a first priority. The configuration parameters may comprise/indicate the first priority. The priority associated with the first packet/grant-free packet may be based on a a first TTI (e.g. duration)/numerology/BWP. For example, the first TTI/numerology/BWP may determine data transmitted via the first packet/grant-free packet. The priority associated with the first packet/grant-free packet may be based on priority of one or more logical channels and/or service mapped to the first TTI/numerology/BWP (e.g., duration of the first TTI). One or more logical channels may be multiplexed, via a logical channel prioritization procedure, to create a packet/grant-free packet. A logical channel in the one or more logical channels may be associated with a priority. The priority associated with the first packet/grant-free packet may be based on a priority of a logical channel with highest priority multiplexed in the packet/grant free packet that is mapped to the first TTI/numerology/BWP (e.g., duration of the first TTI). The priority associated with the first packet/grant-free packet may be based on a priority of a logical channel with lowest priority multiplexed in the packet/grant free packet that is mapped to the first TTI/numerology/BWP (e.g., duration of the first TTI). The priority associated with the first packet/grant-free packet may be based on one or more priorities of one or more logical channels multiplexed in the packet/grant free packet that is mapped to the first TTI/numerology/BWP (e.g., duration of the first TTI). The first DCI may indicate the first TTI/numerology/BWP. The configuration parameters and/or grant-free configuration parameters may comprise/indicate the first TTI/numerology/BWP.

The one or more criteria for selecting one of the first resources or the second resources may be based on configuration index and/or report setting and/or CSI type (e.g., type, type 2, . . . ) of the SP-CSI signal associated with the second resources. The second resources may be selected based on a configuration index and/or report setting and/or CSI type of the SP-CSI signal being one of a first plurality of configuration indexes and/or report settings and/or CSI types. Based on the SP-CSI signal reporting type 2 CSI, the wireless device may select second resources. The first plurality of configuration indexes and/or report settings and/or CSI types may be RRC configured. The configuration parameters may comprise/indicate the first plurality of configuration indexes and/or report settings and/or CSI types.

The first packet/grant-free packet (e.g., transport block of data) may be associated with a priority and/or service type and/or one or more logical channels and/or TTI/numerology/BWP. The one or more criteria for selecting one of the first resources and the second resource may be based on the priority of the first packet/grant-free packet and a configuration index/report setting/CSI type of the first SP-CSI signal. The RRC configuration may indicate the selection criteria for different configuration indexes/report settings/CSI types and different priorities and/or service types and/or one or more logical channels and/or TTIs/numerologies/BWPs corresponding to the first packet/grant-free packet.

The grant-free configuration parameters may comprise/indicate a first uplink interval/periodicity. The SP-CSI configuration parameters may indicate a second uplink interval/periodicity. The one or more criteria for selecting one of the first packet/grant-free packet and the SP-CSI signal may be based on a comparison of the first uplink interval/periodicity and the second uplink interval/periodicity. Based on the first uplink interval/periodicity being larger than the second uplink interval/periodicity, the wireless device may select the first resources (e.g., selecting, for transmission, the resource with the larger periodicity). Based on the second uplink interval/periodicity being larger than the first uplink interval/periodicity, the wireless device may select the second resources.

The wireless device may transmit one or more messages to a base station indicating whether the wireless device is capable of transmitting two or more PUSCH signals in parallel in a same TTI. The wireless device may perform the selection process and select one of the first resources or the second resources based on the wireless device not being capable of transmitting two or more PUSCH signals in parallel.

The wireless device may transmit one or more messages to the base station indicating that the wireless device is not capable of transmitting a CSI signal and a PUSCH packet (e.g., comprising UL-SCH data)/grant-free PUSCH in parallel in a same TTI. The wireless device may perform the selection process and select one of the first resources or the second resources based on the wireless device not being capable of transmitting a CSI signal and a PUSCH packet (e.g., comprising UL-SCH data)/grant-free PUSCH in parallel in a same TTI.

The configuration parameters may indicate that the wireless device is not allowed to transmit two or more PUSCH signals in parallel in a same TTI. The wireless device may perform the selection process and select one of the first resources or the second resources based on the configuration parameters indicating that the wireless device is not allowed to transmit two or more PUSCH signals in parallel.

The configuration parameters may indicate that the wireless device is not allowed to transmit a CSI signal and a PUSCH packet (e.g., comprising UL-SCH data)/grant-free PUSCH in parallel in a same TTI. The wireless device may select one of the first resources or the second resources based on the configuration parameters indicating that the wireless device is not allowed to transmit a CSI signal and a PUSCH packet (e.g., comprising UL-SCH data)/grant-free PUSCH in parallel in a same TTI.

Figure 31:
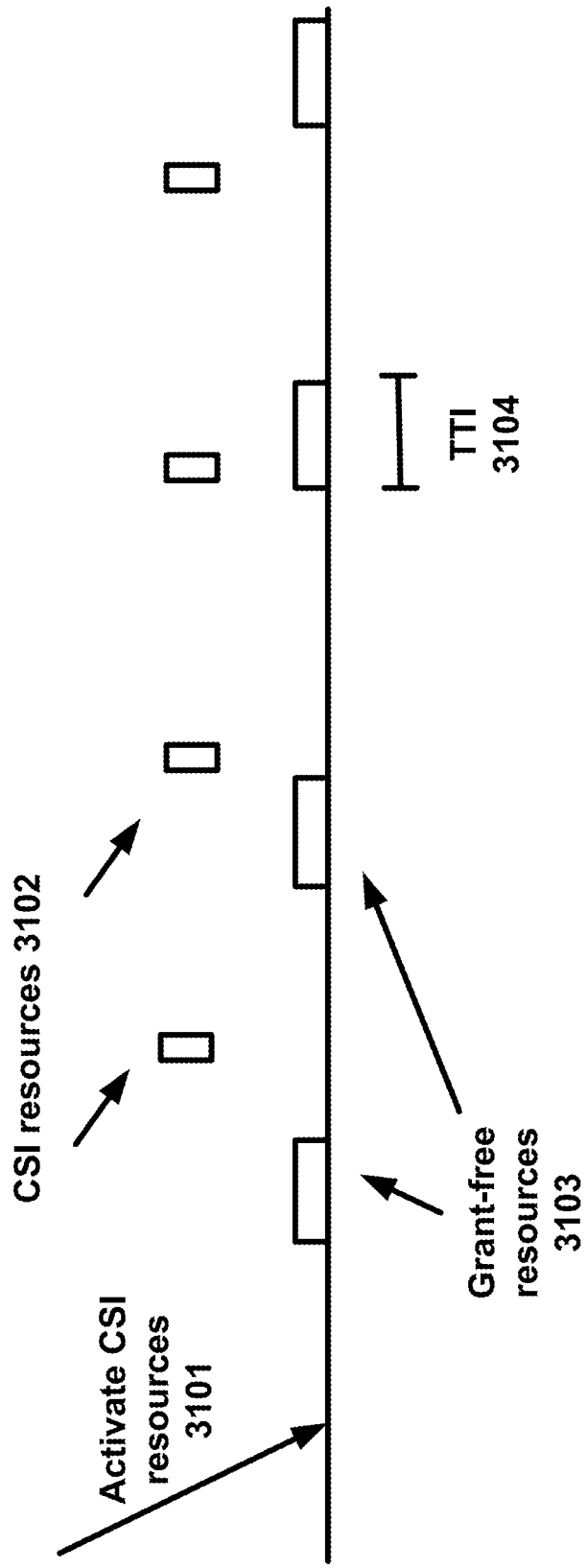
FIG. 31 shows an example of CSI and PUSCH resource assignment.

FIG. 31 shows an example in which a CSI resource and a grant-free resource coincide in a same TTI. The wireless device may receive a CSI (SP-CSI) activation message 3101 indicating activation a plurality of CSI resources for transmission via PUSCH. The activation message may be transmitted via DCI/PDCCH. The DCI may not comprise an uplink grant. The DCI (e.g., in combination with SP-CSI configurations) may indicate the plurality of SP-CSI resources. The wireless device may activate a plurality of grant-free resources 3103. The plurality of grant-free resources 3103 may be activated after receiving the grant-free configuration parameters. The grant-free resources may be indicated by the grant-free configuration parameters. The grant-free configuration parameters may indicate a periodicity and/or the time domain (e.g., time domain allocation, time domain offset, etc.) and frequency domain allocation parameters. The plurality of grant-free resources may be activated after receiving the grant-free configuration parameters and DCI activating the grant-free configuration parameters. The DCI may indicate the plurality of grant-free resources. The wireless device may determine the plurality of the grant-free resources based on the grant-free configuration parameters and the DCI. First grant-free resources for transmission of a grant-free packet may coincide with second SP-CSI resources for transmission of a SP-CSI signal in a TTI 3104.

Figure 32:
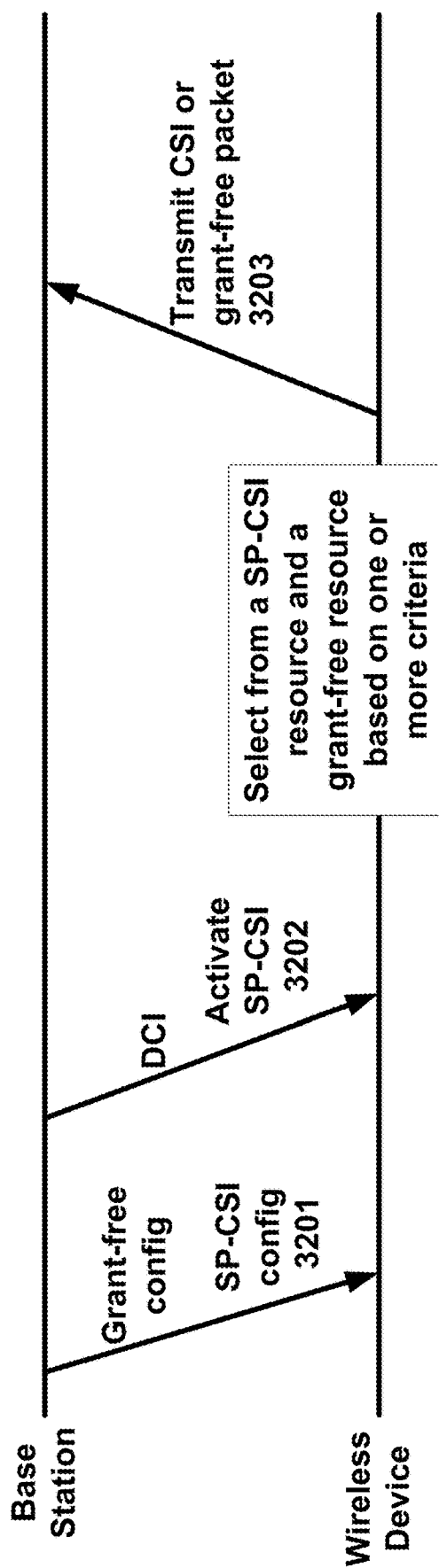
FIG. 32 shows an example procedure of handling an overlap in SP-CSI and grant-free resource.

FIG. 32 shows signaling between a base station and wireless device resulting in a conflict between SP-CSI resources and grant-free resources allocated to the wireless device, and resolution of the conflict. In a first one or more signals 3201, the wireless device may receive configuration parameters for grant-free resources, and configuration parameters for SP-CSI resources. The wireless device may activate a plurality of grant-free resources after receiving the configuration parameters for the grant-free resources (e.g., type 1 grant-free), or after receiving (not shown) DCI activating the plurality of grant-free resources (e.g., type 2 grant-free). In a second one or more signals 3202, the wireless device may receive DCI activating a plurality of SP-CSI resources 3202. First resources for a first grant-free packet (or for a transport block) and second resources for a second SP-CSI report may coincide in a TTI. The wireless device may select one of the first resources and the second resources. The selection process may be based on wireless device capability (e.g., ability to transmit two or more PUSCHs in parallel or a SP-CSI report in parallel with PUSCH). The selection process may be based on the configuration parameters, for example, indicating that the wireless device is not allowed to transmit two or more PUSCHs in parallel or a SP-CSI report in parallel with PUSCH. Although FIG. 32 illustrates the selection occurring at the wireless device, the selection may be performed elsewhere as desired (e.g., at the base station—gNB or another computing device in the system).

A wireless device (or base station or other device) may use a method comprising receiving configuration parameters for one or more cells comprising a first cell, the configuration parameters comprising grant-free configuration parameters and semi-persistent channel state information (SP-CSI) configuration parameters. The method may comprise receiving a first downlink control information (DCI) indicating activation of grant-free resources on the first cell, the grant-free resources comprising first resources on a first transmission time interval (TTI) for transmission of a first grant-free packet. The method may comprise receiving a second DCI indicating activation of SP-CSI resources on the first cell, the SP-CSI resources comprising second resources on the first TTI for transmission of a second SP-CSI report. The method may comprise selecting, as selected resources, one of the first resources or the second resources based on one or more criteria. The method may comprise transmitting 3203, by the wireless device, one of the first grant-free packet or the second SP-CSI report based on the selected resources, and not transmitting the other one of the first grant-free packet or the second SP-CSI report.

A wireless device (or base station or other device) may use a method comprising receiving configuration parameters for one or more cells comprising a first cell, the configuration parameters comprising grant-free configuration parameters and semi-persistent channel state information (SP-CSI) configuration parameters. The method may comprise activating a plurality of grant-free resources on the first cell after receiving the grant-free configuration parameters, the plurality of grant-free resources comprising first resources on a first transmission time interval (TTI) for transmission of a first grant-free packet. The method may comprise receiving a second DCI indicating activation of SP-CSI resources on the first cell, the SP-CSI resources comprising second resources on the first TTI for transmission of a second SP-CSI report. The method may comprise selecting, as selected resources, one of the first resources or the second resources based on one or more criteria. The method may comprise transmitting, by the wireless device, one of the first grant-free packet or the second SP-CSI report based on the selected resources, and not transmitting the other one of the first grant-free packet or the second SP-CSI report.

A wireless device (or base station or other device) may use a method comprising receiving configuration parameters for one or more cells comprising a first cell, the configuration parameters comprising semi-persistent channel state information (SP-CSI) configuration parameters. The method may comprise receiving a first DCI comprising an uplink grant for transmission of a first packet via first resources on a first transmission time interval (TTI) of the first cell. The method may comprise receiving a second DCI indicating activation of SP-CSI resources on the first cell, the SP-CSI resources comprising second resources on the first TTI for transmission of a second SP-CSI report. The method may comprise selecting, as selected resources, one of the first resources or the second resources based on one or more criteria. The method may comprise transmitting, by the wireless device, one of the first packet or the second SP-CSI report based on the selected resources, and not transmitting the other one of the first packet or the second SP-CSI report.

A wireless device (or base station or other device) may use a method comprising transmitting one or more capability messages comprising one or more information elements (IEs) indicating whether the wireless is capable of transmitting two or more PUSCHs in parallel in a same TTI, and/or transmitting a SP-CSI report and a PUSCH packet (e.g., comprising UL-SCH data or grant-free PUSCH) in parallel in a same TTI. The method may comprise receiving configuration parameters for one or more cells comprising a first cell, the configuration parameters comprising grant-free configuration parameters and semi-persistent channel state information (SP-CSI) configuration parameters. The method may comprise receiving a first downlink control information (DCI) indicating activation of grant-free resources on the first cell, the grant-free resources comprising first resources on a first transmission time interval (TTI) for transmission of a first grant-free packet. The method may comprise receiving a second DCI indicating activation of SP-CSI resources on the first cell, the SP-CSI resources comprising second resources on the first TTI for transmission of a second SP-CSI report. The method may comprise: based on the one or more IEs indicating that the wireless device is not capable of transmitting two or more PUSCHs in parallel in a same TTI, and/or transmitting a SP-CSI report and a PUSCH packet (e.g., comprising UL-SCH data or grant-free PUSCH) in parallel in a same TTI, selecting, as selected resources, one of the first resources or the second resources based on one or more criteria. The method may comprise transmitting, by the wireless device, one of the first grant-free packet or the second SP-CSI report based on the selected resources, and not transmitting the other one of the first grant-free packet or the second SP-CSI report.

A wireless device (or base station or other device) may use a method comprising transmitting one or more capability messages comprising one or more information elements (IEs) indicating whether the wireless is capable of transmitting two or more PUSCHs in parallel in a same TTI and/or transmitting a SP-CSI report and a PUSCH packet (e.g., comprising UL-SCH data or grant-free PUSCH) in parallel in a same TTI. The method may comprise receiving configuration parameter for one or more cells comprising a first cell, the configuration parameters comprising grant-free configuration parameters and semi-persistent channel state information (SP-CSI) configuration parameters. The method may comprise activating a plurality of grant-free resources on the first cell based on receiving the grant-free configuration parameters, the plurality of grant-free resources comprising first resources on a first transmission time interval (TTI) for transmission of a first grant-free packet. The method may comprise receiving a second DCI indicating activation of SP-CSI resources on the first cell, the SP-CSI resources comprising second resources on the first TTI for transmission of a second SP-CSI report. The method may comprise, based on the one or more IEs indicating that the wireless device is not capable of transmitting two or more PUSCHs in parallel in a same TTI and/or transmitting an SP-CSI report and a PUSCH packet (e.g., comprising UL-SCH data or grant-free PUSCH) in parallel in a same TTI, selecting, as selected resources, one of the first resources or the second resources based on one or more criteria. The method may comprise transmitting, by the wireless device, one of the first grant-free packet or the second SP-CSI report based on the selected resources, and not transmitting the other one of the first grant-free packet or the second SP-CSI report.

A wireless device (or base station or other device) may use a method comprising transmitting one or more capability messages comprising one or more information elements (IEs) indicating whether the wireless is capable of transmitting two or more PUSCHs in parallel in a same TTI and/or transmitting a SP-CSI report and a PUSCH packet (e.g., comprising UL-SCH data or grant-free PUSCH) in parallel in a same TTI. The method may comprise receiving configuration parameter for one or more cells comprising a first cell, the configuration semi-persistent channel state information (SP-CSI) configuration parameters. The method may comprise receiving a first DCI comprising an uplink grant for transmission of a first packet via first resources on a first transmission time interval (TTI) of the first cell. The method may comprise receiving a second DCI indicating activation of SP-CSI resources on the first cell, the SP-CSI resources comprising second resources on the first TTI for transmission of a second SP-CSI report. The method may comprise: based on the one or more IEs indicating that the wireless device is not capable of transmitting two or more PUSCHs in parallel in a same TTI and/or transmitting a SP-CSI report and a PUSCH packet (e.g., comprising UL-SCH data or grant-free PUSCH) in parallel in a same TTI, selecting, as selected resources, one of the first resources or the second resources based on one or more criteria. The method may comprise transmitting, by the wireless device, one of the first packet or the second SP-CSI report based on the selected resources.

Figure 33:
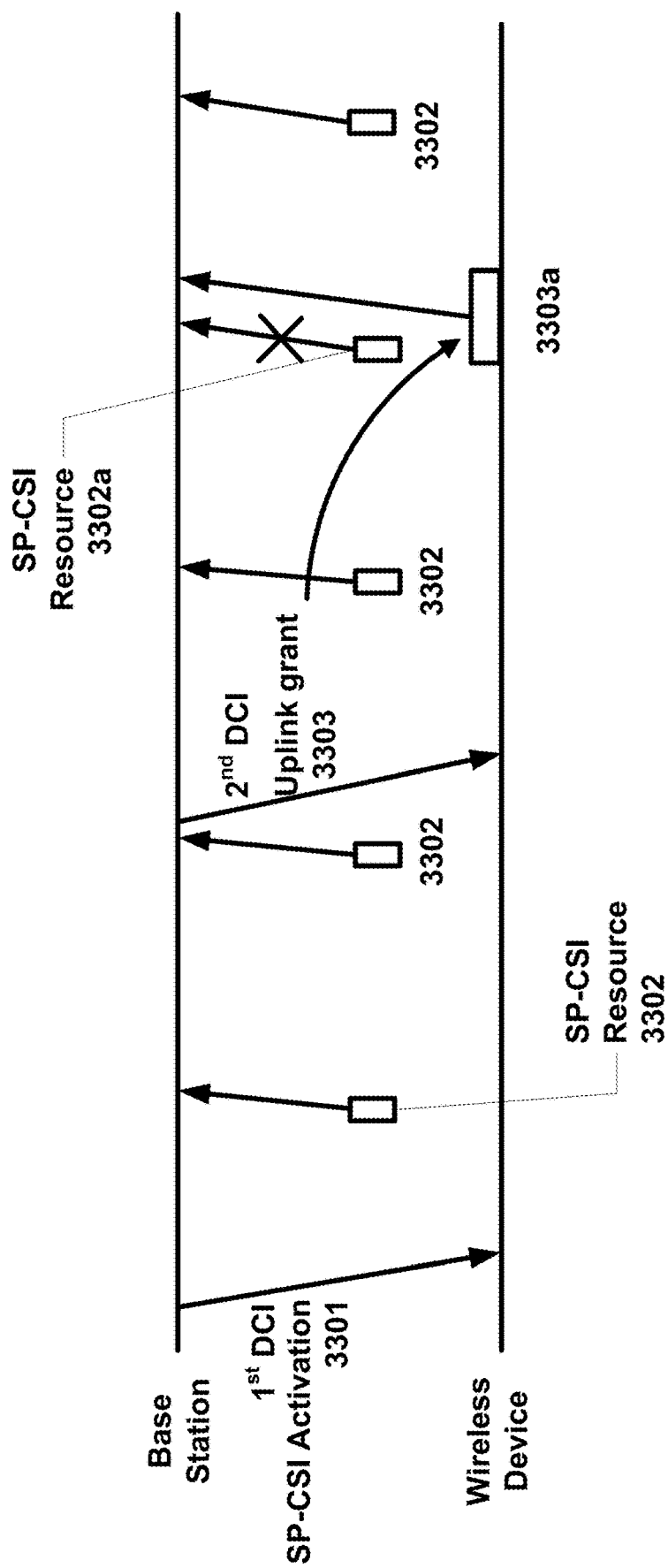
FIG. 33 shows an example sequence in which an SP-CSI report is dropped.

FIG. 33 shows resolution of a conflict between a SP-CSI resource and a DCI uplink grant. A wireless device may receive, from a base station, a first DCI 3301 activating a periodically repeating SP-CSI resource 3302 for uplink transmission of SP-CSI reports. If the wireless device needs to send uplink data, such as a transport block comprising data, the wireless device may receive a second DCI 3303 comprising an uplink grant for a transport block resource 3303a for sending the uplink data. The wireless device may determine that the transport block resource 3303a overlaps, in time, with one of the SP-CSI resources (e.g., 3302a). If the wireless device is configured to avoid transmitting SP-CSI reports and other transport block data in parallel at the same time, then the wireless device may determine whether to transmit the SP-CSI report in the overlapping SP-CSI resource (3302a) or the data in the transport block resource 3303a. The wireless device may drop the scheduled transmission of the SP-CSI report in the SP-CSI resource 3302a, and transmit the data in the transport block resource 3303a instead. The wireless device may drop the scheduled transmission of the SP-CSI report in the SP-CSI resource 3302a by skipping the transmission of a SP-CSI report for that SP-CSI resource 3302a. The CSI report that would have been sent in the SP-CSI resource 3302a can be rescheduled for transmission at a later time, bundled with a future CSI report, or simply omitted from transmission.

Figure 34:
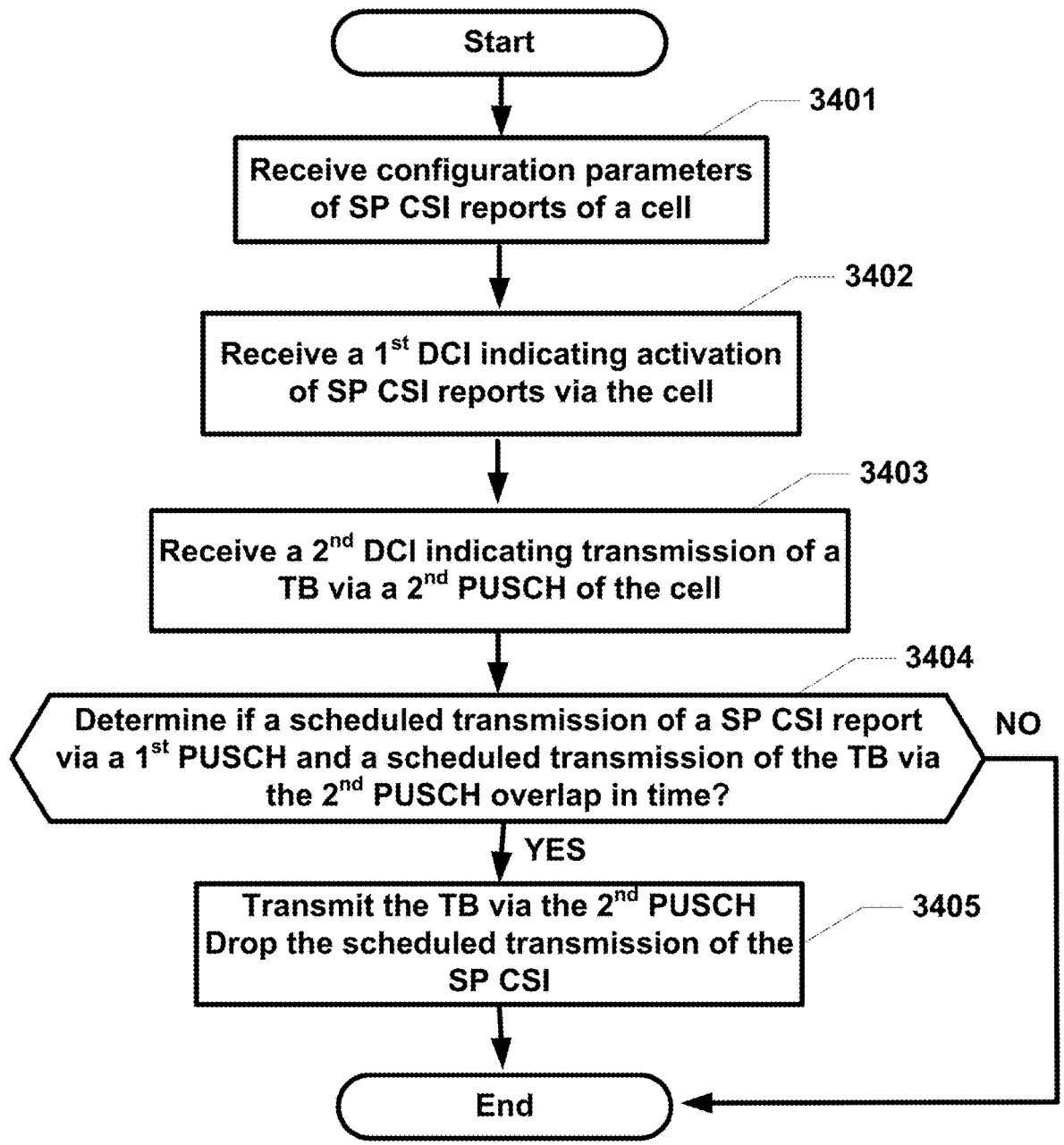
FIG. 34 shows an example response to an overlap between a CSI report and a data transport block (TB), wherein the CSI report is dropped.

FIG. 34 shows a method that may be performed by the wireless device of FIG. 33. In step 3401, the wireless device may receive, from a base station, configuration parameters for SP-CSI reports of a cell. The configuration parameters may indicate, for example, the timing of the SP-CSI resources 3302 of a first PUSCH. In step 3402, the wireless device may receive a first DCI indicating activation of the SP-CSI resources. Activation of the SP-CSI resources may cause the wireless device to begin transmiting SP-CSI reports using the SP-CSI resources via the first PUSCH.

The wireless device may continue to operate, and may need to transmit uplink data. The wireless device may request resources to transmit a transport block comprising the uplink data, and in step 3403, the wireless device may receive, from the base station, a second DCI indicating that the wireless device has been granted transport block resources of a second physical uplink shared channel (PUSCH) for the transmission of the transport block comprising the uplink data. The transport block resources of the second PUSCH may be a one-time resource grant, a dynamic grant, a periodic repeating resource grant (e.g., grant-free, configured grant, etc.), or any other desired type of uplink use of the second PUSCH.

In step 3404, the wireless device may determine whether any of the SP-CSI resources that have been allocated to the wireless device overlaps in time with the transport block resources of the second PUSCH that have been granted for transmission of the transport block. If there is an overlap, then in step 3405, the wireless device may transmit the transport block via the second PUSCH, and drop the transmission of the SP-CSI report in the overlapping SP-CSI resource. If there is no overlap, then the process may conclude with both the transport block and the SP-CSI reports being transmitted as scheduled.

Figure 35:
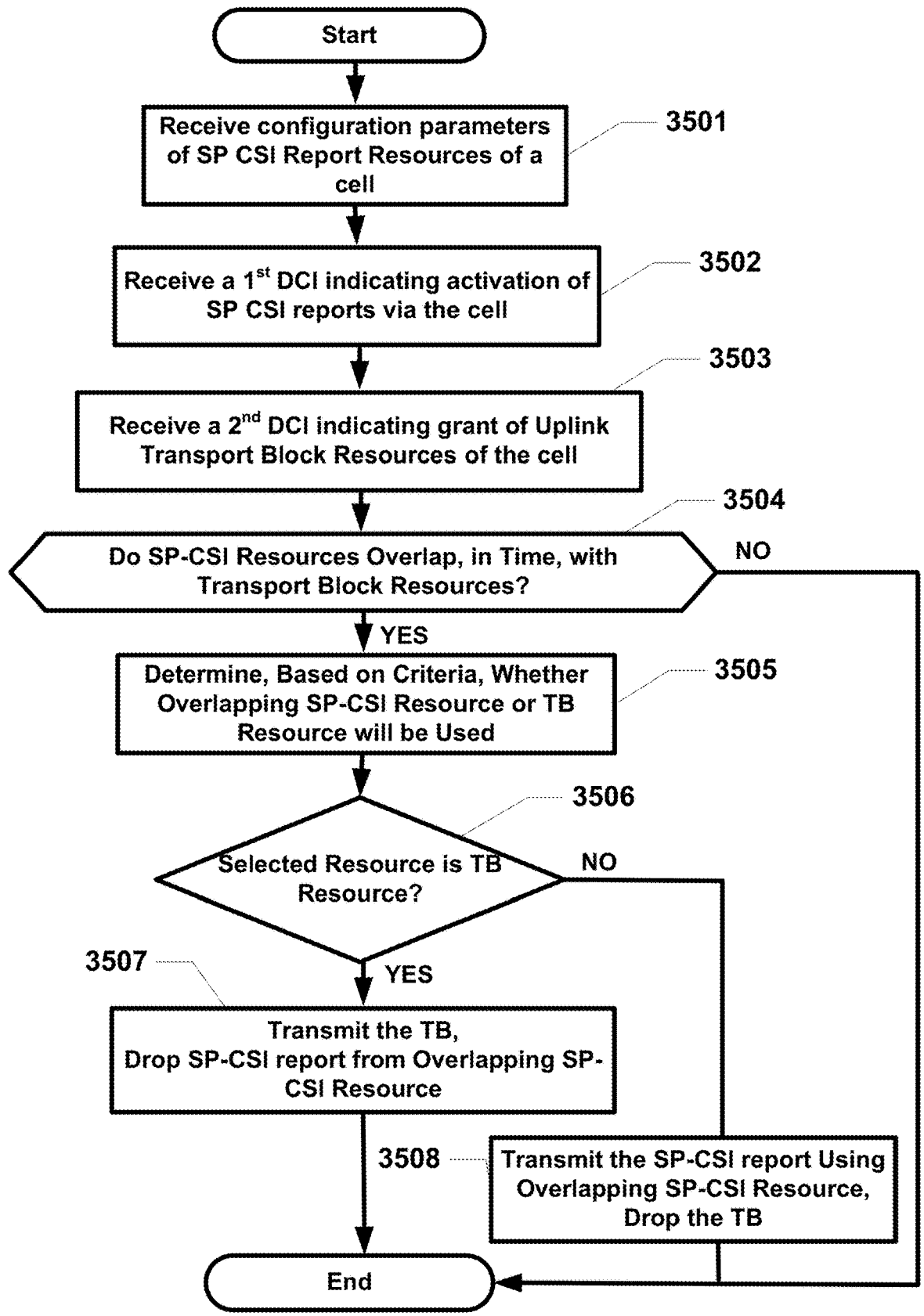
FIG. 35 shows an example response to an overlap between a CSI report and a transport block, wherein a determination is made, based on one or more selection criteria, as to whether to drop the CSI report or the TB.

FIG. 35 shows a method that may be performed by the wireless device of FIGS. 33 and 34, but wherein one or more selection criteria may be used to determine whether the overlapping SP-CSI resource is to be used. In step 3501, the wireless device may receive, from a base station, configuration parameters for SP-CSI reports of a cell. The configuration parameters may indicate, for example, the timing of the SP-CSI resources 3302 of a first PUSCH. In step 3502, the wireless device may receive a first DCI indicating activation of the SP-CSI resources. Activation of the SP-CSI resources may cause the wireless device to begin transmitting SP-CSI reports using the SP-CSI resources via the first PUSCH.

The wireless device may continue to operate, and may need to transmit uplink data. The wireless device may request resources to transmit a transport block comprising the uplink data, and in step 3503, the wireless device may receive, from the base station, a second DCI indicating that the wireless device has been granted transport block resources of a second physical uplink shared channel (PUSCH) for the transmission of the transport block comprising the uplink data. The transport block resources of the second PUSCH may be a one-time resource grant, a dynamic grant, a periodic repeating resource grant (e.g., grant-free), or any other desired type of uplink use of the second PUSCH.

In step 3504, the wireless device may determine whether any of the SP-CSI resources that have been allocated to the wireless device overlaps in time with the transport block resources of the second PUSCH that have been granted for transmission of the transport block. If there is an overlap, then in step 3505, the wireless device may employ one or more selection criteria to determine which of the overlapping resources will be used. Any of the various selection criteria discussed above may be used. For example, the selection criteria may comprise a configuration setting, such that the wireless device may be configured to select either the SP-CSI resource or the transport block resource if there is an overlap.

The selection criteria may comprise a time interval or periodicity of the resource. For example, the wireless device may select the resource having the longest time interval or periodicity if the overlapping resources are periodic. For example, if the SP-CSI resource occurs more frequently than the transport block resource, and/or has been used more recently than the transport block resource, then the wireless device may select the transport block resource.

The selection criteria may comprise a size of the resource (e.g., number of resource blocks or elements). For example, the wireless device may compare the sizes of the resources, and select the resource having the smaller size. The wireless device may select the transport block resource based on a determination that a size of the SP-CSI resource is smaller than a threshold size, or based on a determination that the transport block resource is larger than a threshold size.

If the transport block resource is determined in step 3506 to have been selected, then in step 3507, the wireless device may transmit the uplink data via the transport block resource, and may drop the SP-CSI report that was scheduled to be transmitted in the overlapping SP-CSI resource. If the SP-CSI resource was determined in step 3506 to have been selected, then in step 3508, the wireless device may transmit the SP-CSI report that was scheduled to be transmitted in the overlapping SP-CSI resource, and may drop the transmission of the uplink data via the transport block resource. Dropping the transport block resource may be handled in the same way as dropping the SP-CSI resource, and the uplink data may be scheduled for transmission at a later time.

Figure 36:
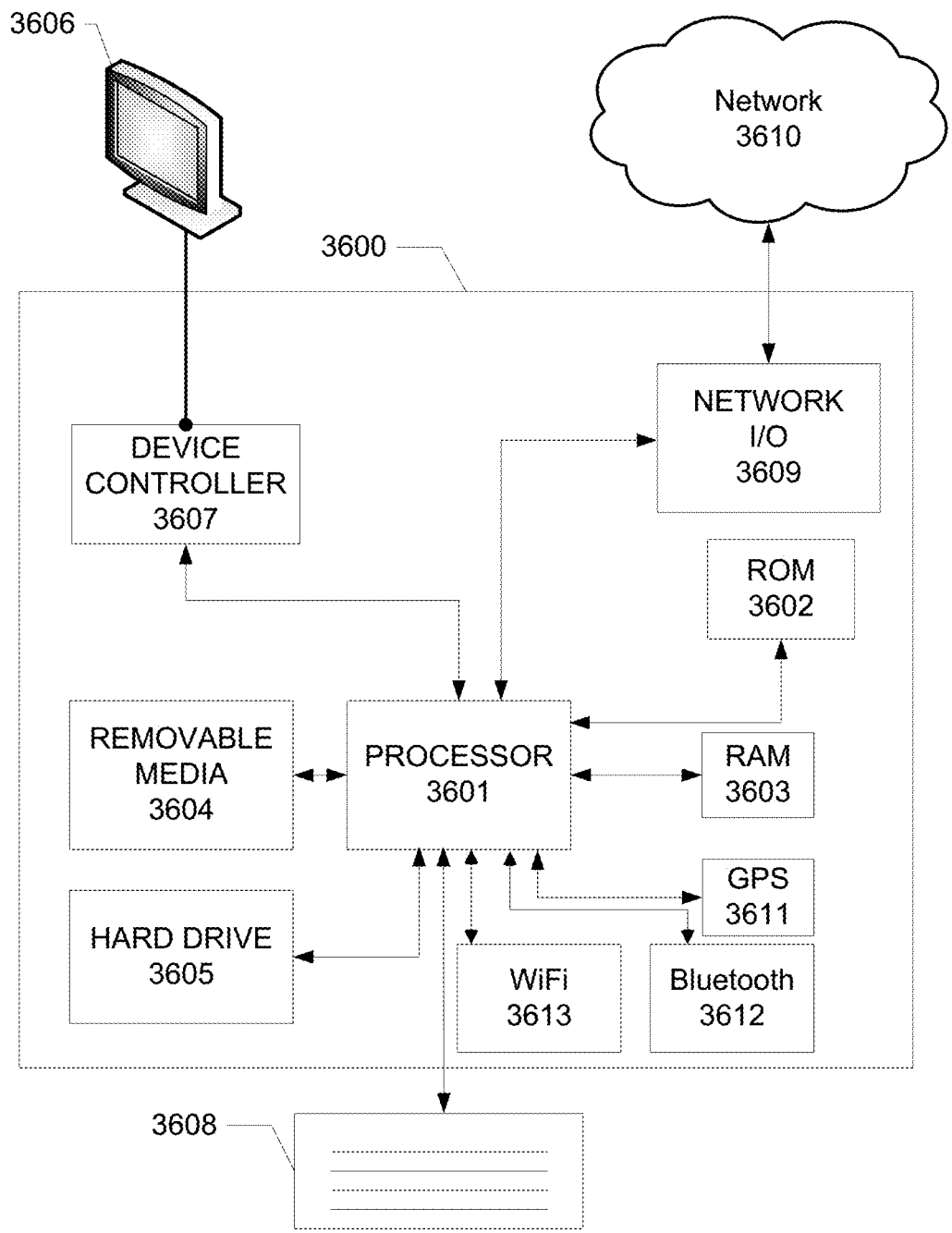
FIG. 36 shows general hardware elements that may be used to implement any of the various computing devices discussed herein The accompanying drawings are non-exclusive examples of various features that may be used herein.

FIG. 36 shows general hardware elements that may be used to implement any of the various computing devices discussed herein, including, e.g., the base station 401, the wireless device 406, or any other base station, wireless device, or computing device described herein. The computing device 3600 may include one or more processors 3601, which may execute instructions stored in the random access memory (RAM) 3603, the removable media 3604 (such as a Universal Serial Bus (USB) drive, compact disk (CD) or digital versatile disk (DVD), or floppy disk drive), or any other desired storage medium. Instructions may also be stored in an attached (or internal) hard drive 3605. The computing device 3600 may also include a security processor (not shown), which may execute instructions of one or more computer programs to monitor the processes executing on the processor 3601 and any process that requests access to any hardware and/or software components of the computing device 3600 (e.g., ROM 3602, RAM 3603, the removable media 3604, the hard drive 3605, the device controller 3607, a network interface 3609, a GPS 3611, a Bluetooth interface 3612, a WiFi interface 3613, etc.). The computing device 3600 may include one or more output devices, such as the display 3606 (e.g., a screen, a display device, a monitor, a television, etc.), and may include one or more output device controllers 3607, such as a video processor. There may also be one or more user input devices 3608, such as a remote control, keyboard, mouse, touch screen, microphone, etc. The computing device 3600 may also include one or more network interfaces, such as a network interface 3609, which may be a wired interface, a wireless interface, or a combination of the two. The network interface 3609 may provide an interface for the computing device 3600 to communicate with a network 3610 (e.g., a RAN, or any other network). The network interface 3609 may include a modem (e.g., a cable modem), and the external network 3610 may include communication links, an external network, an in-home network, a provider's wireless, coaxial, fiber, or hybrid fiber/coaxial distribution system (e.g., a DOCSIS network), or any other desired network.

Additionally, the computing device 3600 may include a location-detecting device, such as a global positioning system (GPS) microprocessor 3611, which may be configured to receive and process global positioning signals and determine, with possible assistance from an external server and antenna, a geographic position of the computing device 3600.

The example in FIG. 36 may be a hardware configuration, although the components shown may be implemented as software as well. Modifications may be made to add, remove, combine, divide, etc. components of the computing device 3600 as desired. Additionally, the components may be implemented using basic computing devices and components, and the same components (e.g., processor 3601, ROM storage 3602, display 3606, etc.) may be used to implement any of the other computing devices and components described herein. For example, the various components described herein may be implemented using computing devices having components such as a processor executing computer-executable instructions stored on a computer-readable medium, as shown in FIG. 36. Some or all of the entities described herein may be software based, and may co-exist in a common physical platform (e.g., a requesting entity may be a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

We claim:

1. A method comprising:
   receiving, by a wireless device, first downlink control information (DCI) indicating activation of semi-persistent channel state information (SP-CSI) reporting associated with a cell;
   receiving, by the wireless device, second DCI comprising an uplink grant indicating scheduled transport block transmission associated with the cell; and
   based on a determination that scheduled transmission of a SP-CSI report via a first physical uplink shared channel (PUSCH) of the cell overlaps, in time, with scheduled transmission of a transport block via a second PUSCH of the cell, and based on one or more selection criteria:
      transmitting, via the second PUSCH, the transport block; and
      dropping the scheduled transmission of the SP-CSI report.

2. The method of claim 1, wherein the one or more selection criteria comprise a timing criterion associated with at least one of:
   the first PUSCH; or
   the second PUSCH.

3. The method of claim 1, wherein the one or more selection criteria comprise a periodicity criterion, wherein the dropping the scheduled transmission of the SP-CSI report is based on a comparison of:
   a periodicity associated with transport block transmission; and
   a periodicity associated with SP-CSI report transmission.

4. The method of claim 1, wherein the one or more selection criteria comprise a size criterion, and wherein the dropping the scheduled transmission of the SP-CSI report is based on a size of the transport block.

5. The method of claim 1, wherein the one or more selection criteria comprise a size criterion, and wherein the dropping the scheduled transmission of the SP-CSI report is based on a comparison of:
   a size of the SP-CSI report; and
   a size of the transport block.

6. The method of claim 1, wherein the one or more selection criteria comprise a priority criterion, and wherein the dropping the scheduled transmission of the SP-CSI report is based on a priority of a logical channel associated with the transport block.

7. The method of claim 1, further comprising receiving a radio resource control (RRC) message comprising the one or more selection criteria.

8. A method comprising:
   determining, by a wireless device, that scheduled transmission of one or more semi-persistent channel state information (SP-CSI) reports, associated with the wireless device, overlap in time with scheduled transmission of one or more transport blocks; and
   based on the determining, and based on one or more selection criteria:
      transmitting, via one or more uplink channel resources, the one or more transport blocks; and
      dropping the scheduled transmission of the one or more SP-CSI reports.

9. The method of claim 8, wherein the one or more selection criteria comprise a timing criterion associated with at least one of:
   the scheduled transmission of the one or more SP-CSI reports; or
   the scheduled transmission of the one or more transport blocks.

10. The method of claim 8, wherein the one or more selection criteria comprise a periodicity criterion, wherein the dropping the scheduled transmission of the one or more SP-CSI reports is based on a comparison of:
    a periodicity associated with transport block transmission; and
    a periodicity associated with SP-CSI report transmission.

11. The method of claim 8, wherein the one or more selection criteria comprise a size criterion, and wherein the dropping the scheduled transmission of the one or more SP-CSI reports is based on a size of the one or more transport blocks.

12. The method of claim 8, wherein the one or more selection criteria comprise a size criterion, and wherein the dropping the scheduled transmission of the one or more SP-CSI reports is based on a comparison of:
    a size of the one or more SP-CSI reports; and
    a size of the one or more transport blocks.

13. The method of claim 8, wherein the one or more selection criteria comprise a priority criterion, and wherein the dropping the scheduled transmission of the one or more SP-CSI reports is based on a priority of a logical channel associated with the one or more transport blocks.

14. The method of claim 8, further comprising receiving a radio resource control (RRC) message comprising the one or more selection criteria.

15. A method comprising:
  receiving, by a wireless device, configuration parameters of semi-persistent channel state information (SP-CSI) reporting associated with a cell;
  transmitting, via a plurality of SP-CSI resources, a plurality of SP-CSI reports;
  receiving information indicating a grant of transmission of one or more transport blocks; and
  dropping scheduled transmission of one or more SP-CSI reports based on:
    a determination that scheduled transmission of the one or more transport blocks via a first uplink channel overlaps, in time, with the scheduled transmission of the one or more SP-CSI reports via a second uplink channel; and
    one or more timing criteria associated with at least one of:
      the first uplink channel; or
      the second uplink channel.

16. The method of claim 15, wherein the one or more timing criteria comprise a periodicity associated with SP-CSI transmission.

17. The method of claim 15, wherein the dropping the scheduled transmission of the one or more SP-CSI reports is based on a comparison of:
  a periodicity associated with transport block transmission; and
  a periodicity associated with SP-CSI report transmission.

18. The method of claim 15, wherein the dropping the scheduled transmission of the one or more SP-CSI reports is based on a size of the one or more transport blocks.

19. The method of claim 15, wherein the dropping the scheduled transmission of the one or more SP-CSI reports is based on a comparison of:
  a size of the one or more SP-CSI reports; and
  a size of the one or more transport blocks.

20. The method of claim 15, wherein the dropping the scheduled transmission of the one or more SP-CSI reports is based on a priority of a logical channel associated with the one or more transport blocks.

21. The method of claim 15, wherein the one or more timing criteria comprises a transmission time interval (TTI) indicated by the information.

22. The method of claim 2, wherein the timing criterion comprises a transmission time interval (TTI) indicated by the second DCI.

23. The method of claim 9, wherein the timing criterion comprises a transmission time interval (TTI) indicated by downlink control information (DCI).

\* \* \* \* \*

UNITED STATES PATENT AND TRADEMARK OFFICE
CERTIFICATE OF CORRECTION

PATENT NO. : 11,153,060 B2
APPLICATION NO. : 16/237368
DATED : October 19, 2021
INVENTOR(S) : Babaei et al.

It is certified that error appears in the above-identified patent and that said Letters Patent is hereby corrected as shown below:

On the Title Page

Page 3, Column 1, Other Publications, Line 35:
Delete "Dormat" and insert --Dormant-- therefor Page 3, Column 2, Other Publications, Line 15:
Delete "Metting" and insert --Meeting-- therefor Page 3, Column 2, Other Publications, Line 18:
Delete "Metting" and insert --Meeting-- therefor Page 3, Column 2, Other Publications, Line 21:
Delete "Metting" and insert --Meeting-- therefor Page 3, Column 2, Other Publications, Line 24:
Delete "Metting" and insert --Meeting-- therefor Page 3, Column 2, Other Publications, Line 27:
Delete "Metting" and insert --Meeting-- therefor Page 3, Column 2, Other Publications, Line 30:
Delete "Metting" and insert --Meeting-- therefor Page 3, Column 2, Other Publications, Line 33:
Delete "Metting" and insert --Meeting-- therefor Page 3, Column 2, Other Publications, Line 36:
Delete "Metting" and insert --Meeting-- therefor Signed and Sealed this
Sixteenth Day of May, 2023

*Katherine Kelly Vidal*

Katherine Kelly Vidal
*Director of the United States Patent and Trademark Office*

CERTIFICATE OF CORRECTION (continued)
U.S. Pat. No. 11,153,060 B2

Page 3, Column 2, Other Publications, Line 39:
Delete "Metting" and insert --Meeting-- therefor Page 3, Column 2, Other Publications, Line 42:
Delete "Metting" and insert --Meeting-- therefor Page 3, Column 2, Other Publications, Line 60:
Delete "tralic" and insert --traffic-- therefor Page 5, Column 1, Other Publications, Line 2:
Delete "Gorup" and insert --Group-- therefor In the Drawings Sheet 7 of 36, FIG. 7, Reference Numeral 723, Lines 1-4:
Delete "DL-SCH of SCH" and insert --DL-SCH of SCG-- therefor Sheet 7 of 36, FIG. 7, Reference Numeral 724, Lines 1-3:
Delete "UL-SCH of SCH" and insert --UL-SCH of SCG-- therefor Sheet 15 of 36, FIG. 15:
Insert at middle-left of image --1504-- therefor Sheet 21 of 36, FIG. 21 Part B), Line 1:
Delete "Actviation/Deactivation" and insert --Activation/Deactivation-- therefor Sheet 24 of 36, FIG. 24:
Insert at bottom left --2402-- therefor Sheet 24 of 36, FIG. 24:
Insert at bottom right --2401-- therefor Sheet 29 of 36, FIG. 29:
Delete "configration)" and insert --configuration)-- therefor In the Specification Column 8, Detailed Description, Line 25:
Delete "50B" and insert --501B-- therefor Column 9, Detailed Description, Line 6:
Delete "534" and insert --535-- therefor Column 9, Detailed Description, Line 9:
Delete "535A and 535B" and insert --536A and 536B-- therefor

CERTIFICATE OF CORRECTION (continued)
U.S. Pat. No. 11,153,060 B2

Column 9, Detailed Description, Line 12:
Delete "536A and 536B" and insert --537A and 537B-- therefor Column 9, Detailed Description, Line 53:
Delete "621" and insert --620-- therefor Column 11, Detailed Description, Line 66:
Delete "TAGS" and insert --TAGs-- therefor Column 12, Detailed Description, Line 18:
Delete "PDDCH" and insert --PDCCH-- therefor Column 12, Detailed Description, Line 22:
Delete "PDDCH" and insert --PDCCH-- therefor Column 12, Detailed Description, Line 45:
Delete "adnthe" and insert --and the-- therefor Column 12, Detailed Description, Line 51:
Delete "NTA" and insert --$N_{TA}$-- therefor Column 12, Detailed Description, Line 54:
Delete "NTA=0." and insert --$N_{TA}$=0.-- therefor Column 17, Detailed Description, Line 63:
Delete "1312, 1312," and insert --1312, 1313,-- therefor Column 21, Detailed Description, Line 56:
After "level L", insert --.--

Column 21, Detailed Description, Line 59:
Delete "$W_{PDCCHq}$" and insert --$W_{PDCCH,q}$-- therefor Column 32, Detailed Description, Line 4:
After "BWP", insert --.--

Column 34, Detailed Description, Line 47:
Delete "defied" and insert --defined-- therefor Column 43, Detailed Description, Line 13:
After "device", insert --.--

Column 46, Detailed Description, Line 20:
Delete "1921" and insert --1920-- therefor Column 47, Detailed Description, Line 58:
Delete "20701" and insert --2001-- therefor Column 53, Detailed Description, Line 23:
Delete "is is" and insert --is-- therefor Column 57, Detailed Description, Line 15:
Delete "in in" and insert --in-- therefor Column 61, Detailed Description, Line 41:
Delete "transmisison" and insert --transmission-- therefor Column 64, Detailed Description, Line 5:
After "measurement", insert --.--

Column 64, Detailed Description, Line 66:
Delete "mayuse" and insert --may use-- therefor Column 66, Detailed Description, Line 7:
After "PUSCH-bundle-size-for-CSI", insert --.--

Column 66, Detailed Description, Line 18:
Delete "setting(s)," and insert --setting(s).-- therefor Column 68, Detailed Description, Line 57:
Delete "ith" and insert --$i^{th}$-- therefor Column 68, Detailed Description, Line 59:
Delete "ith" and insert --$i^{th}$-- therefor Column 71, Detailed Description, Line 27:
Delete "transmittedin" and insert --transmitted in-- therefor Column 71, Detailed Description, Lines 42-43:
Delete "proiritization" and insert --prioritization-- therefor Column 74, Detailed Description, Line 59:
Delete "a a" and insert --a-- therefor Column 80, Detailed Description, Line 1:
Delete "transmiting" and insert --transmitting-- therefor Column 80, Detailed Description, Line 37:
Delete "transmiting" and insert --transmitting-- therefor